United States Patent
Nozue

(10) Patent No.: US 10,474,760 B2
(45) Date of Patent: Nov. 12, 2019

(54) TRANSLATION SUPPORT SYSTEM

(71) Applicant: Sunflare Co., Ltd., Tokyo (JP)

(72) Inventor: Suguru Nozue, Tokyo (JP)

(73) Assignee: Sunflare Co., Ltd., Tokyo (JP)

( * ) Notice: Subject to any disclaimer, the term of this patent is extended or adjusted under 35 U.S.C. 154(b) by 0 days.

(21) Appl. No.: 16/114,942

(22) Filed: Aug. 28, 2018

(65) Prior Publication Data

US 2019/0065482 A1 Feb. 28, 2019

Related U.S. Application Data

(62) Division of application No. 15/030,736, filed as application No. PCT/JP2014/076732 on Oct. 6, 2014, now Pat. No. 10,108,609.

(30) Foreign Application Priority Data

Oct. 23, 2013 (JP) ................................. 2013-219863

(51) Int. Cl.
   *G06T 11/00* (2006.01)
   *G06F 17/28* (2006.01)
   (Continued)

(52) U.S. Cl.
   CPC .......... *G06F 17/289* (2013.01); *G06F 3/0237* (2013.01); *G06F 3/0482* (2013.01);
   (Continued)

(58) Field of Classification Search
   CPC .... G06F 17/28; G06F 17/289; G06F 17/2827; G06F 17/2836; G06F 17/2854
   See application file for complete search history.

(56) References Cited

U.S. PATENT DOCUMENTS

| | | | | |
|---|---|---|---|---|
| 5,687,383 A | * | 11/1997 | Nakayama | .......... G06F 17/2827 704/2 |
| 5,875,443 A | * | 2/1999 | Nielsen | ................. G06F 17/273 |

(Continued)

FOREIGN PATENT DOCUMENTS

| | | |
|---|---|---|
| JP | 04-033058 | 2/1992 |
| JP | H04-357566 A | 12/1992 |

(Continued)

OTHER PUBLICATIONS

Seiji Ohkura et al., English partial translation of the dictionary definition of "UTX-Simple ver.1.10".

(Continued)

*Primary Examiner* — Eric Yen
(74) *Attorney, Agent, or Firm* — Studebaker & Brackett PC

(57) ABSTRACT

A translation support system and the like are provided that is capable of preventing wasteful tasks due to simultaneous operations by more than one person and preventing inconsistent translation of translation words even in a case where a number of persons are simultaneously involved in the translation operations. The translation support system includes: a transfer unit transferring translation word approval request information to an approver terminal of an approver, the translation word approval request information including an original word or phrase received from a request-source terminal requesting to the approver an approval of a translation word of a particular original word or phrase; an approval request information storage unit storing translation word approval result information including at least approve-or-reject information corresponding to the translation word approval request information received from the approver terminal and an approved translation word corresponding to the original word or phrase; a notification storage unit storing notification message corre- (Continued)

sponding to the approve-or-reject information; a notification determination unit determining, in accordance with the approve-or-reject information, the necessity of notification to the terminals other than the request-source terminal and determine which piece of the notification message should be notified to each of the terminals; and a notification transmission unit transmitting notification information to terminals for which notification or respective notifications have been determined to be necessary, the notification information including the notification message in accordance with the determination by the notification determination unit, the original word or phrase, and the approved translation word.

2 Claims, 38 Drawing Sheets

(51) Int. Cl.
| | | |
|---|---|---|
| *G06F 3/0484* | (2013.01) | |
| *G06F 17/21* | (2006.01) | |
| *G06F 17/22* | (2006.01) | |
| *G06F 17/24* | (2006.01) | |
| *G06F 3/0482* | (2013.01) | |
| *G10L 15/32* | (2013.01) | |
| *G06F 3/0488* | (2013.01) | |
| *G06F 3/023* | (2006.01) | |
| *G06Q 10/06* | (2012.01) | |

(52) U.S. Cl.
CPC ........ *G06F 3/0488* (2013.01); *G06F 3/04842* (2013.01); *G06F 3/04845* (2013.01); *G06F 17/214* (2013.01); *G06F 17/2205* (2013.01); *G06F 17/24* (2013.01); *G06F 17/2827* (2013.01); *G06F 17/2836* (2013.01); *G06F 17/2854* (2013.01); *G06F 17/2872* (2013.01); *G06T 11/001* (2013.01); *G10L 15/32* (2013.01); *G06F 2203/04803* (2013.01); *G06Q 10/06* (2013.01)

(56) References Cited

U.S. PATENT DOCUMENTS

| | | | |
|---|---|---|---|
| 6,516,296 | B1 | 2/2003 | Fuji |
| 7,730,467 | B1 | 6/2010 | Hejlsberg et al. |
| 9,325,809 | B1 | 4/2016 | Barros et al. |
| 2002/0169594 | A1* | 11/2002 | Yasuda ................ G06F 17/279 704/5 |
| 2003/0023424 | A1 | 1/2003 | Weiner |
| 2003/0040899 | A1 | 2/2003 | Ogilvie |
| 2003/0040900 | A1 | 2/2003 | D'Agostini |
| 2004/0039993 | A1 | 2/2004 | Kougiouris et al. |
| 2005/0234702 | A1 | 10/2005 | Komiya |
| 2006/0116865 | A1 | 6/2006 | Cheng et al. |
| 2008/0046231 | A1 | 2/2008 | Laden et al. |
| 2009/0048820 | A1 | 2/2009 | Buccella |
| 2009/0164387 | A1 | 6/2009 | Armstrong et al. |
| 2010/0115424 | A1* | 5/2010 | Young ................ G06F 17/276 715/753 |
| 2010/0179802 | A1 | 7/2010 | Best et al. |
| 2010/0223048 | A1* | 9/2010 | Lauder ................ G06F 17/2836 704/4 |
| 2014/0303956 | A1 | 10/2014 | Wilson |

FOREIGN PATENT DOCUMENTS

| | | |
|---|---|---|
| JP | H05-324716 A | 12/1993 |
| JP | 07-021187 | 1/1995 |
| JP | 11-015828 | 1/1999 |
| JP | 2011-210194 A | 10/2011 |

OTHER PUBLICATIONS

International Search Report; PCT/JP2014/076732 dated Feb. 17, 2015.

* cited by examiner

Fig. 18

| No. | Check | Original Text | Translated Text |
|---|---|---|---|
| 1 | ☐ | ….Fig.1 shows system <u>overview</u> of the Translation Support system. …. …. | Zu1ha honnyaku shienn Sisutemu no gairyaku wo shimesu zudearu |
| 2 | ☐ | ….　….　….　…. | ….。 ….。 ….。 ….。 |
| 3 | ☐ | ….　….　….　…. | ….。 ….。 ….。 ….。 |
| 4 | ☐ | | |
| 5 | ☐ | | |
| 6 | ☐ | | |
| 7 | ☐ | | |

Update　　　1801　　　　1802　　　　　　1803

| No. | Check | Original Text | Translated text |
|---|---|---|---|
| 1 | ☐ | ….Fig.1 shows system <u>overview</u> of the Translation Support system. …. …. | Zulha honnyaku shienn Sisutemu no <u>gairyaku</u> wo shimesu zudearu |
| 2 | ☐ | XXXXX YYYY ZZZZ…. …. …. | …。…。 |
| 3 | ☐ | | |

Update — 2001, 2000, 2002, 2003

| 4 | ☐ | | |
| 5 | ☐ | | |
| 6 | ☐ | | |

Update — 2011, 2010, 2012, 2013

| 8 | ☐ | | |
| 9 | ☐ | | |
| 10 | ☐ | | |
| 11 | ☐ | | |

Update — 2021, 2020, 2022, 2023

Fig. 38

Local Memory

| Project ID | Memory ID | Translator ID | Word Class | Original Word/ Phrase | Translation Word | Registration Date | Date of Use | Category |
|---|---|---|---|---|---|---|---|---|
| 123456 | 0003 | 00786 | n | line | kaisen | 130823 | 130824 | L |
| 123456 | 0003 | 00786 | v | connect | setsuzoku-suru | 130823 | 130824 | M |

Common Memory 151

| Project ID | Memory ID | Translator ID | Word Class | Original Word/ Phrase | Translation Word | Registration Date | Date of Use |
|---|---|---|---|---|---|---|---|
| 123456 | 0001 | 00123 | a | rapid | jinsoku-na | 20130823 | 130824 |
| 123456 | 0001 | 00123 | a | fast | kousoku-na | 20130823 | 130824 |

Management File 1) (Translation Assignment Range Table)

| Project ID | Translator ID | Type | Start Page | Start Paragraph | Sentence No. | End Page | End Paragraph | Sentence No. |
|---|---|---|---|---|---|---|---|---|
| 123456 | 00138 | CT | 01 | 01 | 01 | 10 | 35 | 08 |
| 123456 | 00786 | ET | 20 | 36 | 01 | 38 | 105 | 07 |
| 123456 | 00777 | NT | 38 | 106 | 01 | 53 | 137 | 06 |

Management File 2) (Progress Management Table)

| Project ID | Translator ID | Type | Translation Completion Page | Translation Completion Paragraph | Translation Completion Line | Progress Rate | Status |
|---|---|---|---|---|---|---|---|
| 123456 | 00138 | CT | 15 | 45 | 06 | 75 | AD |
| 123456 | 00786 | ET | 32 | 85 | 05 | 66 | NM |
| 123456 | 00777 | NT | 45 | 121 | 04 | 50 | LT |

Management File 3) (Memory Management Table)

| Project ID | Memory ID | Rank | Original Language | Target Language | Field | Date | Status |
|---|---|---|---|---|---|---|---|
| 123456 | 0012 | 1 | English | Japanese | Communication | 101123 | V |
| 123456 | 0004 | 2 | English | Japanese | Communication | 050113 | W |
| 123456 | 0003 | 3 | English | Japanese | Communication | 110526 | V |

TRANSLATION SUPPORT SYSTEM

CROSS-REFERENCE TO RELATED APPLICATIONS

This application is a divisional of U.S. patent application Ser. No. 15/030,736, filed Apr. 20, 2016, which is a 371 National Phase of PCT/JP2014/076732, filed Oct. 6, 2014, herein incorporated in their entirety by reference.

TECHNICAL FIELD

The present invention relates to a translation support system, a server of a translation support system, a client of a translation support system, a control method for a translation support system, and a program thereof, and in particular relates to a translation support system adapted to assist translation operations that are simultaneously performed by multiple translators, a control method for the translation support system, and a program thereof.

BACKGROUND ART

Traditionally, a translation support system is known according to which, in a case where more than one translator is involved in translating one single original text while taking charge of only part of it, identifier marks prohibiting translation of terms marked thereby are added to terms which are contained in the original text and registered in a term dictionary, and one editor replaces terms that are yet to be translated by translation words using the term dictionary at the final stage of the translation operations, and thus the translation support system accelerates the translation and ensures standardization of the translation words (Patent Literature 1).

Also, a method for standardization of translation words in a machine translation system is known according to which translation words of a translated text are replaced by replacement translation words when these translation words corresponding to dictionary entries satisfy particular association conditions and thereby standardization of the translation words is realized (Patent Literature 2).

CITATION LIST

Patent Literature

Patent Literature 1: Japanese Patent Laid-Open No. H05-324716
Patent Literature 2: Japanese Patent Laid-Open No. 2011-210194

SUMMARY OF INVENTION

Technical Problem

Meanwhile, according to the techniques of the above-identified Patent Literature 1, numerous yet-to-be-translated terms may remain to exist with the translation-prohibiting identifier marks added thereto, which increases load upon the final-stage translation operation(s) causing prolonged time required for the operation(s), which may make it difficult to strike a balance between ensuring standardization of the translation words and delivering the translated text before a desired deadline. Also, it is difficult to confirm, in the course of the translation operation, the specific translation words into which the yet-to-be-translated terms with the translation-prohibiting identifier marks will be translated. When the prohibition of translation is maintained though it is necessary to use a different translation word at a particular location of the original text, an editor who is not fully familiar with the content of the original text may standardize the terms in a mechanical manner, as a result of which the meaning of the original text may not be correctly reproduced in the translated text.

In addition, application of the techniques of Patent Literature 2, which contemplates machine translation, to standardization of translation words in a conventional translation may require complicated setting of the association conditions, and the setting of the conventional association conditions is performed by viewing part of the original text, which means that not all of the conditions are specified and it is accordingly necessary to specify a considerable number of new conditions. In addition, the conditions that were specified once may need to be modified. As such, the state of the art techniques are not suited in particular for a case where multiple translators are simultaneously involved in the translation operations with a short delivery period, which is the problem associated with the state of the art techniques. Particularly, translation words for one verb often have to be chosen in accordance with the context of the content of the descriptions of the original text. As a result, when the translators choose translation words for a verb according to their own decisions and the constituent translated text portions created by the individual translators are consolidated into one complete translated text, standardization of the translation words of the complete translated text as a whole will require extremely cumbersome operations.

In such a case, an approach may be contemplated according to which a certain translator having particularly excellent skill first reads part of the original text and defines the translation words for the principal words and phrases and creates a translation word list, the translation word list thus created are distributed to the other translators, and the other translators refer to this translation word list and proceed with their individual translation operations. However, methodology of this kind implies that the other translators other than the one who creates the translation word list cannot proceed with their operations except for at most scanning the original text until the translation word list is created, so that they cannot start their full-fledged translation operations, which is another problem associated with the state of the art techniques. Also, since the translator who creates the translation word list reads only part of the original text, he/she cannot define appropriate translation words for those that will appear for the first time in the latter half of the original text, which is still another problem associated with the state of the art techniques. Further, it is difficult to make appropriate responses to subsequent needs of modifications to the translation words already existing in the word list.

Further, for example, in various industrial devices such as medical devices, measurement devices, and machining devices which incorporate techniques from different fields of technology, components pertaining to other technical fields and constituting the constituent parts of the device are often combined along with the one pertaining to the field of technology which is the main topic of the original document. When the translation words are standardized in a mechanical manner, it may happen that the meaning of the original text cannot be correctly reproduced. When standardization of the translation words of the translated text is fully sought in such a case, each translator needs to successively confirm whether or not each of the translation words of a certain original word or phrase of his/her own section for which he/she is in charge of translation are really in agreement with each of the translation words of the same original word or phrase of the other translators one after another. When the former translation words do not agree with the latter translation words, then the translator needs to confirm the cause of the inconsistency and standardize the translation words for any sections where the standardization is necessary. In this manner, when translation involves more than one translator, there is the need of minimizing the workload caused by the participation of the translators.

It is an object of the present invention to provide a translation support system, a control method for a translation support system, a server of the translation support system, a client of the translation system, and a control program thereof which provide solutions to these problems and are capable of preventing wasteful tasks (overhead) due to simultaneous operations by more than one translator such as approval request operation, approval operations for translation words, and confirmation operation for approval results, and thus preventing inconsistent translation of translation words even in a case where a number of persons are simultaneously involved in the translation operations.

Solution to Problem

In order to solve the above problems, the translation support system according to the present invention is a translation support system allowing communication between a server and a plurality of clients via a communication line.

The clients include a request-source client and an approver client. The request-source client is operated by a translator of a request-source requesting to an approver an approval of a translation word of a particular original word or phrase, and the approver client is operated by the approver.

The server includes a transfer unit configured to transfer translation word approval request information to the approver client, the translation word approval request information including at least an original word or phrase received from the request-source client; an approval request history storage unit configured to store approval result information at least including: the translation word approval request information received from the approver client; approve-or-reject information in accordance with the translation word approval request information; and an approved translation word that is a translation word corresponding to the original word or phrase; a notification storage unit configured to store notification message information in accordance with the approve-or-reject information; a notification determination unit configured to determine, in accordance with the approve-or-reject information, necessity of notification to a client or clients other than the approver client and determine which piece of the notification message information stored in the approval request history storage unit should be notified to each of the clients; and a notification information generation unit for transmitting approval information, in accordance with the determination by the notification determination unit, to one or more clients for which notification or respective notifications have been determined to be necessary, the approval information including the notification message information, the original word or phrase, and the approved translation word in accordance with the client or clients for which the notification or the respective notifications have been determined to be necessary.

The client includes an original text storage unit configured to store at least an original text portion within an assignment range of which a translator operating the client is in charge of translation; an approval list information generation unit configured to generate approval list information for displaying an approval list on a screen of the client using the approval information received from the server, the approval list containing at least the original word or phrase and the approved translation word; and search unit configured to check whether or not the original word or phrase included in the approval information is contained in the original text portion within the assignment range.

The approval list information generation unit is configured to generate display attribute information of either the original word or phrase or the translation word such that the attribute information of the original word or phrase is different from that of the translation word, depending on a case where the original word or phrase of the approval list information is contained in the original text portion within the assignment range and another case where the original word or phrase of the approval list information is not contained in the assignment original range as a result of the search by the search unit.

In order to solve the above problems, preferably, in the translation support system according to the present invention, the client further includes a determination unit configured, in a translation operation for translating the original text portion within the assignment range into a predetermined language, to determine that a different translation word has been selected as a translation word for the particular original word or phrase, the different translation word being different than the approved translation word corresponding to the same original word or phrase of the approval information; and a caution information generation unit configured to generate caution information when the determination unit has determined that the different translation word has been selected, the different translation word being different than the approved translation word corresponding to the same original word or phrase of the approval information, the caution information including a translator ID identifying the operator of the other client or at least one piece of other information identifying the other client, the original word or phrase, the approved word or phrase, and the different translation word, wherein the caution information is transmitted to at least either one of the server and the approver client.

In order to solve the above problems, the method of controlling a translation support system according to the present invention is control method for confirmation of a newly approved translation word in a translated text in a translation support system allowing communication between a management server and a plurality of clients.

The method includes a timing arrival determination step of determining whether or not a predetermined confirmation timing is reached; a new approval information determination step of determining presence or absence of a new approval information; in response to the timing arrival determination step having determined that the predetermined confirmation timing was reached and further in response to the new approval information determination step having determined that the new approval information exists, an original word or phrase search step of checking whether or not an original word or phrase included in the new approval information is contained in an original text which an operator of a particular client should translate; a translation word search step of checking whether or not an approved translation word included in the new approval information is included in a translation file translated by the operator of the particular client; and in response to the original word or phrase being contained in the original text which the operator of the particular client should translate and further in response to the approved translation word not being included in the translation file that has been translated by the operator of the particular client, a report information generation step of generating report information including information indicating that the approved translation word is not included in the translation file that has been translated by the operator of the particular client.

In order to solve the above problems, the method of controlling a translation support system according to the present invention is a confirmation and control method for a translation word approval request in a translation support system allowing communication between a plurality of clients and a management server, the clients including an approver client operated by an approver, the management server storing an approval request history file, and the approval request history file including at least an original word or phrase and an approved translation word corresponding to the original word or phrase.

The method includes, in the management server, a request history search step of searching the approval request history file using an original word or phrase and a requested translation word included in translation word approval request information received from a particular client; in response to the same original word or phrase and an approved translation word that is the same as the requested translation word already existing in the approval request history file in the request history search step, a first notification generation step of generating first notification information indicating that an approval has already been made for the same original word or phrase and the same approved translation word for the particular client; in response to the same original word or phrase and a different translation word already existing in the approval request history file in the request history search step, a second notification generation step of generating second notification information indicating that an approval has already been made for the same original word or phrase and the different translation word and asking whether or not consent should be given to the different translation word for the particular client; in response to a response message received from the particular client in response to the second notification information including information indicating that the consent should not be given to the different translation word, a third notification generation step of generating third notification information notifying the original word or phrase and the translation word included in the translation word approval request information and indicating that this request is a re-request to the approver client; and in response to the same original word or phrase not existing in the approval request history file in the history search step, a fourth notification generation step of generating fourth notification information for notifying an original word or phrase included in the translation word approval request information to the approver client.

In order to solve the above problems, the method of controlling a translation support system according to the present invention is a confirmation and control method for a translation word approval request in a translation support system allowing communication between a plurality of clients and a management server, the clients including an approver client operated by an approver, the approver client being configured to store approval request history file including at least an original word or phrase and an approved translation word corresponding to the original word or phrase.

The method includes, in the approver client, a history search step of searching the approval request history file using an original word or phrase and a requested translation word included in translation word approval request information received from a particular client; in response to the same original word or phrase and an approved translation word that is the same as the requested translation word already existing in the approval request history file in the history search step, a first notification generation step of generating first notification information indicating that an approval has already been made for the same original word or phrase and the same translation word to the particular client; in response to the same original word or phrase and a different translation word already existing in the approval request history file in the history search step, a second notification generation step of generating second notification information indicating that an approval has already been made for the same original word or phrase and the different translation word and asking whether or not consent should be given to the different translation word for the particular client; in response to when a response information received from the particular client in response to the second notification information including information indicating that the consent should not be given to the different translation word, a first message generation step of generating a first message for indicating, on a screen of the approver client, the original word or phrase and the translation word included in the translation word approval request information and indicating that this request is a re-request; and in response to the same original word or phrase not existing in the approval request history file in the search step, a second message generation step of generating a second message for indicating, on the screen of the approver client, the original word or phrase and the translation word included in the translation word approval request information.

In order to solve the above problems, the server of a translation support system according to the present invention is a server of a translation support system allowing communication between the server and a plurality of clients via a communication line.

The clients include a request-source client and an approver client, the request-source client being operated by a translator of a request-source requesting to an approver an approval of a translation word of a particular original word or phrase and the approver client being operated by the approver.

The server includes a transfer unit configured to transfer translation word approval request information to the approver client, the translation word approval request information including at least the original word or phrase received from the request-source client; an approval request history storage unit configured to store approval result information at least including: approve-or-reject information in accordance with the translation word approval request information received from the approver client; and an approved translation word that is a translation word corresponding to the original word or phrase; a notification storage unit configured to store notification message information in accordance with the approve-or-reject information; a notification determination unit configured to determine, in accordance with the approve-or-reject information, necessity of notification to the client or clients other than the approver client and determine which piece of the notification message information stored in the storage unit should be notified to each of the clients; and a notification information generation unit for transmitting notification information, in accordance with the determination by the notification determination unit, to the one or more clients for which notification or respective notifications have been determined to be necessary, the notification information containing the notification message information, the original word or phrase, and the approved translation word in accordance with the client or clients for which the notification or the respective notifications have been determined to be necessary.

In order to solve the above problems, preferably, in the server of the translation support system according to the present invention, the translation word approval request information further includes a candidate translation word corresponding to the original word or phrase.

The server further includes a translation word comparison unit configured to compare the approved translation word with the candidate translation word.

The notification storage unit is configured to store a change notification message, the change notification message being a notification message in accordance with a case where it has been determined by the translation word comparison unit that the approved translation word and the candidate translation word are not in agreement with each other.

The notification determination unit is configured to determine that the message to be notified to the request-source client is the change notification message when it has been determined by the translation word comparison unit that the approved translation word and the candidate translation word are not in agreement with each other.

In order to solve the above problems, preferably, in the server of the translation support system according to the present invention, the translation word approval request information further includes a translation word candidate word or phrase corresponding to the original word or phrase.

The notification storage unit is configured to store a change notification message, the change notification message being a notification message in accordance with a case where it has been determined by the comparison unit that a translation word corresponding to the original word or phrase and the translation word candidate word or phrase are not in agreement with each other.

The change notification message further includes display attribute information including at least one of information for specifying a display color of a character, information for specifying a background color of a character portion, information for specifying a typeface of characters, and information for specifying a type of a display attribute.

The notification determination unit is configured to determine that the message to be notified to the request-source client is the change notification message when it has been determined that the translation word candidate word or phrase, a translation word in accordance with the original word or phrase included in approval result information received from the approver client, and the translation word candidate word or phrase are not in agreement with each other as a result of comparison thereof.

The notification information generation unit is configured to generate the notification information that further includes the display attribute information or information for specifying the display attribute when the notification determination unit has determined that the message to be notified to the request-source client is the change notification message.

In order to solve the above problems, the server of the translation support system according to the present invention preferably includes an original text storage unit configured to store an original text for which each translator is in charge of translation; an assignment range storage unit configured to store range information for specifying ranges of the original text for which each translator is in charge of translation; and an original text search unit configured to check whether or not the original word or phrase contained in the approval result information is contained in the original text within the range for which each translator is in charge of translation.

The notification determination unit is configured to determine that the notification information should be notified to the client operated by the corresponding translator in response to the original word or phrase included in the approval result information being contained in the range of the original text for which the translator is in charge of translation as a result of search by the original text search unit.

In order to solve the above problems, the server of the translation support system according to the present invention preferably includes a notification timing storage unit configured to store a desired notification timing of each translator.

The notification information generation unit is configured to generate the notification information in accordance with the notification timing, the notification information notifying the approval information to the client operated by each translator.

In order to solve the above problems, the server of the present invention is a server a translation support system allowing communications via a communication line between a server and a plurality of clients including a memory unit storing at least an original word or phrase contained in an original text as a translation target and a translation word corresponding to the original word or phrase.

The server includes an individual registration information storage unit configured to store each piece of individual registration information including at least the original word or phrase registered by each client and the translation word corresponding to the original word or phrase received from the client; an original text storage unit configured to store an original text to be translated by each client; a translated text storage unit configured to store a translated text received from each client; a corresponding original text search unit configured to search the original text storage unit to check whether or not an original text containing a particular original word or phrase newly individually registered in the individual registration information storage unit exists in the original text storage unit and configured to identify, in units of sentences, the original text containing the newly individually registered particular original word or phrase; a corresponding translated text search unit configured to search the translated text storage unit for a translated text corresponding to the identified original text, check whether or not a translation word corresponding to the newly stored particular original word or phrase exists in the translated text corresponding to the identified original text, and store the identified original text and the translated text corresponding thereto when the translation word corresponding to the translated text corresponding to the identified original text does not exist; an individual translation word search unit configured to search the individual registration information storage unit by using as a key the newly individually registered particular original word or phrase, and search for all of individual translation words corresponding to the newly individually registered particular original word or phrase; a difference/correspondence determination unit configured to determine correspondence or difference of a plurality of the individual translation words when there exists more than one individual translation word; and a display information generation unit configured to generate at least one of display information for indicating, on a display screen of a predetermined client among the clients, the newly registered particular original word or phrase and a plurality of different individual translation words corresponding to the newly registered particular original word or phrase, or display information for indicating the stored and identified original text and a translated text corresponding thereto when the difference/correspondence determination unit has determined that a different translation word exists in the multiple-existent individual translation words.

In order to solve the above problems, preferably, in the server of the translation support system according to the present invention, the individual registration information further includes an original word or phrase registered by each client, a project ID for uniquely identifying a translation project for each translation word corresponding to the original word or phrase, and a translator ID for identifying the translator who registered the individual registration information in the client.

The server includes: a translation word comparison unit configured to compare the respective translation words with one standardized translation word, the standardized translation word corresponding to the project ID, the same original word or phrase and the original word or phrase, which are received from the predetermined client, the respective translation words corresponding to the same original word or phrase and including the project ID received from each client and being stored in the individual registration information storage unit; and a notification information generation unit configured to generate notification information for notifying, to the client having registered the approved translation word and the different translation word, the standardized translation word using the client ID along with the same original word or phrase, the standardized translation word and the project ID when the translation word corresponding to the same original word or phrase registered for each client is different from the standardized translation word.

In order to solve the above problems, the server of the translation support system according to the present invention is a server of a translation support system allowing communication between a server and a plurality of clients via a communication line.

The clients include a request-source client operated by a translator of a request-source requesting to an approver an approval of a translation word of a particular original word or phrase and an approver client operated by the approver.

The server includes a transfer unit configured to transfer translation word approval request information to the approver client, the translation word approval request information including at least an original word or phrase received from the request-source client; an approval request history storage unit configured to store approval result information at least including: approve-or-reject information corresponding to the translation word approval request information received from the approver client; and an approved translation word that is a translation word corresponding to the original word or phrase; a notification storage unit configured to store notification message information corresponding to the approve-or-reject information; a notification determination unit configured to determine, in accordance with the approve-or-reject information, necessity of notification to the clients other than the approver client and determine which piece of the notification message information stored in the storage unit should be notified to each of the clients; a display information generation unit configured to display a notification on a screen of the client for one or more clients for which notification or respective notifications have been determined to be necessary in accordance with the determination of the determination unit, the notification including the notification message information, the original word or phrase, and the approved translation word in accordance with the client or clients for which notification or respective notifications have been determined to be necessary; an original text storage unit configured to store at least an original text portion within an assignment range for which a translator operating the client is in charge of translation; and an original text search unit configured to check whether or not the original word or phrase included in the approval information is contained in the original text portion within the assignment range.

The display information generation unit is configured to generate display attribute information of either one of the original word or phrase and the translation word such that the attribute information of the original word or phrase is different from that of the translation word, depending on a case where the original word or phrase of the approval list information is contained in the original text portion within the assignment range and another case where the original word or phrase of the approval list information is not contained in the assignment original range as a result of the search by the search unit.

In order to solve the above problems, the server of the present invention preferably further includes an approval request history storage unit configured to store at least the translation word approval request information received from the client, an approved translation word, an approval flag indicative of eligibility for approval, and a time of approval indicative of a time at which the approval was made.

The display information generation unit is configured to generate display information for displaying, on a screen of the client, an original display window displaying an original text which should be translated by an operator of the client using the original text within the assignment range and a translation display window displaying the translated text which is the result of nge and another case where the original word or phrase of ceived operation information such that the original and translation display windows are displayed on a single user interface of the client.

The display information generation unit is further configured to generate display information in accordance with the approval flag and the time of approval, the display information displaying, on another user interface of the client, at least one of an approved translation word display window displaying the translation word approval request information that was approved at or prior to a predetermined time, a newly arrived approved translation word display window displaying the translation word approval request information that was approved past the predetermined time period, a request-pending translation word display window displaying the translation word approval request information that is yet to be approved, and a rejected translation word display window displaying the translation word approval request information that has been rejected.

In order to solve the above problems, the server of the translation support system according to the present invention preferably includes an operation information reception unit configured to receive operation information from the clients, the operation information including input information that is input in the clients.

The display information generation unit is configured to generate display information for displaying, on the screen of the client, an original display window displaying an original text which should be translated by an operator of the client using the original text within the assignment range and a translation display window displaying the translated text which is the result of translation of the original text in accordance with the received operation information.

The display information generation unit is further configured to generate display information in accordance with the approval flag and the time of approval, the display information displaying, on the screen of the client, at least one of an approved translation word display window displaying the translation word approval request information that was approved at or prior to a predetermined time, a newly arrived approved translation word display window displaying the translation word approval request information that was approved past the predetermined time period, a request-pending translation word display window displaying the translation word approval request information that is yet to be approved, and a rejected translation word display window displaying the translation word approval request information that has been rejected.

In order to solve the above problems, a control program of the translation support system according to the present invention is a control program of a server of a translation support system allowing communication between a server and a plurality of clients via a communication line.

The control program is configured to cause the server to operate as: a transfer unit configured to transfer translation word approval request information to a client operated by an approver, the translation word approval request information including at least an original word or phrase received from a client operated by a translator of a request-source requesting to the approver an approval of a translation word of a particular original word or phrase; an approval request history storage unit configured to store approval result information at least including: approve-or-reject information corresponding to the translation word approval request information; and an approved translation word in accordance with the original word or phrase received from the client operated by the approver; a notification storage unit configured to store notification message information corresponding to the approve-or-reject information; a notification determination unit configured to determine, in accordance with the approve-or-reject information, necessity of notification to a client or clients other than the client operated by the approver and determine which piece of the notification message information stored in the notification storage unit should be notified to each of the clients; and a notification information generation unit configured to generate notification information for transmitting notification, in accordance with the determination by the notification determination unit, to one or more clients for which notification or respective notifications have been determined to be necessary, the notification information including the notification message information in accordance with the client or clients for which the notification or the respective notifications have been determined to be necessary, the original word or phrase, and the approved translation word in accordance with the original word or phrase.

In order to solve the above problems, a control method of the present invention is a control method of performing collective replacement of a previous translation word in a translated text by a new translation word in a translation support system.

The method includes a first search step of searching the translated text for the previous translation word corresponding to a first original word or phrase; a new translation word entry step of entering a new translation word by which the previous translation word should be changed; a first attribute change step of changing a display attribute of the previous translation word within the translated text corresponding to the first original word or phrase; a first replacement step of replacing the previous translation word within the translated text by the new translation word while maintaining the display attribute; a second attribute change step of changing a display attribute of a second original word or phrase within the translated text; and a second replacement step of replacing the second original word or phrase within the translated text by the previous translation word while maintaining the display attribute.

In order to solve the above problems, the control method of the present invention preferably includes a second search step of checking whether or not the first original word or phrase exists in the translated text; and a third replacement step of replacing the first original word or phrase by the new translation word when the first original word or phrase exists and changing the display attribute of the new translation word to a predefined third display attribute.

The display attributes are changed by the first attribute modification step, the second attribute modification step, and the third replacement step such that the display attributes are different from each other.

In order to solve the above problems, a control program of a replacement control device of the present invention is a control program of collective replacement of a previous translation word within a translated text by a new translation word in a translation support system.

The control program is configured to cause the translation support system to function as: a first search unit configured to search the translated text for the previous translation word corresponding to a first original word or phrase; a new translation word entry unit configured to enter the new translation word by which the previous translation word should be changed; a first attribute change unit configured to change a display attribute of the previous translation word within the translated text corresponding to the first original word or phrase; a first replacement unit configured to replace the previous translation word within the translated text by the new translation word while maintaining the display attribute; a second attribute change unit configured to change a display attribute of a second original word or phrase within the translated text; and a second replacement unit configured to replace a second original word or phrase within the translated text by the previous translation word while maintaining the display attribute.

In order to solve the above problems, a client of the translation support system according to the present invention is a client of a translation support system allowing communications between a server and a plurality of clients via a communication line.

The client includes an original text storage unit configured to store at least an original text portion within an assignment range for which a translator operating the client is in charge of translation; an approval list information generation unit configured to generate approval list information for displaying an approval list on a screen of the client using the approval information received from the server, the approval list including at least an original word or phrase and a corresponding translation word; and a search unit configured to check whether or not the original word or phrase included in the approval information is contained in the original text portion within the assignment range.

The approval list information generation unit is configured to generate display attribute information of either the original word or phrase or the translation word such that the attribute information of at least one of the original word or phrase and the translation word is different from that of another of the original word or phrase and the translation word, depending on a case where the original word or phrase of the approval list information is contained in the original text portion within the assignment range and another case where the original word or phrase of the approval list information is not contained in the original text portion within the assignment range based on the search unit.

In order to solve the above problems, a client of the translation support system according to the present invention is a client of a translation support system allowing communications between a server and a plurality of clients via a communication line.

The client includes an original text storage unit configured to store at least an original text portion within an assignment range of which a translator operating the client is in charge; a translated text storage unit configured to store a translated text corresponding to the original text portion within the assignment range; an approval list information generation unit configured to generate approval list information including at least an original word or phrase and a translation word corresponding to the original word or phrase using the approval information received from the server; an original text search unit configured to check whether or not the original word or phrase included in the approval information is contained in the original text portion within the assignment range; a corresponding translated text search unit configured to extract preceding and subsequent original texts that are away from an original word or phrase of the search hit location of the original text portion within the assignment range by a predetermined number of characters or words and the original word or phrase in an original order of the original text from the original text storage unit and configured to search the translated text storage unit for a translated text portion corresponding to the extracted original text portion when the original word or phrase of the approval list information is included in the original text portion within the assignment range according to the search unit; a similarity determination unit configured to determine similarity of the predetermined number of characters or words extracted from the original text; a classification unit configured to sort, using the determination by the similarity determination unit, the original word or phrase of the search hit location of the original text portion within the assignment range and the original text portion containing a predetermined number of preceding and subsequent characters or words with respect to this original word or phrase, into groups formed by gathering similar original text portions; and a bilingual screen display unit configured to extract the original text portion corresponding to each row of each piece of approval information that has been sorted by the classification unit and the translated text portion corresponding to this original text portion from the original text storage unit and the translated text storage unit, configured to display the extracted original text and the extracted translated text on a display screen of the client such that the original text and the translated text are vertically or horizontally arranged next to each other, and configured to display respective input units adapted to specify the allowability of updating on the basis of the approval list information.

In order to solve the above problems, a client of the translation support system according to the present invention is a client of a translation support system allowing communications between a server and a plurality of clients via a communication line.

The client includes an original text storage unit configured to store at least an original text portion within an assignment range of which a translator operating the client is in charge; a translated text storage unit configured to store a translated text corresponding to the original text portion within the assignment range; an approval list information generation unit configured to generate approval list information including at least an original word or phrase and a translation word corresponding to the original word or phrase using the approval information received from the server; an original text search unit configured to check whether or not the original word or phrase included in the approval information is contained in the original text portion within the assignment range; a corresponding translated text search unit configured to extract preceding and subsequent original texts that are away from an original word or phrase of the search hit location of the original text portion within the assignment range by a predetermined number of characters or words and the original word or phrase in an original order of the original text from the original text storage unit and configured to search the translated text storage unit for a translated text portion corresponding to the extracted original text portion when the original word or phrase of the approval list information is included in the original text portion within the assignment range according to the search unit; a similarity determination unit configured to determine similarity of the predetermined number of characters or words extracted from the original text; a classification unit configured to sort, using the determination by the similarity determination unit, the original word or phrase of the search hit location of the original text portion within the assignment range and the original text portion containing a predetermined number of preceding and subsequent characters or words with respect to this original word or phrase, into groups formed by gathering similar original text portions; and a bilingual screen display unit configured to extract the original text portion corresponding to each row of each piece of approval information that has been sorted by the classification unit and the translated text portion corresponding to this original text portion from the original text storage unit and the translated text storage unit, configured to display the extracted original text and the extracted translated text on a display screen of the client such that the original text and the translated text are vertically or horizontally arranged next to each other, and configured to display respective input units adapted to specify the allowability of updating on the basis of the approval list information.

In order to solve the above problems, the client of the translation support system according to the present invention preferably includes a determination unit configured, in a translation operation for translating the original text portion within the assignment range into a predetermined language, to determine that a different translation word has been selected as a translation word for the particular original word or phrase, the different translation word being different than the approved translation word corresponding to the same original word or phrase of the approval information; and a caution information generation unit configured to generate caution information when the determination unit has determined that the different translation word has been selected, the different translation word being different than the approved translation word corresponding to the same original word or phrase of the approval information, the caution information including a translator ID identifying the operator of the other client or at least one piece of other information identifying the other client, the original word or phrase, the approved word or phrase, and the different translation word, wherein the caution information is transmitted to at least either one of the server and the approver client.

In order to solve the above problems, a control method of a client of the present invention is a control method for a client of a translation support system allowing communications between a server and a plurality of clients via a communication line, the translation support system including an original text storage unit configured to store at least an original text portion within an assignment range for which a translator operating the client is in charge of translation.

The control method includes an approval list information generation step of generating approval list information displayed on a screen of the client, the approval list information including at least an original word or phrase and a corresponding translation word using the approval information received from the server; and a search step of checking whether or not the original word or phrase included in the approval information is contained in the original text portion within the assignment range.

The approval list information generation step generates display attribute information of either the original word or phrase or the translation word such that the attribute information of at least one of the original word or phrase and the translation word is different from that of the other of the original word and the translation word, based on the search step, depending on a case where the original word or phrase of the approval list information is contained in the original text portion within the assignment range and another case where the original word or phrase of the approval list information is not contained in the original text portion within the assignment range.

In order to solve the above problems, a control program of the translation support system according to the present invention is a control program of a client of a translation support system allowing communications between a server and a plurality of clients via a communication line.

The control program is configured to cause the client to operate as: an original text storage unit configured to store at least an original text portion within an assignment range for which a translator operating the client is in charge of translation; an approval list information generation unit configured to generate approval list information including at least an original word or phrase and a corresponding translation word using the approval information received from the server; and a search unit configured to check whether or not the original word or phrase included in the approval information is contained in the original text portion within the assignment range.

The approval list information generation unit is configured to generate display attribute information of either the original word or phrase or the translation word such that the attribute information of at least one of the original word or phrase and the translation word is different from that of another of the original word or phrase and the translation word, based on the search unit, depending on a case where the original word or phrase of the approval list information is contained in the original text portion within the assignment range and another case where the original word or phrase of the approval list information is not contained in the original text portion within the assignment range.

Advantageous Effects of Invention

In accordance with the server and the client of the translation support system, the translation support system, and the program thereof according to the present invention, it is made possible to prevent decrease in the efficiency due to simultaneous operations by more than one translator even in bulky quick-delivery translation projects, which is an advantageous effect of the present invention. Also, it is made possible to perform translation operations while preventing occurrence of unstandardized translation words (which may also be called inconsistent translation) due to simultaneous operations by more than one translator.

BRIEF DESCRIPTION OF DRAWINGS

FIG. 18 is a diagram illustrating a screen juxtaposedly displaying original text portions and translated text portions for memory updating of the translation support system according to the present invention.

FIG. 20 is a diagram illustrating a screen juxtaposedly displaying original text portions and translated text portions that have been divided into groups for memory updating of the translation support system according to the present invention.

FIG. 38 is a diagram illustrating the items of the memory and management files of the translation support system according to the present invention.

DESCRIPTION OF EMBODIMENTS

Preferable embodiments of the present invention are described in detail below with reference to the drawings.

Figure 5:
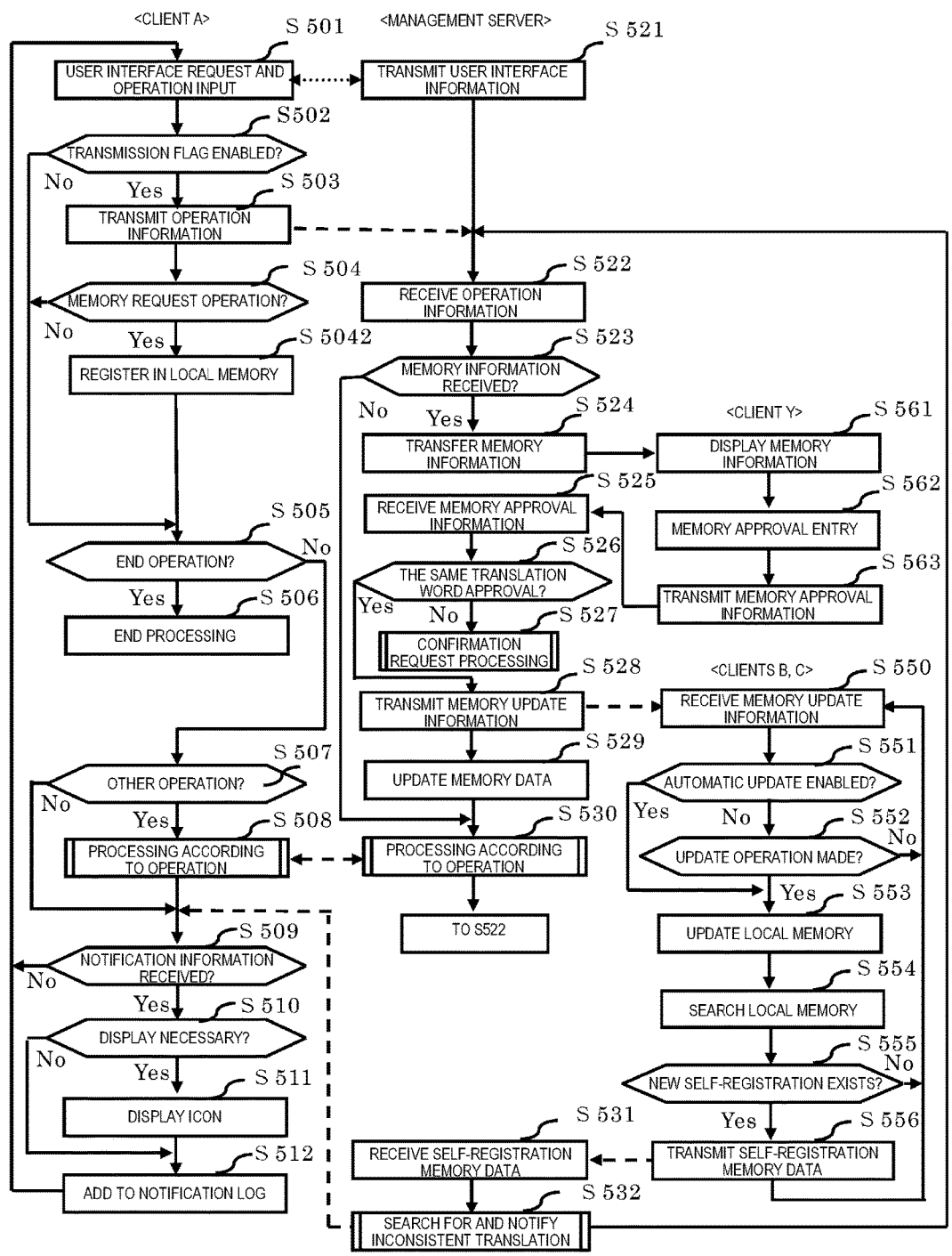
FIG. 5 is a general flowchart illustrating an embodiment of memory data registration processing and memory data collection processing for memory data registered by the individual clients of the translation support system according to the present invention.
Figure 12:
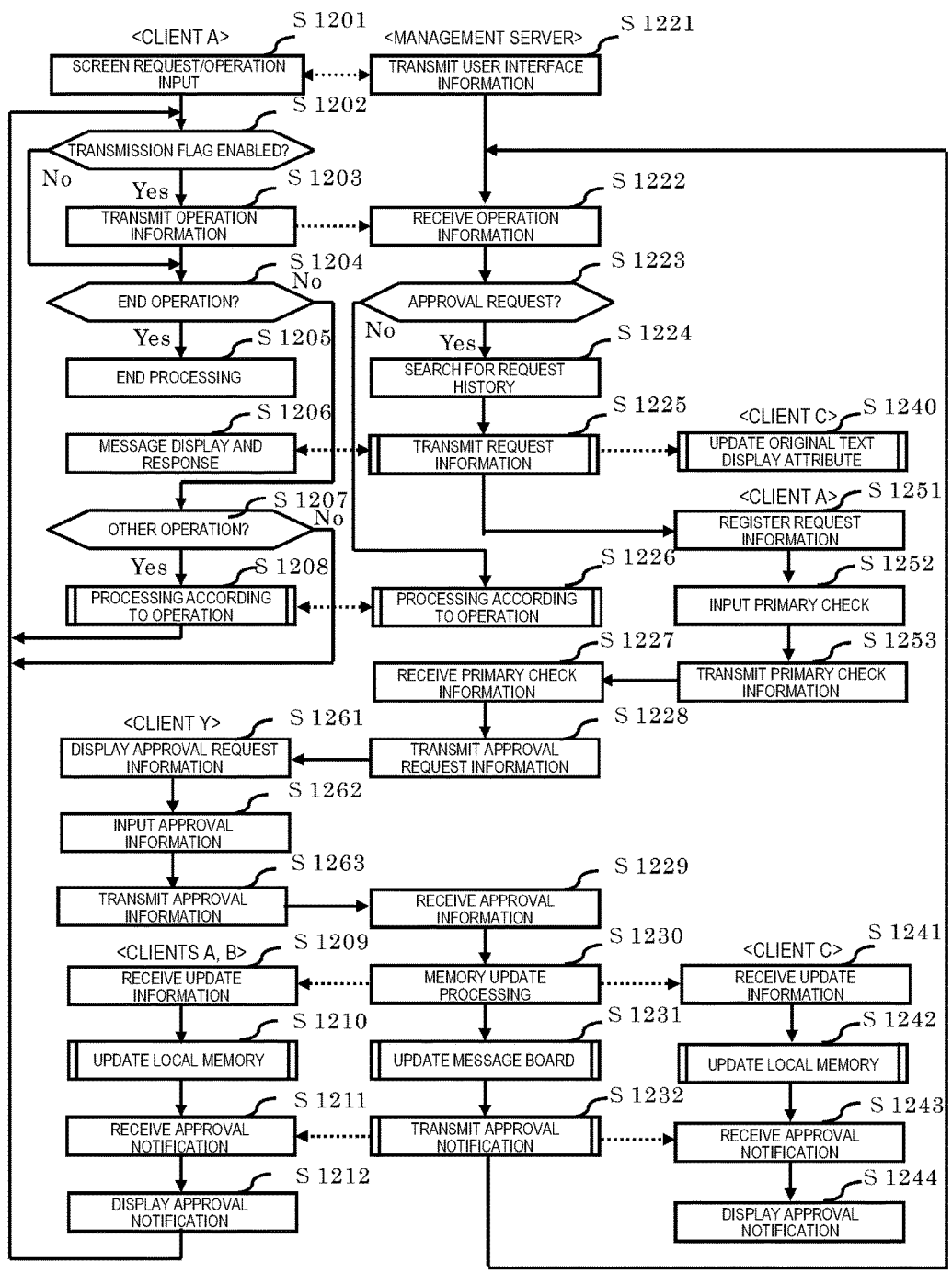
FIG. 12 is a general flowchart illustrating an embodiment of memory data approval request processing and memory data update notification processing input by the client of the translation support system according to the present invention.
Figure 33:
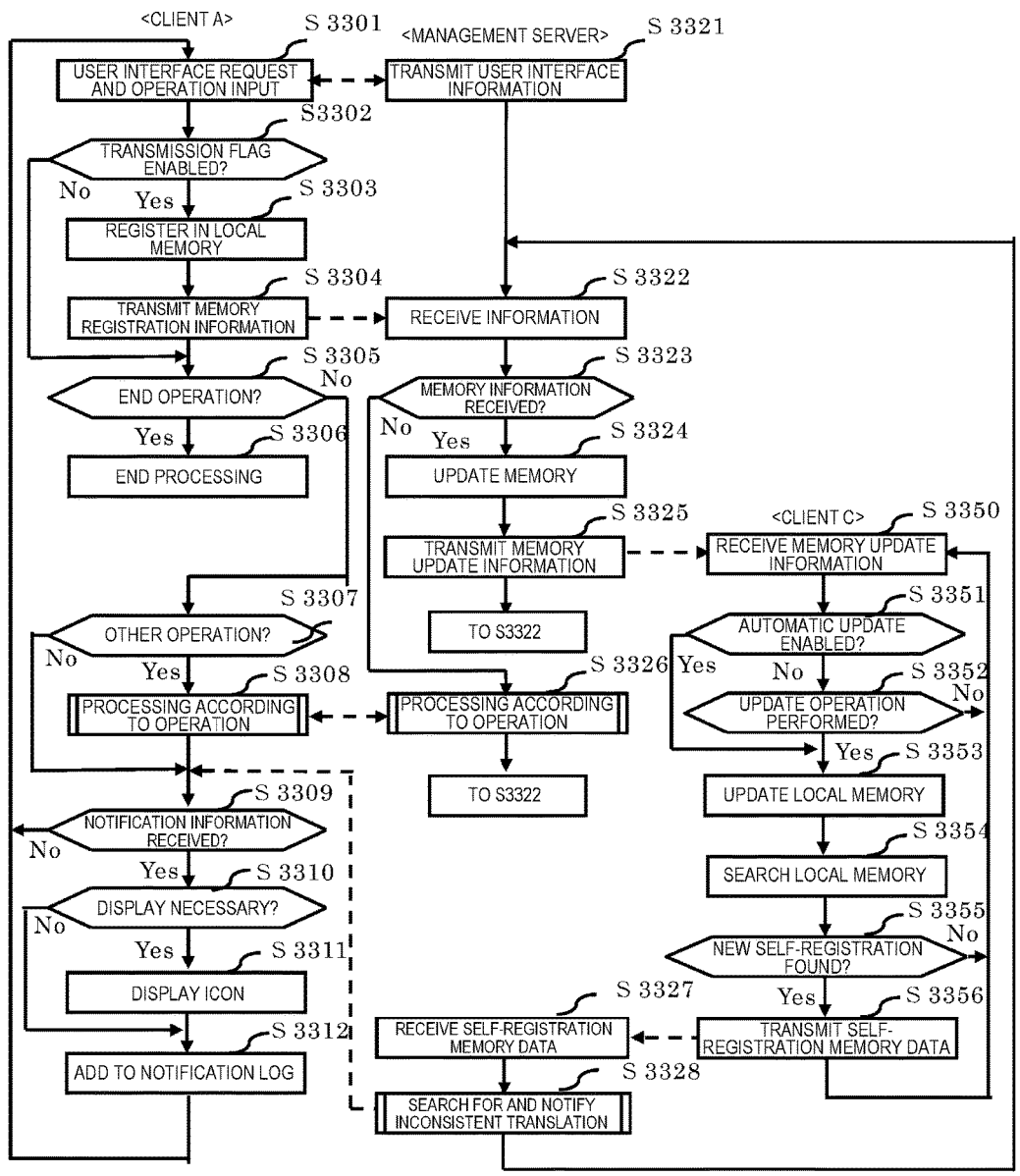
FIG. 33 is a general flowchart illustrating the memory data registration processing and memory data collection processing for memory data registered by individual clients in another embodiment (a case where a primary checker also acts as the approver) of the translation support system according to the present invention.

There are four main flowcharts of the present invention:
1) FIG. 5 is mainly associated with the illustration of approval request processing when a primary checker himself/herself registers translation words and detection processing of detecting inconsistent translation through collection of translation words of translators other than the primary checker with regard to a case where a translation word for a certain original word or phrase is approved by an approver after confirmation by the primary checker also acting as a translator.
2) FIG. 12 is mainly associated with the illustration of approval processing for an approval request of a translation word by translators other than the primary checker with regard to a case where a translation word for a certain original word or phrase is decided by an approver after confirmation by the primary checker.
3) FIG. 33 is mainly associated with the illustration of processing when the approver himself/herself registers translation words, and detection processing of detecting inconsistent translation through collecting translation words of the translators other than the approver with regard to a case where a translation word for a certain original word or phrase is approved by the approver also acting as a translator.

Figure 34:
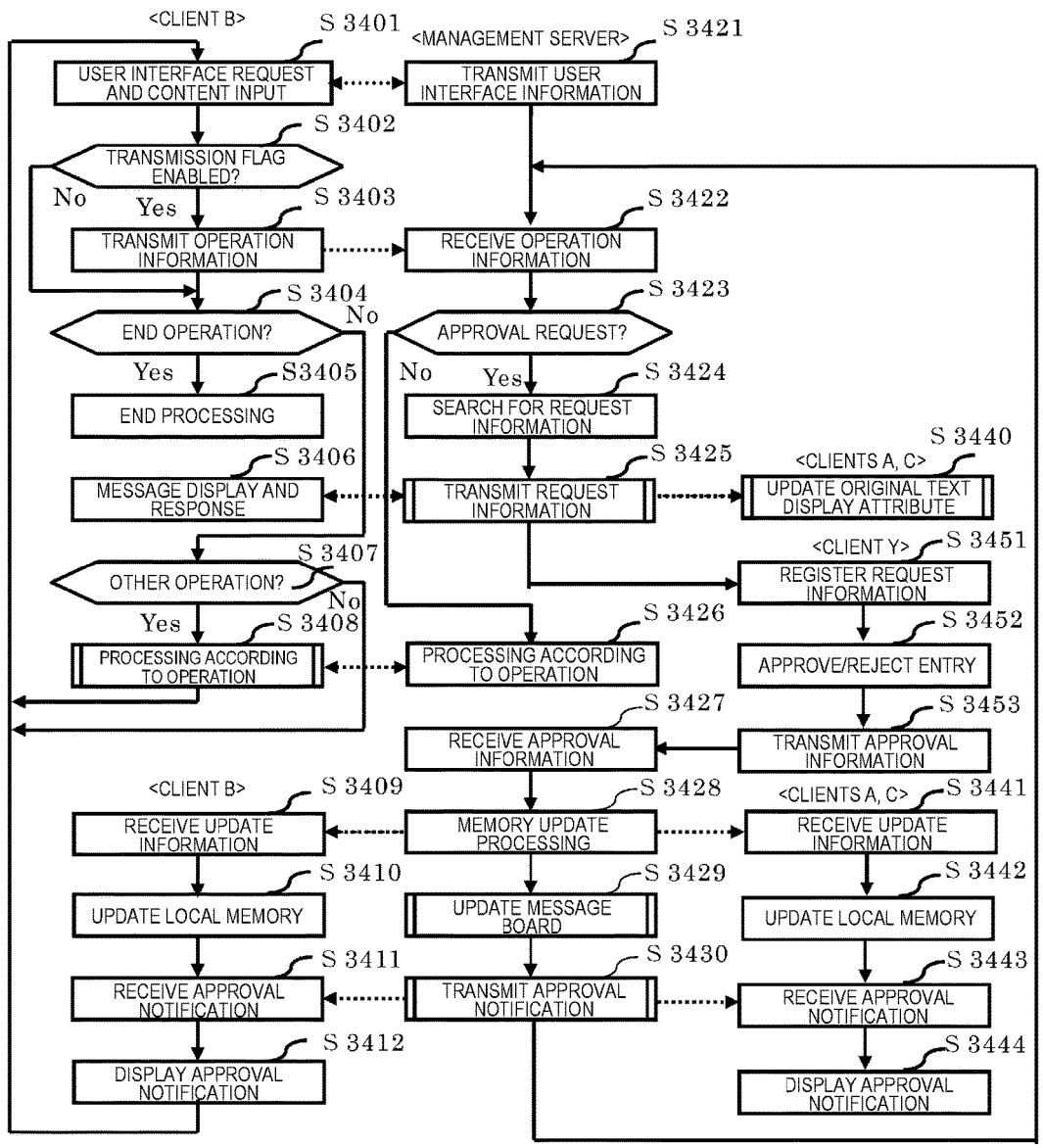
FIG. 34 is a general flowchart illustrating approval request processing for memory data input by a client and memory update notification processing in another embodiment (a case where the primary checker also acts as the approver) of the translation support system according to the present invention.

4) FIG. 34 is mainly associated with the illustration of approval processing for an approval request of a translation word by the translators other than the approver with regard to a case where a translation word for a certain original word or phrase is approved by the approver.

Figure 1:
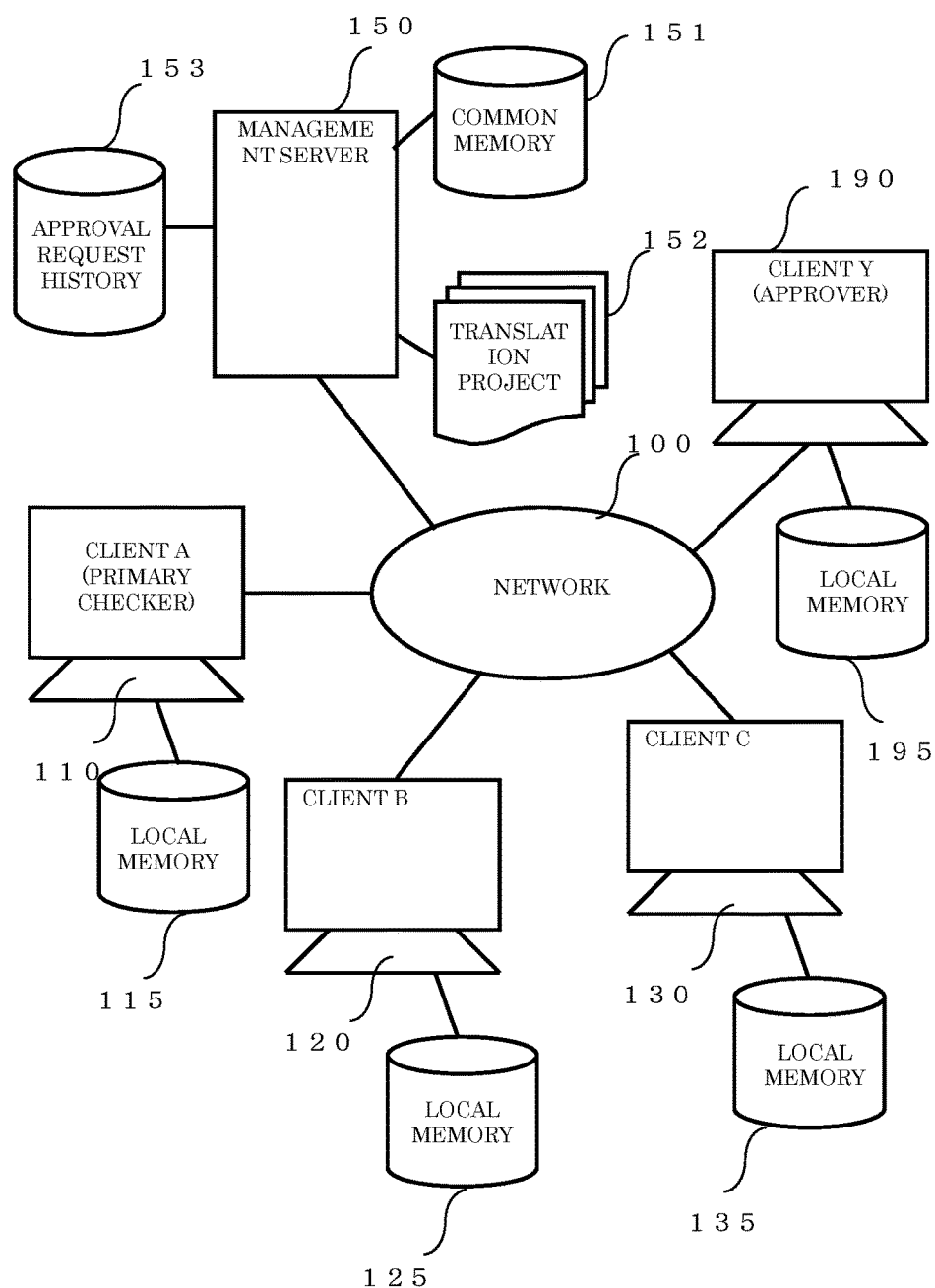
FIG. 1 is a schematic diagram illustrating a system configuration of a translation support system according to the present invention.

FIG. 1 is a diagram that illustrates the system configuration of the translation support system. A client A, a client B, and a client C in FIG. 1 each represent a translator but the number of the clients operated by translators is not limited to these three clients. The number of clients operated by the translators may vary depending upon the scale of translation projects, and clients in the order of several dozens or even several hundreds may participate in a single project in the case of a larger translation project, where the clients may further include a client D, a client E, . . . , and a client X.

(1) Each of client personal computers of the individual translators (for example, the client A, the client B, and the client C), and a client Y operated by the approver are connected via a network 100 such as a LAN or the Internet to a management server 150 using software for clients (for example, dedicated application or browser for the clients) installed in these client personal computers. The clients read memory information, application programs, and a translation file stored in a common memory 151 of storage unit (for example, hard disk 28) of the management server 150. The memory information includes an original word or phrase, a translation word, and a word class. The application programs includes those illustrated by the flowcharts of the later-described FIGS. 5 to 7 and FIGS. 9 to 15, FIG. 17, FIG. 19, FIG. 21, FIGS. 25 to 31, FIGS. 33 to 34, and FIG. 37 (including screen information for displaying screens of application illustrated in FIG. 8, FIG. 16, FIG. 18, FIG. 20, and FIGS. 22 to 24 on a display screen of a display of each client). The translation file includes an original text and a translated text stored for one or more translation project files 152. The clients update the translated text by translation operations.

The term "translation operation" as used herein refers to a task or tasks of using an original text described in a source language; repeatedly replacing words or phrases of the original text by words or phrases of a target language in units of words or phrases of the original text; and creating a translated text described in a target language which has the closest meaning as possible to the meaning of the original text. In this context, the common memory 151 is a memory unit commonly used through the entire project and storing memory data that are approved by the primary checker operating the client A and the approver operating the client Y, the memory data including a project ID, an original word or phrase, a word class, and a translation word. The translation words newly registered in the common memory 151 are notified to all of the translators (i.e., the client A, the client B, and the client C), and each of the translators adds the translation word that has been newly registered in the common memory 151 to the local memory data of the client that this translator himself/herself operates. The primary checker performs primary check of an original word or phrase, a word class, and a translation word that have been requested by another translator, and performs an operation with regard to whether or not the request should be approved or rejected, or should be approved with entry of new translation word. In addition, for example, when translation word search is necessary that requires time and involves investigation regarding the translation word that appeared for the first time in a field of advanced technology, the primary checker may request the approver to perform the translation word search.

In this manner, by virtue of sharing by two persons of the time-consuming approval operation and the translation word search, it is made possible to perform the prompt approval processing as a whole. Also, the primary checker may indicate a plurality of candidates of a translation word and request the approver to perform the translation word search. In particular, at the initial stage of the project, mainly in order to fix the frequently appearing translation words, for example, with regard to part of the beginning section and the claim section, the primary checker himself/herself is frequently involved in the translation operation. Further, as another embodiment, there may be a case where there is no primary checker while the approver and one or more translators are involved. This embodiment may be adopted in a case where relatively small number of translators are involved and the delivery period is not so stringent, or in a technical field where translation words for the technical terms are widely established and the man hours of the translation word search is expected to be relatively small. Further, as required, in order to fix the translation words corresponding to important original words or phrases, there may be a case where the approver issues a request for an external third party to authorize the translation word corresponding to the original word or phrase and based on the response from the external third party, the approver decides the translation words. The processing associated with this aspect will be explained in the context of the other embodiments.

(2) The management server 150 is configured to receive, for example, a request of the client A, register the translation file(s) in a "repository" in the common memory 151 and a plurality of translation project files 152, transmit the information from the repository to the client A. The term "repository" as used herein refers to a stockroom for data (the term "stockroom" is used here as a metaphorical expression of a logical data management section) and is used to centrally manage various kinds of information including translation files of particular translation projects. The translation project files 152 include the duration of the project, IDs of translators taking part in the project, an original file, a translation file, and various management files as illustrated in FIG. 38.

Figure 2:
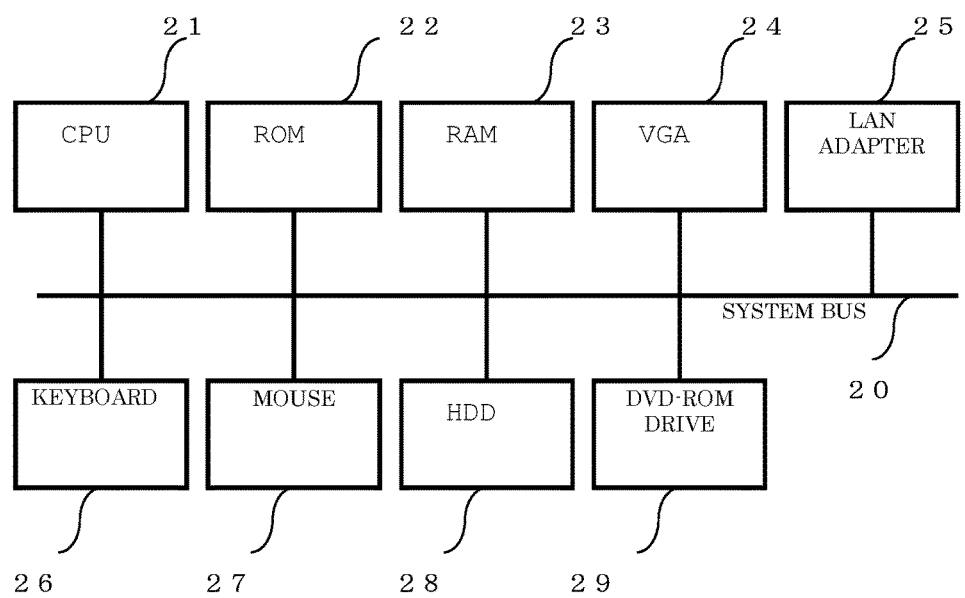
FIG. 2 is a schematic diagram illustrating a hardware configuration of a management server 150 and individual clients of the translation support system according to the present invention.

FIG. 2 is a schematic diagram illustrating the hardware configuration of the management server 150, clients A to C, and a client Y. A CPU 21, a ROM unit 22, a RAM unit 23, a video graphic adapter (VGA) 24, a LAN adapter 25, a keyboard 26, a mouse 27, an HDD 28, and a DVD-ROM drive 29 are connected to each other via a system bus 20 inside of each body. It should be noted that the same reference signs are assigned to the same hardware components within each body and for example, distinctions are made by clarifying the subject using an expression "the CPU 21 of the management server 150" or the like. It should also be noted that any interface section may exist between any one of these components, individual constituent components, and the system bus 20 but such an interface section is omitted in the figures. The CPU 21 controls the entire body of the management server 150 and the individual clients. Specifically, when started, the CPU 21 reads the boot program (boot loader) from the ROM unit 22; performs hardware check and initialization; reads the system program from the HDD 28; loads the system program into the RAM unit 23; and thus starts the operating system (OS). Further, the CPU 21 loads application programs from the HDD 28 into the RAM unit 23 in accordance with the operation by the user and thus executes these application programs.

The ROM unit 22 is configured to store the boot program as mentioned above, and the RAM unit 23, which serves as so-called main memory, is used by the operating system and the application programs, and used as a work area. The VGA 24 is an adapter configured to be connected to a liquid crystal display or a CRT display to provide screen display, and the LAN adapter 25 provides wireless connection or LAN-cable connection to an external network to perform transmission and reception of data. The keyboard 26 and the mouse 27 function as input units for inputting user's operations.

Also, the HDD 28 is configured to store various programs (the operating system, the individual application programs for execution of the flowcharts of the present invention as illustrated in FIGS. 5 to 15, FIG. 17, FIG. 19, FIG. 21, FIGS. 25 to 31, FIGS. 33 to 34, and FIG. 37, and HTML screen information for displaying on the client screen as illustrated in FIG. 16, FIG. 18, FIG. 20, and FIGS. 22 to 24), various tables, approval request history information (detailed information of the approval requests), and the like. The DVD-ROM drive 29 is a drive for reading DVD-ROM and DVD-R discs storing various programs, and is also capable of writing various data or the like in DVD-R discs. It may also be contemplated that the DVD-ROM drive 29 is a BD drive that can read and write data from/to a Blu-ray disc.

The operating system 34 (OS) such as Windows® is installed in a storage unit (for example, the hard disk 28 and a not-shown flash memory device) of the hardware (including firmware) of the personal computer of each client. Basic dictionary data which is a set of various dictionary files such as electronic dictionaries, bilingual glossaries, scientific and technological word dictionaries available from various companies are also stored in the hard disk 28 along with a browser and individual programs on the client side of the application programs. The basic dictionary data is stored in the hard disk 28 along with setting information given by each translator in accordance with the field of the translation original text, with priorities of search at the time of determination of the translation words defined as appropriate.

In a normal state, the common memory 151 is in the first place in the ranking. The local memory 115 including the original word or phrase and the translation word thereof that each translator added on his/her own account in is in the second place in the ranking. The basic dictionary data is in the third or lower place in the ranking. Given this setting information, even when search is performed with the first-place common memory's original word or phrase, the second-place local memory is searched as long as the corresponding original word or phrase does not included in the first-place memory. When any hit resulted, the translation word is read into the work area of the RAM unit 23 along with the original word or phrase and used by the application programs. The basic dictionary data is used in the search for candidates of the word or phrase to be registered in the translation memory at the time of the translation operation, and also referred to in the course of search to check whether or not the translation word corresponding to the original word or phrase exists in the translated text.

Under the control of the CPU 21 of FIG. 2, at the time of start-up, for example, reading and execution are performed from the main memory unit of the personal computer constituted by the RAM unit 23. The runtime 32 is, as part of the application programs, read from a storage unit such as the hard disk 28 onto the main memory unit such as the RAM unit 23 and thus executed under the control of the CPU 21 as needed at the time of execution. This is the end of the explanation of FIG. 2.

FIG. 38 is a diagram illustrating data items and exemplary data of the memory units and the management files used in the translation support system according to the present invention. The local memory data can be defined as my dictionary file used in the client operated by each translator. As the data items for the dictionary, word classes such as noun (n), verb (v), and adjective (a); original words or phrases; translation words corresponding to these original words or phrases; the registration dates of the word class, the original word or phrase, and its translation word of the corresponding row of the memory data; the latest dates of use, and classifications are stored in the local memory. As this local memory, the one that is designated at the beginning of the project may be used. Meanwhile, it may also be possible to use a local memory of the second place in the priority ranking which the translator personally has been using and which is appropriate for the project of this time. In use, the time (hour, minute, and second) as well as year, month, and date are recorded as the date and time of use (in the example date of FIG. 38, year, month, and date are illustrated). An "L" is stored as the classification when the translator himself/herself has performed the registration while an "M" is stored when updating has been performed by downloading from the common memory.

Further, a project ID and a memory ID are included as data items for management. The project ID is a unique number assigned to each translation project. The memory ID is a unique number for uniquely identifying the local memory unit used by each translator within the entire system. Each translator is allowed to have one or more local memory units and use them independently. The local memory data is stored in the hard disk 28 of each translator and uploaded as appropriated to the management server 150. Details will be later explained with reference to the flowchart.

Next, the common memory 151 of FIG. 38 is a memory unit commonly used for the entire project and approved by the approver. The translator ID of this approver is stored in the common memory 151. Specifically, the approver, upon request from the other translators, confirms the original word or phrase, the word class, and the translation word that have been subjected to the primary check by the primary checker (to accept or reject) and performs operation for determining whether to make a final approval the request, reject the request, or make a final approval with modification made to the translation word. Next, the management file 1) stores the project ID or IDs, the translator IDs of all of the translators taking part in the project except for the approver, a start page, a start paragraph, a start sentence number, an end page, an end paragraph, and an end sentence number which indicate the beginning and the end of the range of the original text of which each translator is in charge.

In place of this management file 1), the following may also be contemplated.

A) Methodology may be contemplated according to which: the original file is split into a plurality of files of the same number as that of the translators; the file name thereof is given for example as "project ID_translator ID.doc;" and, in this manner, the file names as such identify the original text segments of which individual translators are respectively in charge.

B) Alternatively, another methodology may also be contemplated according to which: the original file is split into a plurality of files of the same number as that of the translators; the file names of the split original files may be defined as appropriate, and a table associating the translator ID with this original file name is stored in the hard disk 28. The methodology is not limited to these approaches A) and B) and any approach may be adopted as long as it facilitates identification of assignment ranges of the individual translators.

Next, the management file 2) stores the project ID or project IDs and types (indicating the types of the translators, where CT is assigned to the primary checker, ET is assigned to an expert translator, and NT is assigned to a less experienced translator). Further, a translation completion page and a translation completion sections in terms of the original text are estimated using the paragraph number and the number of bytes of the translated text that is periodically uploaded to the management server 150. The progress rate (percentage) of the translation is calculated using the translation completion page and a translation completion line. The status (faster than the standard: AD, approximately equivalent to the standard: NM, and delayed relative to the standard: LT) is calculated and stored therein. The faster, equivalent, or delayed status is calculated based on the total volume to be translated and the total volume for which the translation has already been completed, for example, with the standard case being assumed that, in a case of 10-day-long translation project, the translation is completed in about 60 percent (six days) of ten days, revision for each translator is completed in 20 percent (two days) of the same ten days, and the consistency check for the entire translated text is performed in the remaining 20 percent of the total number of days. The management file 3) stores the project ID or IDs; the memory IDs; priorities given to individual memory units; the source word indicative of the original word in the original text; the target word indicative of the corresponding word (that corresponds to the original word) of the translated text; "Field" indicative of the technical field(s); start dates of respective memories; and statuses indicative of being used (V) or unused (W).

Further, the other files of the management files are explained. These files are stored in the translation project file 152 of the management server 150 in groups of the project IDs.

(1) The file formats that can be processed by the translation support system of this embodiment include, for example, MS-Word (doc) used by word-processing software of Microsoft Corporation, HTML used by various browsers, and text, in addition to which Adobe Systems' PDF® (Portable Document Format), Microsoft Corporation's XPF (XML Paper Specification) format, and another format, i.e., ODF (Open Document Format) can be used.

(2) A manuscript file read into translation assistance application of the translation support system of this embodiment can be stored in the translation project file 152 dedicated for this translation support system. The translation project file 152 is constituted by a "translation file" retaining translation results including the original text and the translated text, "translation memory" retaining translation memory data, and an "authentication file" for authentication.

(3) In addition, a log file that stores a translator ID and operation time of the translator who performed the translation operation in the course of the translation; a header file that stores header information of chapters, sections, and the like of the translated text; a history file that stores data resulting from registering new translation word in the memory in the course of the translation operation, performing collective replacement of a portion of the original text by translation word candidates that have been read from the memory, or performing normal individual replacement of the portion of the original text; and a translation comment file that stores translation comments entered in the course of the translation are stored (in the translation project file 152) such that that they can be read as appropriate, displayed on the screen, and/or printed out.

Figure 3:
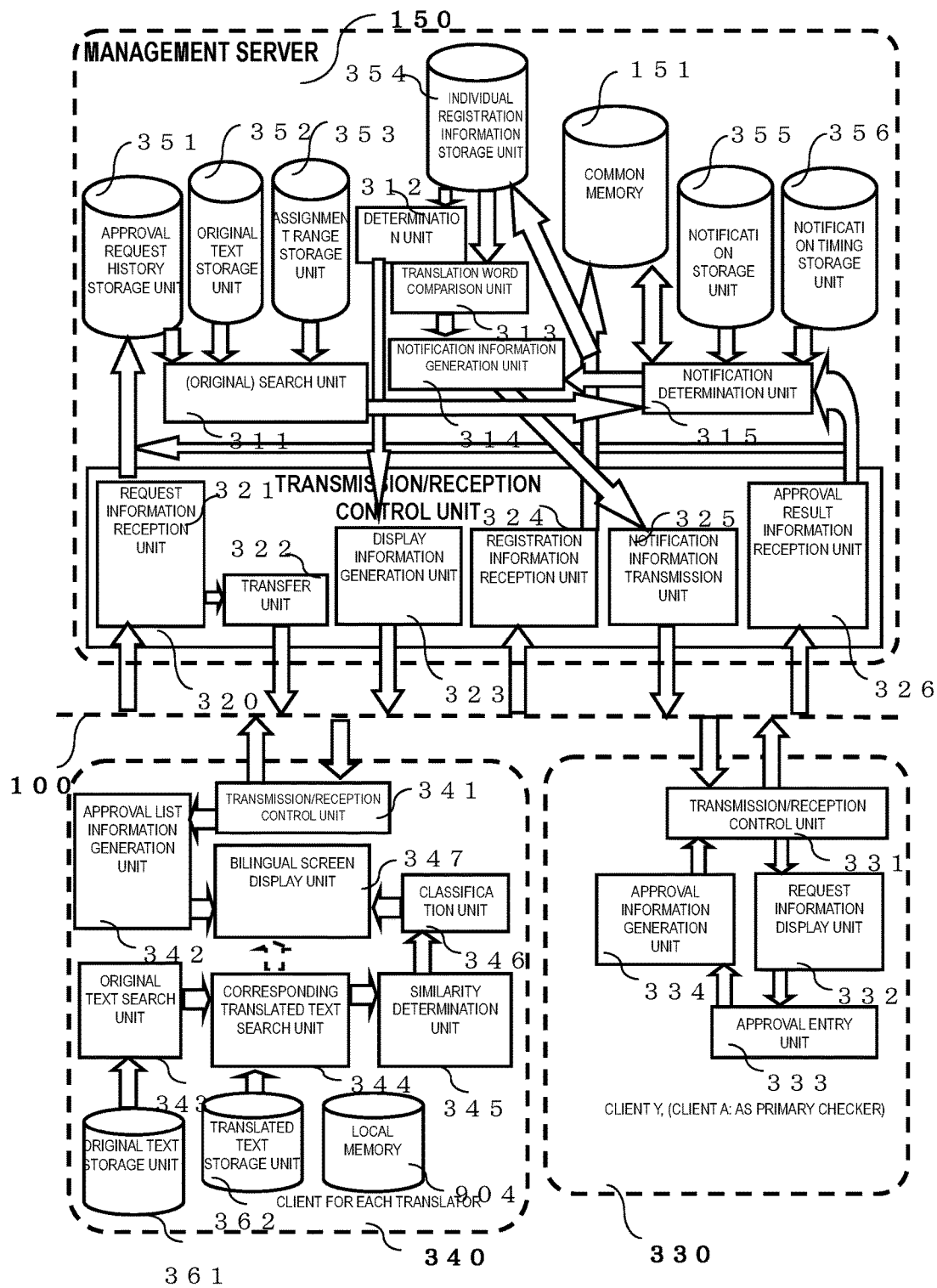
FIG. 3 is a schematic diagram illustrating a first half of a functional block of the translation support system according to the present invention.

FIG. 3 is a schematic diagram that illustrates the functional blocks of the translation system according to the present invention. Some of the "units" of respective blocks correspond to the constituent features ("units") of the scope of claims. Outline of the operations of the respective functional blocks is explained below. The broken line horizontally extending at the central region of FIG. 3 represents the network 100. In other words, exchange of information between the management server 150 and the client 340 for each translator (the client B and the client C) and exchange of information between the management server 150 and the client 330 for the approver (the client A and the client Y), unless otherwise indicated, all take place via the network 100. Details are explained by the flowcharts and screens of FIG. 5 and the other figures that follow.

First, the management server 150 receives request information from the client 340 of each translator via an approval information reception unit 321 of a transmission/reception control unit 320, the request information including an original word or phrase and a candidate translation word corresponding to this original word or phrase. The management server 150 stores the received request information in an approval request history storage unit 351. The request information is sent to a transfer unit 322 and transmitted from the transfer unit 322 to the client A. Next, the management server 150 refers to the approval request history storage unit 351 and an original text storage unit 352 and performs search by a search unit 311 to check whether or not the original word or phrase of the request information received this time is contained in the translation assignment range, and delivers not only the search result but also a search result from an assignment range storage unit 353 to a notification determination unit 315. The notification determination unit 315 reads appropriate notification content for the translator to be notified from a notification storage unit 355, delivers the notification content to a notification information generation unit 314, integrally taking into consideration whether or not a request has already been made with the same original word or phrase; whether or not the original word or phrase of the request information of this time is contained in a range of the original text for which each translator is in charge of translation; whether or not the approved translation word agrees with the candidate translation word included in the request information of this time; and whether or not another notification timing of each translator has arrived as identified with reference to a notification timing storage unit 356, and thus the search results are transmitted from a notification information transmission unit 325 to the notification-target client.

The content of the notification is displayed on the display screen (an individual window or a display field of a tab) of each client which received the notification. The content of the notification is either the approval result information (approved on an as-is basis; approved with a different approved translation word; or rejected (not approved)) of the original word or phrase and a candidate translation word corresponding to this original word or phrase, or includes a message (already approved with the same original word or phrase and the same approved translation word; already approved with the same original word or phrase but with different approved translation word, etc.) for the approval request.

Also, when the client 340 for each translator registers an original word or phrase and translation word corresponding to this original word or phrase in a local memory 940, the registration information including the original word or phrase and the translation word corresponding to this original word or phrase is transmitted from a transmission/reception control unit 341 to the management server 150, and the registration information including the original word or phrase and the translation word corresponding to this original word or phrase from the registration information reception unit 324 of the management server 150 is stored as individual registration information in an individual registration information storage unit 354. In this manner, the individual registration information storage unit 354 can be regarded as a unit that stores in the management server 150 the data of the local memory 940 of the client operated by each translator as individual registration information on a per-translator basis. It should be noted that the local memory 940 as used herein generically represents the local memory units or data of the individual clients, where any one of the local memory units of individual clients will be identified by the reference signs appearing in FIG. 1.

The translation words stored in the individual registration information storage unit 354 is subjected to comparison by the determination unit 312 by using the original word or phrase as a key. When a different translation word has been registered by the translator with regard to the same original word or phrase, then inconsistent translation warning information is generated by the display information generation unit 323, the inconsistent translation warning information including: the corresponding original word or phrase; the respective translation words; and the translator ID. A transmission/reception control unit 320 transmits the warning information to the client A110 and the warning information is displayed on a screen of the client A110, and, when the standardized candidate translation word is entered, then the entered standardized candidate translation word and the original word or phrase are transmitted to the management server 150 and transferred to the client Y190 operated by the approver. The management server 150 receives, by the registration information reception unit 324, approval information sent in reply from the client Y190, the approval information including the standardized translation word. After that, the approval information is added to the common memory 151 and the individual registration information storage unit 354. Further, the translation word corresponding to the original word or phrase individually registered by each translator and residing in the individual registration information storage unit 354 is searched for by using the original word or phrase of this approval information as a key. A translation word comparison unit 313 compares the translation word with the standardized translation word of the approval information corresponding to this original word or phrase. When they are not in agreement with each other, then notification information is generated by the notification information generation unit 314, the notification information including: the original word or phrase individually registered; the individually registered translation word that does not agree with the standardized translation word; and the standardized translation word. The notification information is transmitted from the notification transmission unit 325 of the management server 150 to the client operated by the translator whose translation word does not agree with the standardized translation word.

Meanwhile, the approval request information is stored via the approval information reception unit 321 of the management server 150 in the approval request history storage unit 351, the approval request information including: an original word or phrase; a translation word corresponding to this original word or phrase added to the local memory 940 (more specifically, the local memory 115) by the client A operated by the primary checker. Further, this approval request information is transferred via the transfer unit 322 to the client Y operated by the approver, and the registration information transmitted in reply from the client Y to the management server 150, after having been received by an approval result information reception unit 326, is stored via the notification determination unit 315 in the common memory 151. In the meantime, the notification determination unit 315 determines that the word or phrase is a newly approved word or phrase, and the notification information generation unit 314 generates new approval information. The new approval information is transmitted from the notification information transmission unit 325 to the client for each translator.

When the client 340 for each translator receives the approval information from the transmission/reception control unit 341, the client 340 stores the received approval information in the work area of the RAM unit 23 and delivers the approval information to an approval list information generation unit 342. The approval list information generation unit 342 generates display information for displaying approval list information on the screen of the client 340 for each translator and stores the display information in the work area of the RAM unit 23.

Also, a search unit 343 is configured to search an original text storage unit 361 by using as a key the original word or phrase included in the received approval information stored in the RAM unit 23; reads all of the original text portions at the hit locations in units of paragraph numbers or sentences identified by the paragraph number and the sentence number; stores the original text portions in the work area of the RAM unit 23; and delivers the original text portions to an extraction unit 344. The extraction unit 344 is configured to extract all of the translated text portions corresponding to the extracted original text portions on the basis of the paragraph numbers and the sentence numbers from a translated text storage unit 362, and store the translated text portions in the work area of the RAM unit 23. With regard to the locations for which extraction in units of sentences was not successful, the entire paragraph is extracted and stored in the work area of the RAM unit 23, and the entire paragraph is delivered to a similarity determination unit 345. The similarity determination unit 345 is configured to determine correspondence or difference of the pairs of the extracted original text portion and the translated text portion (each extracted in units of paragraphs or in units of sentences), respectively. Specifically, a predetermined word that precedes and/or follows the original word or phrase (for example, two words) or predetermined characters (for example, four characters) are subject to the comparison, and the same group ID is assigned to the same words or phrases and they are stored in the work area of the RAM unit 23 and delivered to a classification unit 346.

The classification unit 346 is configured to sort the pairs of the original word and the translation word by the group IDs, classify the pairs by the group IDs, and store the pairs in the work area of the RAM unit 23. A bilingual screen display unit 347 is configured to generate bilingual display information and display the bilingual display information on the screen using the pairs of the original word and the translation word stored in the work area of the RAM unit 23 and sorted in order of appearance within those having the same group ID and also using the approval list information, the bilingual display information being constituted by: one original word or phrase of the approval list information; and a pair of the original word and the translation word grouped and sorted within the group corresponding thereto. It may also be contemplated that the determination of the correspondence or difference of the preceding and succeeding words or phrases is not performed and the preceding and succeeding words or phrases are delivered from the corresponding translated text search unit 344 to a bilingual screen display unit 347 via the work area of the RAM unit 23, by virtue of which the comparison display of the original text and the corresponding translated text may be simply provided in units of the approved original words or phrases in order of appearance.

Finally, the client Y330 stores the request information, which has been received via a transmission/reception control unit 331, in the work area of the RAM unit 23, delivers the request information to the request information display unit 332, and displays on the screen the request information including the original word or phrase and the candidate translation word(s). An approval entry unit 333 is configured to detect entry of approval/rejection entered on this screen or entry of the approved translation word, and register the original word or phrase and the approved translation word corresponding to this original word or phrase in the local memory 115. In addition, the approval entry unit 333 is configured to store the entered input information in the work area of the RAM unit 23, and deliver the input information to an approval information generation unit 334. The approval information generation unit 334 is configured to generate approval information to be transmitted to the management server, store the approval information in the work area of the RAM unit 23, and deliver the approval information to the transmission/reception control unit 331. The transmission/reception control unit 331 is configured to transmit the approval information to the management server 150. The management server receives the approval information via the approval result information reception unit 326 and registers the approval information in the common memory 151. In addition, the management server delivers the approval information to the notification information generation unit 314. Approval notification information is generated and transmitted to the clients for the individual translators via the notification transmission unit 325. This is the end of the summary explanation of FIG. 3.

Figure 4:
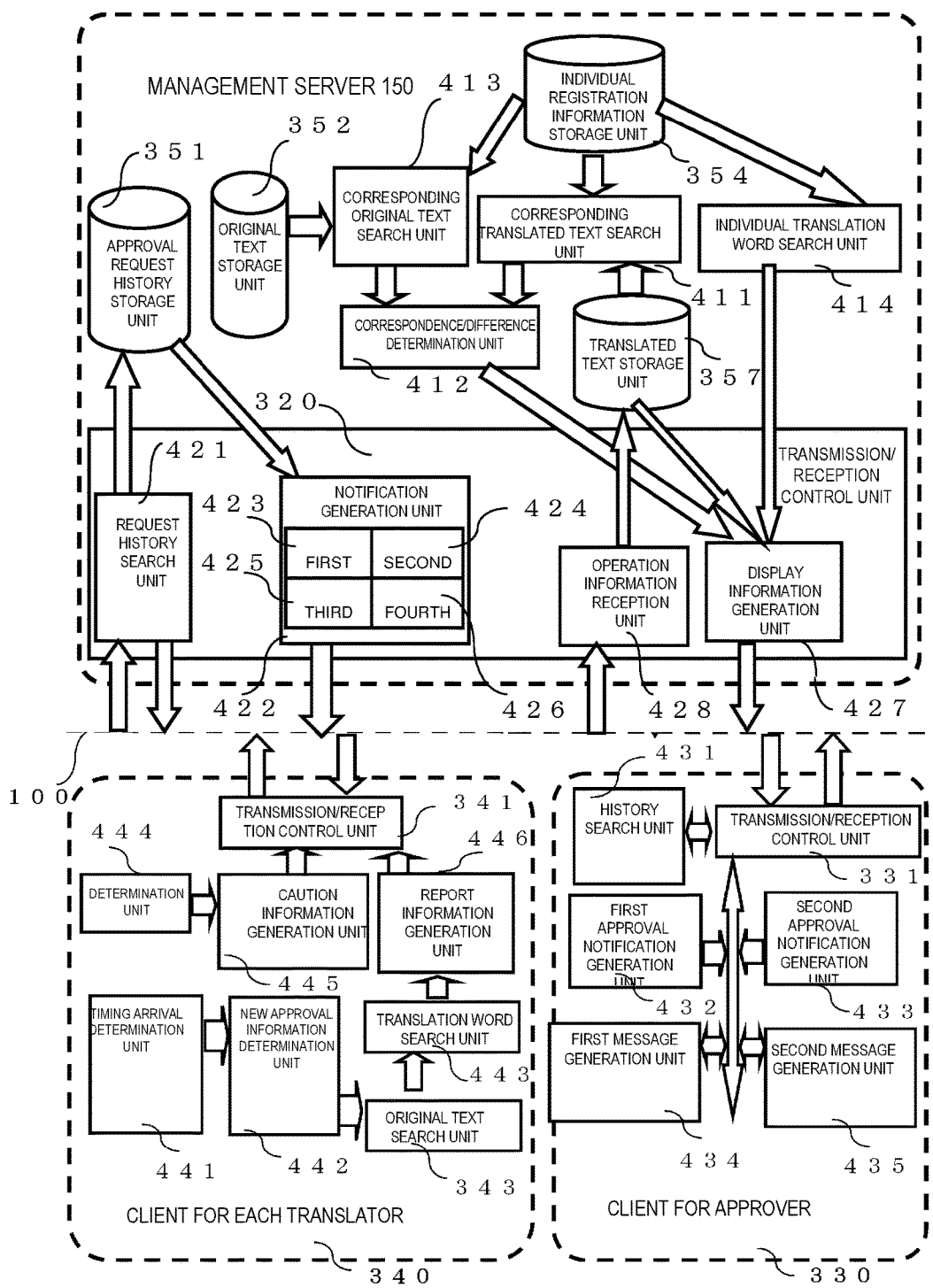
FIG. 4 is a schematic diagram illustrating a second half of the functional block of the translation support system according to the present invention.

FIG. 4 is explained below. FIG. 4 is a functional block diagram similar to that of FIG. 3 and functions that cannot be depicted in FIG. 3 are depicted in FIG. 4 as a separate figure. Each of the hardware components of the translator client 340, the approver client 330, and the management server 150 is identical with those depicted in FIG. 3. First, a determination unit 444 of the client 340 for the translator is configured to determine whether or not the translator client 340 has selected the approved translation word in the course of selecting a translation word for a certain original word or phrase during its translation operation. When it has been determined that the client 340 selected any word other than the approved translation word, then a caution information generation unit 445 generates caution information. The caution information includes: at least one of the translator ID and other pieces of information identifying the other client; the original word or phrase; the approved word or phrase; and the different translation word. The caution information generation unit 445 is configured to transmit the generated caution information to the management server 150. The management server 150 receives this caution information by the approval information reception unit 321 of FIG. 3, and transfers the caution information from the transfer unit 322 to the client Y. Details of this processing are explained with reference to FIG. 28.

Next, a timing arrival determination unit 441 of the client 340 for the translator of FIG. 4 is configured to determine whether or not predetermined confirmation timing has been reached. When it has been determined that the predetermined confirmation timing was reached and it has been determined in the above new approval information determination step that new approval information exists, then a new approval information determination unit 442 determines whether or not approval information has been newly received. When it has been determined in the above timing arrival determination unit 441 that the predetermined confirmation timing was reached and it has been determined by the above new approval information determination unit 442 that the new approval information exists, then the original text search unit 343 performs search to check whether or not the original word or phrase included in the new approval information is contained in the original text portion which should be translated by the operator of the particular client. A translation word search unit 443 is configured to check whether or not the approved translation word included in the new approval information is included in a translation file in the translated text storage unit 362 that has been translated by the operator of this translator client. When the original word or phrase is contained in the original text portion that the operator of this client should translate and the approved translation word is not included in the translation file that has been translated by the operator of the above particular client, then a report information generation unit 446 generates report information including information indicative of the fact that the above approved translation word is not included in the above translation file that has been translated by the operator of the above particular client, and the report information is transmitted via the management server 150 to the client Y operated by the approver. Details of this processing will be later explained with reference to FIG. 26.

Next, in the management server 150, when a request history search unit 421 receives translation word approval request information from the particular client, searches the approval request history storage unit 351 for the approval request history file using the original word or phrase and the requested translation word included in the searched request history. As a result of the search by the request history search unit 421, when the same original word or phrase and the same approved translation word that is identical with the requested translation word already exist in the approval request history file, then first notification information is generated by a first notification generation unit 423 in the notification generation unit 422, the first notification information indicating that an approval has already been made for the particular client with the same original word or phrase and the same approved translation word, and this first notification information is transmitted to the particular client. Next, as a result of the search by the request history search unit 421, when the same original word or phrase and a different translation word exist in the approval request history file, then second notification information is generated by the second notification generation unit 424 in the notification generation unit 422, the second notification information indicating that an approval has already been made for the particular client with the same original word or phrase but with the different translation word and asking whether or not a consent should be given to this different translation word. The second notification information is transmitted to the particular client to wait for a response which will be sent in reply. Next, when a response message received from the particular client in response to this second notification information includes information indicating that consent should not be given to this different translation word, then third notification information is generated by the third notification generation unit 425 in the notification generation unit 422. The third notification information refers to information to be notified to the client Y190 operated by the approver for notifying the original word or phrase and the translation word included in the translation word approval request information and notifying the fact that the request at issue is a re-request. The third notification information is transmitted to the client Y330. Further, as a result of the search by the above request history search unit 421, when the same original word or phrase was not found in the above approval request history file, then fourth notification information is generated by a fourth notification generation unit 426 in the notification generation unit 422 and transmitted to the client Y330. The fourth notification information refers to information to be notified to the approver client Y330 for notifying the original word or phrase included in the translation word approval request information. Details of this processing are explained by the flowchart of FIG. 13.

The request history search for this approval request can also be executed by the client Y. The client Y may directly receive the translation word approval request information from the translator client via the transmission/reception control unit 331, or may in a similar manner receive the translation word approval request information via the management server 150. The approval request history of the approval requests having the same project ID is searched for by the history search unit 431 by using as a key the original word or phrase and the requested translation word included in the received translation word approval request information. The search targets may be the approval request history storage unit 351 of the management server 150 or may also be an approval request history file of a hard disk 28 of a not-shown client Y330. In accordance with the result of the search for the approval request history, in the same or similar case result as explained above, the first approval notification generation unit 432 generates the first approval notification, and the second approval notification generation unit 433 generates the second approval notification, and the notification is transmitted directly to the particular client that has made the request or via the management server 150. In the case of a re-request, since the client Y is the approver client, a first message is generated in place of the above-mentioned third notification by the first message generation unit 434 and displayed on the screen of the client Y, the first message including: a message to the effect that this request is a re-request; original word or phrase; and the requested translation word, etc. In a similar manner, in a case of a new request, a second message is generated in place of the fourth notification by the second message generation unit 435 and displayed on the screen of the client Y, the second message including: a message to the effect that this request is a new request; the original word or phrase; and the requested translation word, etc.

Further, the management server 150 is also configured to perform search processing to search for inconsistent translation, the outline of which is explained below. When individual clients register original words or phrases, word classes, and corresponding translation words in their respective local memory units, these pieces of individual registration information are transmitted as appropriate to the management server and stored in the individual registration information storage unit 351 respectively storing individual registration information, the individual registration information including at least an original word or phrase and the translation word corresponding to the original word or phrase individually registered by each client, which has already been described. The management server 150 also has an original text storage unit 352 adapted to store the original text portions which the individual clients should translate and a translated text storage unit 357 adapted to store the translated text portions received from the individual clients. The frequency of transmissions of the individual registration information may vary depending on frequency of connections to the network such as being always connected to the network and being connected only once a day. In an always-on connection environment, the frequency of transmission may, for example, be once for every five to ten minutes. When the frequency of connections is five times or less for one day, then the individual registration information will be transmitted every time a connection is made. The determination of this frequency of connections is performed by referring to the network connection logs.

A corresponding original text search unit 413 is configured to check whether or not the original text containing the particular original word or phrase newly individually registered in the individual registration information storage unit for a certain translator exists in the original text storage unit 352, where the original text all the translators including the other translators should translate is stored in this original text storage unit 352, and configured to identify the original text containing the newly individually registered particular original word or phrase in units of sentences and store the identified original text in the work area of the RAM unit 23. Next, from the translated text storage unit 357, the corresponding translated text search unit 411 searches the translated text storage unit 357 for the translated text corresponding to the identified original text, and performs search to check whether or not the approved translation word corresponding to the newly stored particular original word or phrase exists in the translated text corresponding to the identified original text. When the approved translation word does not exist that corresponds to the translated text corresponding to the identified original text, then the corresponding translated text search unit 411 stores the identified original text and the corresponding translated text in the work area of the RAM unit 23.

Next, an individual translation word search unit 414 is configured to search the individual registration information storage unit 354 using as a key the above newly individually registered particular original word or phrase, and search for all of the individual translation words corresponding to the newly individually registered particular original word or phrase and stores the individual translation words in the work area of the RAM unit 23. Next, when there is more than one individual translation word, a difference/correspondence determination unit 412 determines correspondence or difference of the individual translation words. When the difference/correspondence determination unit 412 has determined that any different translation word exists in or among the individual translation words, a display information generation unit 427 generates at least either one of display information for displaying, on a display screen of a predetermined client (the client Y operated by the approver or the client A operated by the primary checker) among the clients, the newly registered particular original word or phrase and the more than one individual translation word corresponding to the newly registered particular original word or phrase; or display information for displaying the above stored identified original text and the translated text corresponding to this original text. Further, preferably, the management server 150 includes an operation information reception unit 428 configured to receive operation information including input information that has been input in these clients from the individual translator clients, and the approval request history storage unit 351 may be configured to store translation word approval request information; an approved translation word; an approval flag indicative of eligibility for approval; and the time of approval indicative of the time at which the approval was made. In addition, the display information generation unit 427 is configured to generate display information for displaying, on the screen of the translator client operated by the translator, and using the above assignment range original, an original display window in which the original text portion that should be translated by the operator of the above client is displayed and a display window in which a translated text portion that is the result of the translation operation of the original text portion in accordance with the above received operation information. Further, the display information generation unit 427 may generate display information for displaying, on the screen of the approver client, at least either one of: an approved translation word display window 2401 in FIG. 24 for displaying, in accordance with the approval flag and the time of approval, the translation word approval request information regarding the translation word approval request that were approved at or prior to a predetermined time; a newly arrived approved translation word display window 2402 in FIG. 24 for displaying the translation word approval request information regarding the translation word approval requests that were approved at a time later than the predetermined time; a request-pending translation word display window 2403 in FIG. 24 for displaying the yet-to-be-approved translation word approval request information; and a rejected translation word display window 2404 in FIG. 24 for displaying the translation word approval request information regarding the rejected translation word approval requests. This is the end of the explanation of FIG. 4.

FIG. 5 is a flowchart of registration processing for memory data and collection processing for the registered memory data. In the general flowchart of FIG. 5, the primary checker who operates the client A himself/herself is also involved in the translation operation. In the figure, the following processing procedures are illustrated: processing of making a request for approval to the client Y operated by the approver so as to register the translation words in the common memory 151 in the course of the translation operation; and processing of notifying the translation words that have been approved by the approver to the client B and the client C operated by the other translators who are not the primary checker; and processing of notifying to the client A, if any, an inconsistent translation found as a result of collection of the translation words that are newly registered by these clients B and C in their respective local memory units. Meanwhile, the following processing procedures are illustrated in the general flowchart of FIG. 25, which will be later explained: a processing procedure of making a request for approval to the client Y operated by the approver so as to register the translation words in the common memory 151 when the clients B and C operated by the other translators who are not the primary checker are engaged in the translation operations; and a processing procedure of notifying the approved translation word(s) by the approver to all of the translators. The discussion for the moment returns to explanation of FIG. 5. Steps S501 to S512 of FIG. 5 are processing procedures that are executed by the client A operated by the primary checker; steps S521 to S532 are the processing procedures that are executed by the management server 150; steps S550 to S556 are processing procedures executed by the client C and the client B, and steps S561 to S563 are processing procedures executed by the client Y operated by the approver. These steps are the processing procedures that are executed under the control of CPUs 21 of the respective hardwares. The same applies to the following flowcharts (the flowcharts of FIGS. 5 to 15, FIG. 17, FIG. 19, FIG. 21, FIGS. 25 to 31, FIGS. 33 to 34, and FIG. 37).

In the processing procedures of the flowcharts of FIG. 5 and the figures that follow, it is assumed, unless otherwise indicated as independently executed processing procedures, that connection to the management server 150 (establishment of sessions) and login (authentication processing) are already completed. Also, it is assumed here that the respective processing procedures are executed according to a multi-process scheme in the management server 150. In other words, the processing depicted in FIG. 5 and the processing depicted in FIG. 12 are executed as discrete processes, and within the same flowchart, the processing procedures may be executed as discrete processing procedures. For example, in the processing of the client B of FIG. 12, steps S1201 to S1208 and steps S1209 to S1212 constitute discrete processes with respect to each other, and in the processing of the client C, steps S1251 to S1253 and steps S1241 to S1244 are also discrete processes with respect to each other. First, in step S501, the primary checker who operates the client A requests the management server 150 to provide a user interface for registration of memory data. In step S521, the management server 150 transmits to the client A the screen information for displaying the user interface for registration of memory data, makes the process proceed to step S522, and enters a wait state to wait for information to be received from the client A. When the client A has received the screen information, the client A stores the screen information in the work area of the RAM unit 23, and a not-shown first user interface (an entry field of the project ID, an entry field of the registration target memory ID, and an OK button) is displayed on the display of the client A. When the project ID and the registration target memory ID have been entered and it has been detected and entered that the OK button was pressed, then a transition occurs to the next user interface. On the next user interface, a not-shown registration user interface is displayed, the registration user interface including an entry fields in which the word class, the original word or phrase, and the translation word are entered and a registration button labelled by the characters of "Register." The content of the entry displayed on the user interface is all stored in the work area of the RAM unit 23. When the mandatory entry items on the displayed user interface have all been entered, then a transmission flag of the work area of the RAM unit 23 is enabled that permits transmission to the management server 150. When pressing of the registration button has been detected, then the client A makes the process proceed to step S502. In step S502, it is determined whether or not the transmission flag is enabled. When the transmission flag is enabled, the client A makes the process proceed to step S503. Meanwhile, when the transmission flag is disabled or when a transition operation to make transition from the registration screen to another screen or menu has been detected, then the client A makes the process proceed to the step 505.

In step S503, the operation information is transmitted to the management server 150 and the client A makes the process proceed to step S504. If the operation information is, for example, request information for memory data, then the operation information includes a project ID, a memory ID, a translator ID, a word class, an original word or phrase, and a candidate translation word. In step S504, it is determined whether or not the operation information indicates a memory request operation on the basis of the screen information stored in the work area of the RAM unit 23 and the content of the entry. When it has been determined that the operation information indicates the memory request operation, then the client A makes the process proceed to step S5042. When it has been determined that the operation information does not indicate the memory request operation, then the client A makes the process proceed to step S505. In step S5042, the word class, the original word or phrase, and the translation word that have been entered are registered with the classification="L" in the default local memory designated in advance by the project ID that was entered on the first user interface, and the client A makes the process proceed to step S505. The processing procedures of steps S505 to S512 of the client A and step S530 will be separately explained later. Details of the processing procedure of step S5042 will be explained later with reference to the flowchart of FIG. 6. The following discussion now returns to the explanation of the processing procedures on the side of the management server 150.

The processing on the side of the management server 150 is explained hereinbelow. When the management server 150, which is placed in the wait state to wait for reception of information, has received the information from the client A in step S522, then the management server 150 makes the process proceed to step S523 and determines whether or not the received information is the request information for memory data. When it has been determined that the received information is the request information for memory data, then the management server 150 makes the process proceed to step S524. In step S524, the management server 150 transmits the memory request information (the project ID, the memory ID, the word class, the original word or phrase, and the candidate translation word(s)) to the client Y operated by the approver. In step S561, when the client Y has received the memory request information, the client Y stores the received memory request information in the work area of the RAM unit 23. When a dialog user interface on which an OK button and a cancel button are indicated along with the fact that the memory request information has been received has been received and it has been detected that the OK button has been pressed on the dialog user interface, then the client Y displays the memory approval entry user interface (a user interface for displaying memory update information, an Approve button, a Reject button, an approved translation word entry field, a comment entry field, and a Save button) including the memory request information, and makes the process proceed to step S562. In step S561, it may also be contemplated that the client Y, without displaying the dialog, displays an icon indication or animation, which indicates that the memory request information has been received, at a predetermined location such as the right corner of a task bar and detects an operation of selecting this icon or animation, and displays the memory approval entry user interface.

In step S562, the memory approval entry user interface is displayed. When it has been detected that the Save button was pressed in a state where a text is entered in the approved translation word entry field or in the approver comment entry field, an entry classification for identifying the approved translation word or the approver comment and the text that has been entered are stored in the work area of the RAM unit 23. When it has been detected that the Approve button or the Reject button was pressed, then an approval flag in accordance with the button that has been pressed is stored in the work area of the RAM unit 23. In step S563, the memory approval information is transmitted to the management server 150, the memory approval information including at least: the project ID; the approval flag; the original word or phrase; the word class; the candidate translation word(s); the approved translation word; the entry classification for identifying modified approved translation word and/or the approver comment (if they are entered in the translation word entry field and the comment entry field) ("1" if the approved translation word has been modified; "2" if the approver comment has been entered; and "3" if both of them have been entered); and the entered text, which are stored in the work area of the RAM unit 23.

In step S525, the management server 150 receives the memory approval information, stores the memory approval information in the work area of the RAM unit 23, and makes the process proceed to step S526. In step S526, the management server 150 refers to the work area of the RAM unit 23 and determines whether or not the candidate translation word(s) of the memory approval information and the approved translation word are in agreement with each other. When it has been determined that they are in agreement with each other, then the management server 150 makes the process proceed to step S528. When it has been determined that they are not in agreement with each other, the management server 150 makes the process proceed to step S527. In step S527, which is associated with an exceptional case where the client Y operated by the approver did not give an approval to the memory update information of the primary checker with the candidate translation word, the confirmation request information of the memory request content (the candidate translation word(s) and the approved translation word) of the client A is transmitted to the client A. The details of this processing will be explained by the detailed flowchart of FIG. 9.

In step S528, the management server 150 transmits memory update information (the project ID, the memory ID, the word class, the original word or phrase, and the translation word) to the transmission destination(s) identified by each of the translator IDs and registered under the project ID of the management file 1) and makes the process proceed to step S529. In step S529, the management server 150 searches for the management file 1) by using the project ID and the translator ID as keys. When the type is CT, then the management server 150 registers, in the common memory illustrated in FIG. 3, the project ID, the memory ID, the translator ID, the word class, the original word or phrase, and the translation word which have been received, and makes the process proceed to step S530. In step S530, the management server 150 executes a processing procedure in accordance with the operation on the client A, and makes the process go back to step S522. Details of step S530 will be explained later.

Next, with regard to steps S550 to S556, the following processing procedures are illustrated by way of example: processing procedures by the client C reflecting the received memory update information to its own local memory unit; and processing procedures by the client C collecting the memory data that have been classified and self-registered in its own local memory unit and transmitting the collected memory data to the management server 150. In step S550, the client C stores the memory update information (the project ID, the memory ID, the word class, the original word or phrase, and the translation word) received from the management server in the work area of the RAM unit 23, and makes the process proceed to step S551. In step S551, the client C reads a configuration file of the client C stored in the hard disk 28 into the RAM unit 23, and determines whether or not an automatic update flag is enabled. When the automatic update flag is enabled, then the client C makes the process proceed to step S553. When the automatic update flag is disabled, then the client C makes the process proceed to step S552. In step S552, the client C determines whether or not an update operation of the memory data was made (specifically, pressing of the Update button on the memory update user interface). When it has been determined that the update operation of the memory data was made, then the client C makes the process proceed to step S553. When it has been determined that the update operation of the memory data was not made, then the client C makes the process go back to step S550. In step S553, the client C uses the received memory update information and updates the data of the default local memory having this project ID. When all of the memory update information has been added to the local memory, the client C makes the process proceed to step S554.

In step S554, the client C searches this local memory unit. When any row or rows are found having the classification of "L" and the registration date corresponding to the system date, then the client C stores the project IDs, the translator IDs, the word classes, the original words or phrases, and the translation words in the work area of the RAM unit 23 for all of the matching rows, and makes the process proceed to step S555. It should be noted here that prior to execution of step S554, the rows having the classification of "L" are added in advance in the local memory of the client operated by himself/herself through the operation by the client C registering the original word or phrase and the translation word corresponding to this original word or phrase in the course of his/her translation operation. In step S555, when there is any row whose classification is "L" and whose registration date corresponds to the earliest of either the date on or after the system date or the date on or after the date on which the client C made the most recent access to the network 100, then the client C makes the process proceed to step S556. If not, then the client C makes the process go back to step S550. In step S556, the client C transmits the project ID, the translator ID, the word class, the original word or phrase, and the translation word stored in the work area of the RAM unit 23 to the management server 150, and makes the process go back to step S550.

In step S531, the management server 150 receives the memory information corresponding to the self-registration data and stores this memory information in the work area of the RAM unit 23. When the translator ID indicates the primary checker who transmitted the self-registration memory data, then the management server 150 transfers the received memory information to the client Y, registers (newly registers or updates) the memory information in the common memory 151 upon approval by the client Y, and makes the process proceed to step S532. When the translator ID does not indicate the primary checker, then the management server 150 does not perform the registration in the common memory 151 and makes the process proceed to step S532. In step S532, the management server 150 performs search to check whether or not the same original word or phrase exists in the individual registration information of the memory data of the other translators in the individual registration information storage unit 354, or the same original word or phrase already exists in the original text portions that is already translated. The management server 150 further determines whether or not the corresponding translation words of the translated text are in agreement with the translation word of the memory information of the self-registration data that is received this time. When they are not in agreement with each other, then the management server 150 notifies the primary checker or the approver. Details of the processing procedure of this step are separately explained with reference to the detailed flowchart illustrated in FIG. 7.

In step S509, inconsistent translation information is notified to the client A operated by the primary checker. Finally, the processing procedures of steps S505 to S512 and step S530 are explained. In step S505, it is determined whether or not the operation that has been detected is an end operation (for example, a case where pressing of a "X" button appearing in the upper right section of the user interface, selection of the "End" menu, or pressing of an "End" button has been detected). When the detected operation is the end operation, then the management server 150 makes the process proceed to step S506. In step S506, the client A closes opened files, saves yet-to-be-saved files, or performs relevant operations and thus ends the processing. When the detected operation is not the end operation, then the client A makes the process proceed to step S507. In step S507, the client A determines whether or not any operation other than the above memory registration operation and the end operation has been detected. When an operation other than the memory registration operation and the end operation has been detected, then the client A makes the process proceed to step S508. If not, the client A makes the process proceed to step S509.

In step S508, the client A executes the processing in accordance with the other operations and makes the process proceed to step S509. The other operations as used herein refer to operations for proceeding with the translation operations by the translation support system such as range designation operation for defining the translation word or phrase; a search operation for searching memory; a selection operation for selecting a desired translation word from among translation word publications obtained as a result of the search; and a file saving operation. Details of the processing procedure of step S508 and details of the processing procedure of step S530, which is associated therewith and pertains to processing by the management server 150 are separately explained with reference to the flowchart illustrated in FIG. 27.

Next, in step S509, it is determined whether or not the notification information has been received from the management server 150. When it has been determined that the notification information was received, then the client A stores the received notification information in the work area of the RAM unit 23 and makes the process proceed to step S510. In step S510, the processing branches depending on the content of the received notification. When the word class in the notification content is "noun" and the translation word is not in agreement, or when the word class is "verb" and three or more inconsistent translation words are contained for the same original word or phrase, then the client A determines that it is necessary to provide display thereof, and makes the process proceed to step S511. When the word class is "verb" and there are two inconsistent translation words, then the client A makes the process proceed to step S512. In step S511, an icon is displayed on the screen of the client A, and the client A makes the process proceed to step S512. In step S512, the client A adds the notification information received this time to the notification log of the hard disk 28. This is the end of the explanation of FIG. 5.

Figure 6:
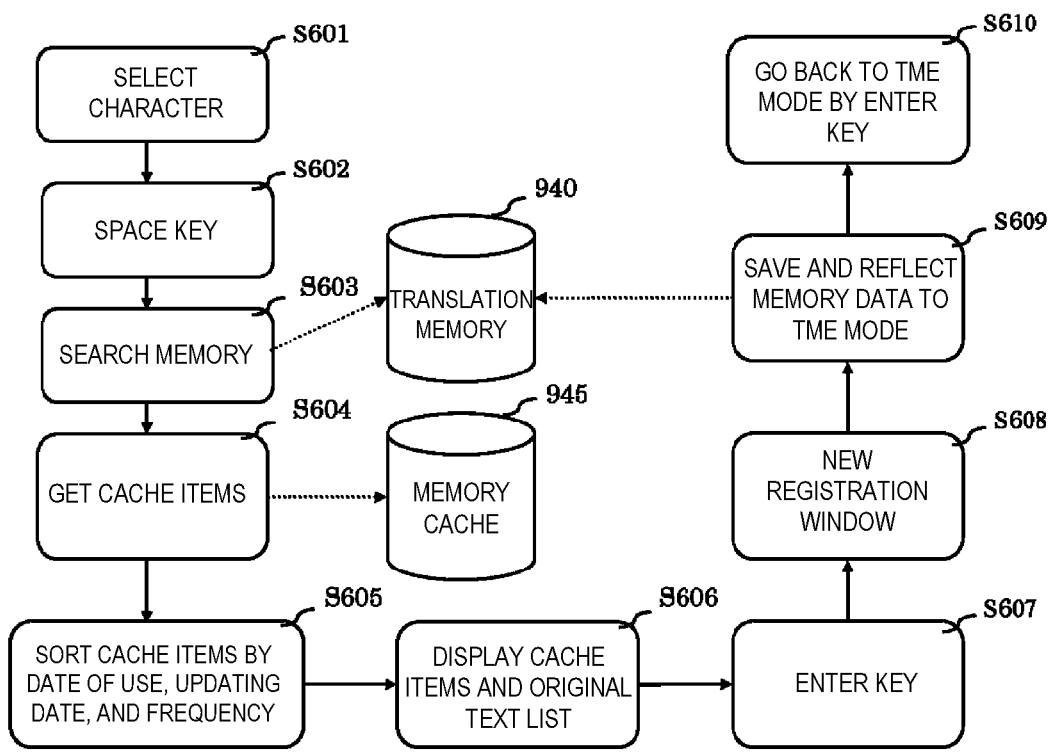
FIG. 6 is a diagram illustrating the detailed flowchart of the local memory registration processing of step S5042 of FIG. 5 of the translation support system according to the present invention.

FIG. 6 is a diagram illustrating the detailed flowchart of the new registration processing for new registration in the local memory of each client in a TME mode (i.e., step S5042 of FIG. 5). The processing procedures of FIG. 6 are those that are executed under the control of the CPU 21 of the client A and the CPI 21 of the management server 150. The TME mode as used herein refers to a mode in which a translation word corresponding to the term (i.e., an original word) of an original text is selected, the selected translation word is registered, and the word or phrase of the original text (for example, part of a word, word, or phrase) is replaced by the selected translation word. When a certain term or word or phrase of the original text is replaced by a translation word, then the same term or word or phrase that subsequently appears is also replaced by the translation word in the similar manner. Meanwhile, this does not mean that collective replacement for the entire document is not performed including the same preceding term or word or phrase, and accordingly it is also possible to replace an original word by another translation word at any intermediate location of the document. It is also possible to perform individual replacement in a mode other than the TME mode. In step S601, when an operation to select any character within a particular range has been detected on the side of the client A, then the client A stores, in the work area of the RAM unit 23, the operation information indicating that the character within the selected range and the character within the particular range were selected, and makes the process proceed to step S602.

In step S602, when pressing of a space key has been detected on the side of the client A, the operation information stored in the work area of the RAM unit 23 is transmitted to the management server 150 and the management server 150 makes the process proceed to step S603. In step S603, the local memory 115 is subjected to memory search by using the characters within the selected range received by the management server 150 as a key, and the client A makes the process proceed to step S604. In step S604, the search result is stored, as a cache item for the translation word candidate, in a memory cache 945 of the work area of the RAM unit 23, and the client A makes the process proceed to step S605.

In step S605, the client A sorts the cache items stored in the memory cache 945 by the order of: date of use>date of update>frequency of use, and makes the process proceed to step S606. In step S606, when pressing of the Space key has been detected, the client A displays the sorted cache items in the form of a drop-down list, and makes the process proceed to step S607. Specifically, addition to the local memory in the TME mode is performed via the drop-down list that appears when the space key is pressed. In step S607, pressing of the Enter key has been detected, the client A makes the process proceed to step S608. When the client A has performed new registration of the translation word in the local memory, the management server 150 receives the registered translation word (step S522) in accordance with the processing procedure illustrated in FIG. 5 (step S504), transfers the registered translation word to the client Y (step S524), and thus the approval processing by the client Y is executed. Meanwhile, when any translator other than the client A has performed new registration of a translation word in the local memory, the registered translation word is transmitted as the self-registration memory data illustrated in FIG. 5 to the management server 150 (step S556).

In step S608, the client A displays a window for new registration and waits for entry of the content of the registration. When characters have been entered and pressing of the Enter key has been detected, the process proceeds to step S609. In step S609, the registered translation word is saved in the local memory 940 as the one having the latest date of use and the latest date of update, and the registration result is reflected to the display screen of the TME mode (the display is updated with the entered characters). Subsequently, the client A makes the process proceed to step S610. In step S610, when pressing of the Enter key has been detected again, then the client A returns to the original TME mode and ends the processing. The newly registered term (translation word) is displayed at the highest place in the drop-down list until another translation word is registered for the same original word or until another translation word is selected. This is the end of the explanation of FIG. 6.

Figure 7:
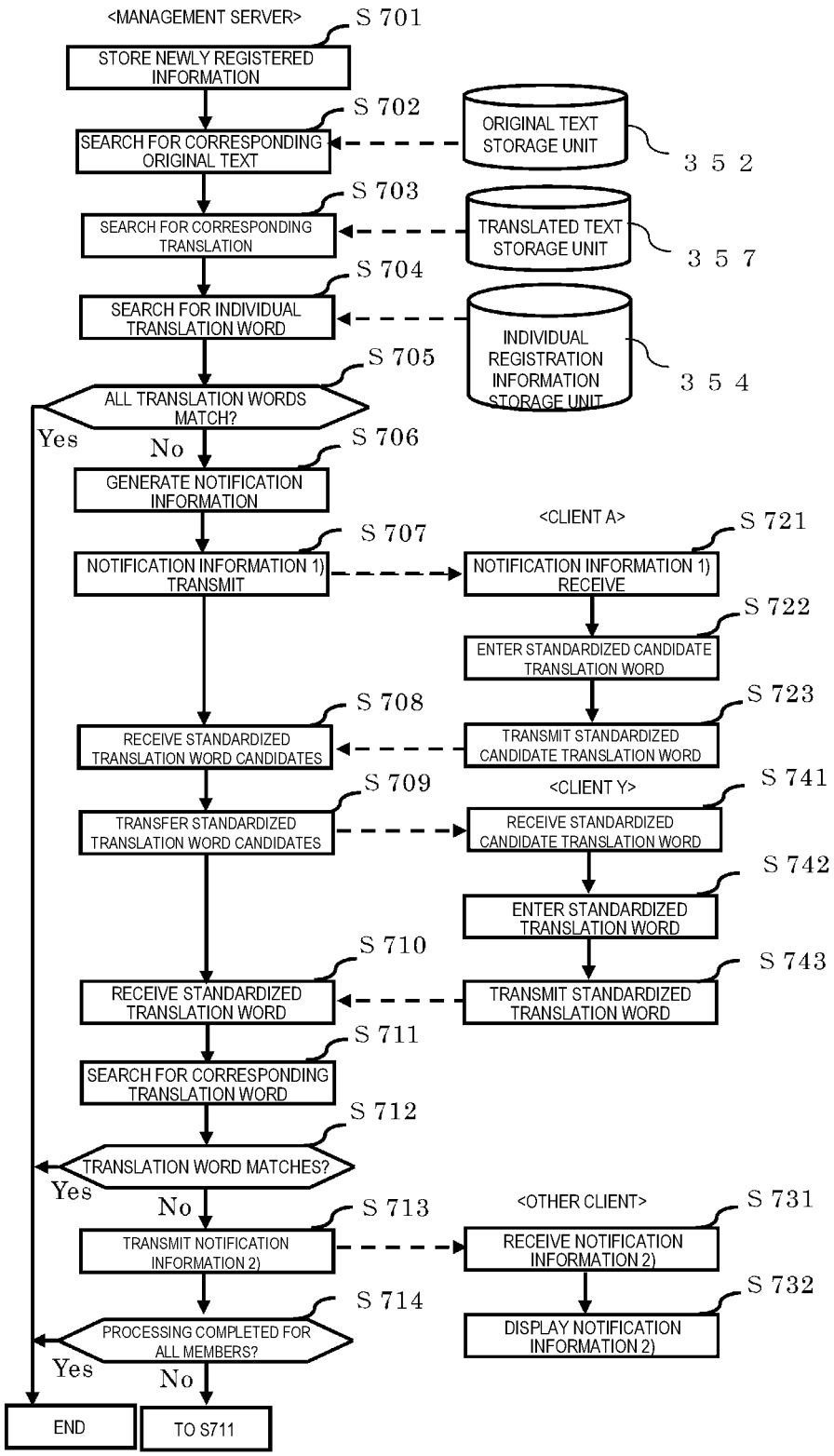
FIG. 7 is a detailed flowchart illustrating details of unstandardized translation word search processing and notification processing of the translation support system according to the present invention.

Next, FIG. 7 is a detailed flowchart illustrating the details of the unstandardized translation word search processing and notification processing (step S532 of FIG. 5). In the FIG. 7, the processing procedures of steps S701 to S714 are those that are executed under the control of the CPU 21 of the management server 150, and the processing procedures of steps S721 to S723 are those that are executed under the control of the CPU 21 of the client A, and the processing procedures of steps S741 to S743 are those that are executed under the control of the CPU 21 of the client Y. In step S701, the management server 150 stores the translator ID, the project ID, the original word or phrase, and the translation word included in the newly individually registered individual registration information in the work area of the RAM unit 23 and makes the process proceed to step S702.

In step S702 (corresponding original search), the original text portions of the original text storage unit 352 of all of the translator participating in this project including the translator who performed the registration is searched for by using as a key the newly individually registered original word or phrase, which was stored in the work area of the RAM unit 23 in step S701, and the paragraph number, the sentence number, the original word or phrase at the hit location, an inconsistent translation flag (disabled by default), and a failure flag (disabled by default) are output as the search result to an inconsistent translation work file stored in the hard disk 28.

In step S703 (corresponding translation search), the management server 150 uses the paragraph number of the work file and the sentence number of this paragraph number, and searches translated text storage unit 357 for all of the translated text portions of all of the translators participating in this project by using as a key the translation word stored in the work area of the RAM unit 23 in step S701 and corresponding to the original word or phrase. It is contemplated as a premise that the paragraph numbers are respectively included in both of the original text and the translated text and that, in a certain paragraph, for example, a paragraph of the translated text corresponding to the paragraph number of the paragraph 0011 of the original text, a paragraph number of the paragraph 0011 is included. When the number of sentences of the original text in a certain paragraph in the original text (the maximum value of the sentence number) and the corresponding number of sentences of the translated text in the paragraph do not agree with each other, sentence numbers, for example, plus/minus one with respect to the sentence number at issue are also searched for. At this point, checking is done on a per-sentence-number basis with, for example, in the case of English-to-Japanese translation, about a half of the number of characters of one sentence in Japanese being regarded as the corresponding number of words in English. Specifically, for example, the number of words in English is multiplied empirically by two and the obtained number plus/minus 20% of the error range thereof is regarded as the corresponding number of characters of Japanese sentences in the same paragraph number. Within this error range (1.6 to 2.4), it is determined that no division of sentences occurred. If no corresponding translation is found with the sentence number of the translated text corresponding to the original text even when occurrence of the division of any sentence is taken into account, then the inconsistent translation flag is enabled for that location (in units of sentences) and the corresponding original and translated texts are stored in the work area of the RAM unit 23.

Out of this range, if the number of characters of the Japanese sentences which pertain to the translated text is less than the minimum value, it is determined that there occurred division of sentences. When the number of characters of the Japanese sentences which pertain to the translated text is larger than the maximum value, it is determined that there was merging of translated text portions. When the character data of the translated text portion corresponding to a certain paragraph of the original text is zero, then it is determined that the original text portion is yet to be translated, and the inconsistent translation flag is disabled for all the sentences with this paragraph number, and the failure flag is enabled. Even when the corresponding translation word has been found, it may happen that the determination of presence/absence of the corresponding translation word fails due to a large difference between the number of the original text and the number of the translated text or the like. If failed, the failure flag is enabled. When the failure flag is disabled and the inconsistent translation flag is enabled, this indicates that inconsistent translation of the translation words with respect to the same original word or phrase likely to exist within the translated text that this translator is creating.

In step S704 (individual translation word search), the management server 150 searches for self-registration memory data of other translators and the corresponding translation word of the common memory 151 by using as a key the original word or phrase of the self-registration memory data stored in the work area of the RAM unit 23 in step S701, and stores, in the work area of the RAM unit 23, the translator ID, the memory ID, the original word or phrase, the word class, and the translation word of all of the hit memory data as well as the project ID in the work area of the RAM unit 23 and makes the process proceed to step S705. In step S705, the management server 150 performs comparison to ascertain correspondence or difference between the translation word of the self-registration memory data with the translation words of the other translators stored in the work area of the RAM unit 23 and the translation words of the common memory 151. When it has been determined that the translation words are in agreement with the self-registration data of all the translators, then the process is ended. When it has been determined that the translation words are not in agreement with the self-registration data of at least one translator, or when there is any translated text portion for which inconsistent translation flag is enabled in the inconsistent translation work file stored in the hard disk 28, the management server 150 makes the process proceed to step S706.

In step S706, the management server 150 generates notification information 1) to the primary checker regarding the original word or phrase for which the translation word is not in agreement (the project ID, the original word or phrase, the word class, the translator ID, the respective translation words, and the respective memory IDs of that translator, or alternatively, in a case where there is any translated text for which the inconsistent translation flag is enabled, the project ID including the translated text for which the inconsistent translation flag is enabled, all of the corresponding translator IDs, all of the paragraph numbers corresponding to the translator IDs for which the inconsistent translation flag is enabled, and the translated text corresponding to the original text) using: the inconsistent translation information regarding the inconstant translation information in the translated text which is stored in the inconsistent translation work file in step S703 and for which the inconsistent translation flag is enabled; and the inconsistent translation information of the translation word of the memory data stored in the work area of the RAM unit 23 in step S704. The management server 150 stores the notification information 1) in the work area of the RAM unit 23 and makes the process proceed to step S707. In step S707, the management server 150 transmits the notification information 1) stored in the work area of the RAM unit 23 to the client A operated by the primary checker, and makes the process proceed to step S708 and enters in a wait state for reception of a response from the client A.

Figure 8:
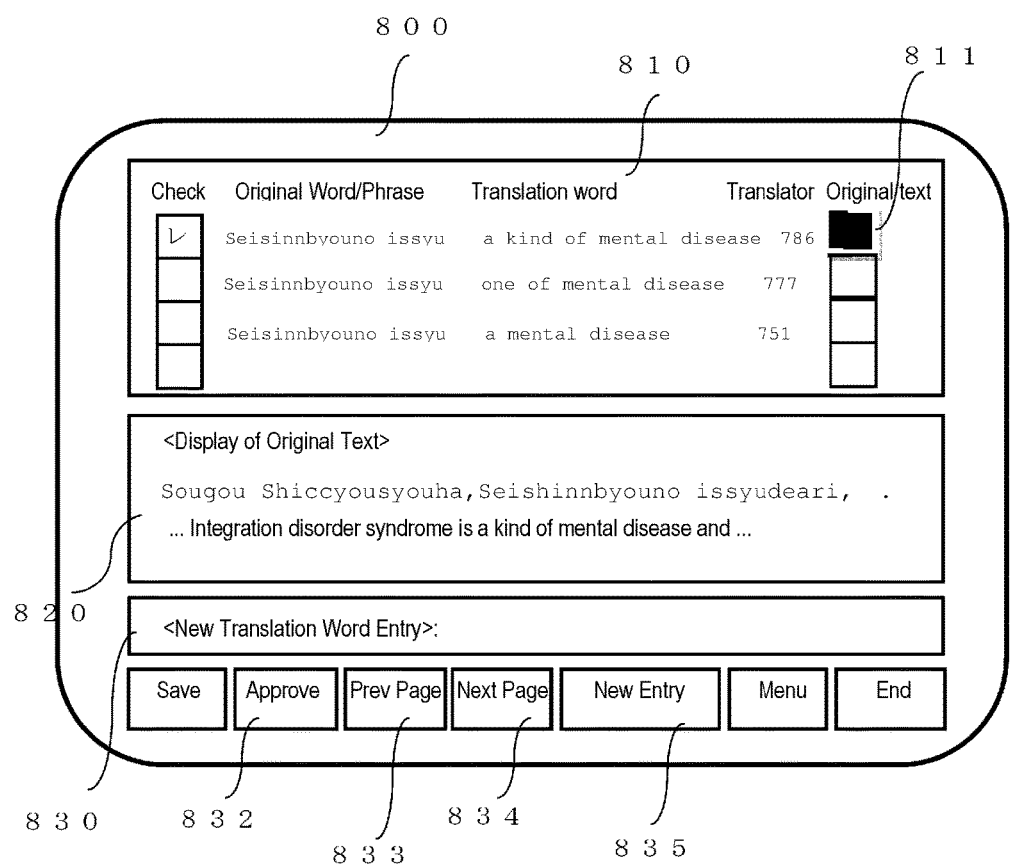
FIG. 8 is a diagram illustrating a standardized translation word entry user interface in the details of the unstandardized translation word search processing and notification processing of the translation support system according to the present invention (step S722 of FIG. 7).

In step S721, the client A receives the notification information 1) and stores the notification information 1) in the work area of the RAM unit 23. An animation or an icon is displayed on the display of the client A, the animation or the icon indicating that the notification information 1) notifying a non-standardized translation word has been received. When the primary checker selects this animation or icon (for example, clicking by the left button of the mouse), the client A makes the process proceed to step S722. The non-standardized translation word notification and the standardized translation word entry user interface 800 illustrated in FIG. 8 are displayed on the display. A non-standardized translation word notification window 810 is displayed at an upper portion of this user interface. In this non-standardized translation word notification and the standardized translation word entry user interface 800, the same inconsistent translation locations exceeding a predetermined number are displayed on different pages. For example, it may be contemplated that the location of the first appearance of the inconsistent translation is displayed on the first page 1 while the same inconsistent translations are displayed on page 2 and the pages that follows.

On the non-standardized translation word notification window 810, a check field, an original word or phrase, a translation word, a translator ID, and an original display button are displayed in this order from the left to the right. The primary checker confirms the original word or phrase and the translation word and enters a check mark "✓" in the check field of the row in which the translation word to be adopted appears. In FIG. 8, it is indicated on the non-standardized translation word notification window 810 that the translator having the translator ID 786 uses "a kind of mental disease" for the original word or phrase "seishin-byou-no isshu" and the translator having the translator ID 777 uses "one of mental diseases," and the translator having the translator ID 751 uses "a mental disease." By pressing the "Original" button 811 on this user interface, the original file corresponding to a translation assignment range table of the translator ID 786 is searched for by using the original word or phrase as a key, and the sentence or passage is identified by periods or punctuation marks with the sentence or passage at the first hit location being the center, and about three sentences or three passages at and on both sides of the hit location are stored in the work area of the RAM unit 23, and the original text portion at the first location including the original word or phrase within the original range for which the translator having the translator ID786 is in charge of translation is displayed in the original display window 820 at the intermediate column in the user interface. By virtue of this, confirmation of eligibility of the translation words of each translator is facilitated. Also, when more than one notification is to be viewed, another piece of notification information can be displayed in a non-standardized translation word notification window 810 by pressing a Prev Page button 833 or a Next Page button 834. A translation word new entry window 830 is displayed below the original display window 820, and a new translation word can be registered by pressing a new entry button 835 after having entered the new translation word in this translation word new entry window 830.

When an Approve button 832 is pressed after the primary checker having entered the check "✓," the translation word "a kind of mental disease" of this row is approved as the standardized candidate translation word corresponding to the original word or phrase "seishinbyou-no isshu," and the information indicating that the primary check has been made is stored in the work area of the RAM unit 23. The client A makes the process proceed to step S723 and transmits the notification information 1) including the project ID, the original word or phrase, the word class, etc. to the management server 150 along with the approved standardized candidate translation word. It should be noted here that, when checks "✓" are entered for more than one translation word, this means that primary check is made to the fact that both of the translation words are to be properly used (translated as two distinct words), and accordingly that two terms are included as the standardized candidate translation words.

In step S708, the management server 150 stores the received information in the work area of the RAM unit 23 and makes the process proceed to step S709. In step S709, the management server 150 transfers the information stored in the work area of the RAM unit 23 to the client Y, makes the process proceed to step S710, and enters the wait state for reception of a response from the client Y. The actor that executes steps S741 to S743 is the client Y. Details of these steps are omitted, for it only differs from the above steps in that the standardized translation word candidate received from the management server 150 is approved and transmitted as the standardized translation word to the server along with the notification information 1). The management server 150 stores the notification information 1) and the standardized translation word received in step S710 in the work area of the RAM unit 23, and makes the process proceed to step S711. In step S711, management server 150 executes the corresponding translation word search similar to that of step S703 by using as keys the original word or phrase and the standardized translation word. The management server 150 extracts the translation words for each translator participating in this project and the paragraph number and the sentence number of the paragraph, in which the translation word appears, of the original text, in which the original word or phrase exists, and then makes the process proceed to step S712. In step S712, the extracted translation word is compared with the standardized translation word and it is determined that both translation words are in agreement with each other. When appropriate use of more than one translation word is permitted (a case where there is more than one standardized translation word), it is determined that the translation word is in agreement with the standardized translation word as long as the translation word agrees with either one of the standardized translation words.

When the translation word is not in agreement with the standardized translation word, the management server 150 makes the process proceed to step S713. When the translation word is in agreement with the standardized translation word, then the management server 150 makes the process proceed to step S714. In step S713, the management server 150 transmits notification information 2) to another client operated by the translator with the translator ID whose translation word is not in agreement with the standardized translation word, using the information stored in the work area of the RAM unit 23 in step S707, and, the information received in step S710 and stored in the work area of the RAM unit 23, the notification information 2) being for use in confirmation of the translation word. The management server 150 sets the transmission flag corresponding to the translator ID of the translator who transmitted the notification information 2), the transmission flag being enabled with the transmission log containing the translator ID stored in advance in the work area of the RAM unit 23 and the transmission flag. The notification information 2) includes the project ID, the original word or phrase, the standardized translation word, the original text portion of the other translator corresponding to the standardized translation word, and the paragraph number and the sentence number of the original text portion including the location at which the original word or phrase appears for the first time in the translation assignment range for each notification-destination translator.

In step S731, another client receives the notification information 2) and stores the received notification information 2) in the work area of the RAM unit 23, and the icon or animation notifying the reception of the notification information 2) is displayed on the screen. When this icon or animation has been selected, the management server 150 makes the process proceed to step S732, and the content of the notification information 2) and a message requesting confirmation (for example, for the project ID=xxxxx: You use the translation word "one of mental disease" for the original word or phrase "seishinbyou-no isshu." You are notified that the approver approved the translation word "a kind of mental disease." Please check the original text and the translated text for the relevant first-appearing location (the y-th sentence in the paragraph 00XX).) are displayed on the screen. It will be appreciated that the content of the notification information 2) may be displayed in the form of a list listing multiple notifications (a display form which provides a list of the inconsistent translation locations).

In step S714, the management server 150 determines whether or not the translation word match determination of step S712 has been completed for all of the translators on the basis of the transmission flag of the transmission log in the work area of the RAM unit 23. When the transmission flag is enabled for all of the translator IDs, the management server 150 ends the process. When there is a translator ID in the transmission log for which the transmission flag is not enabled, then the management server 150 makes the process proceed to step S711. By virtue of such processing, it is made possible for primary checker and the approver to confirm the inconsistent translation even when an approval request of the translation word is not made, and thus it is made possible to notify the standardized translation word to the translator(s) using any word other than the approved translation word to draw their attention. It should be noted here that, as a modified embodiment (another embodiment), the processing of notifying the standardized translation word as the approved translation word in the same or similar manner as the processing illustrated in FIG. 12 (see step S1232); the processing of displaying the standardized translation word on the screen of FIGS. 16, 18, and 20; and the processing of updating the local memory also pertains to the present invention. This is the end of the explanation of FIG. 7.

Figure 9:
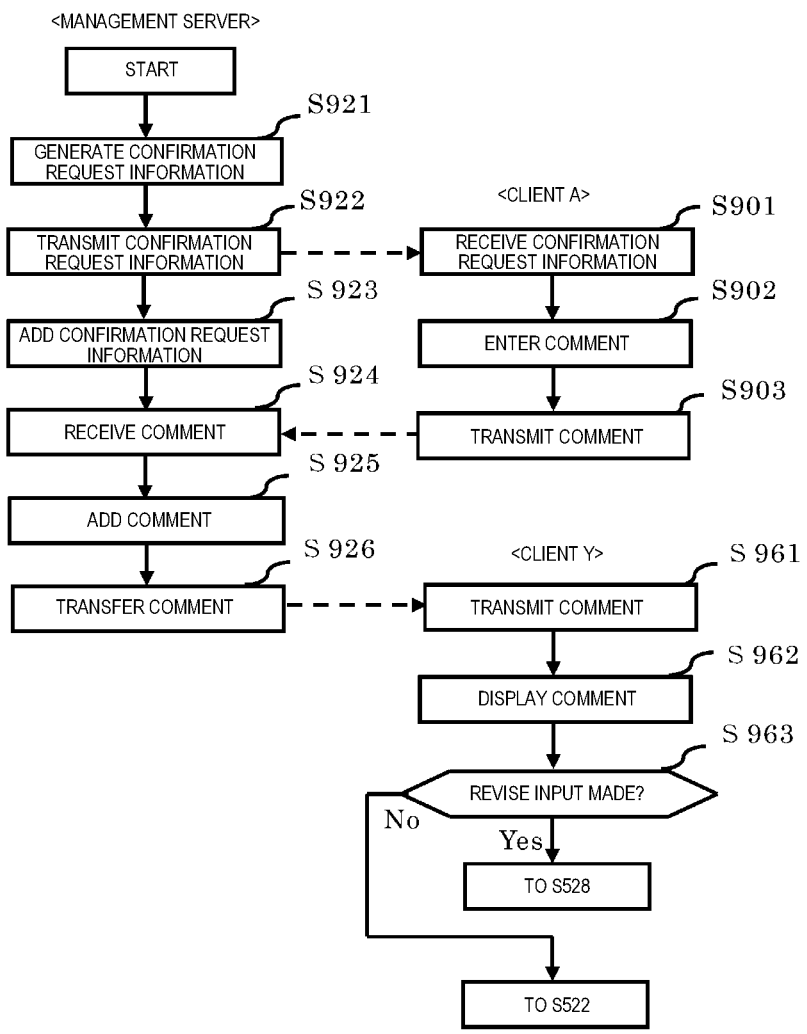
FIG. 9 is a detailed flowchart illustrating details of confirmation request processing (step S527 of FIG. 5) of the translation support system according to the present invention.

Next, the flowchart of FIG. 9 is explained. FIG. 9 is a detailed flowchart illustrating the details of the confirmation request processing of step S527 of FIG. 5 (processing in the case where the candidate translation word of the primary checker and the approved translation word of the approver do not agree with each other). In FIG. 9, steps S921 to S926 are associated with the processing procedures that are executed under the control of the CPU 21 of the management server 150; steps S901 to S903 are associated with the processing procedures that are executed under the control of the CPU 21 of the client A operated by the primary checker; and steps S961 to S963 are associated with the processing procedures that are executed under the control of the CPU 21 of the client Y operated by the approver. First, in step S921, the management server 150 generates confirmation request information to be transmitted to the client A (including a message indicating that the candidate translation word has been revised by the approver; a message requesting confirmation of the content; the project ID, the original word or phrase, the word class, the approved translation word, the candidate translation word, and the approver comment) using the memory approval information stored in the work area of the RAM unit 23 (see the explanation of step S562 of FIG. 5). The management server 150 stores the confirmation request information in the work area of the RAM unit 23 and makes the process proceed to step S922. In step S922, the management server 150 transmits the confirmation request information stored in the work area of the RAM unit 23 to the client A, and makes the process proceed to step S923.

The processing on the side of the client A is explained here. In step S901, the client A receives the confirmation request information, stores it in the work area of the RAM unit 23, and makes the process proceed to step S902. In step S902, the client A uses the confirmation request information stored in the work area of the RAM unit 23 and displays an icon indication or animation indicating that the confirmation information has been received on a predetermined position, for example, the right corner of the task bar or the like. And the client A detects an operation selecting this icon or animation and displays a not-shown primary checker comment entry user interface (a user interface for displaying a message indicating that the candidate translation word was revised by the approver; message requesting confirmation of the content; the project ID, the original word or phrase, the word class, the approved translation word, the candidate translation word, the comment entry fields for the approver's comment and primary checker's comment; and an OK button). When pressing of the OK button has been detected, the client A makes the process proceed to step S903. In step S903, the client A transmits a primary checker comment to the management server, the primary checker comment including the project ID, the original word or phrase, the word class, the approved translation word, the candidate translation word, and a comment entered by the primary checker.

The following discussions are directed to the explanation of the management server 150 again. In step S923, the management server 150 adds the confirmation request information stored in the work area of the RAM unit 23 to the approval request history file 153 by using the project ID, the original word or phrase, and the word class as keys, and makes the process proceed to step S924. In step S924, the management server 150 waits for reception of the primary checker comment from the client A. When the management server 150 has received the primary checker comment, the management server 150 stores the received primary checker comment in the work area of the RAM unit 23, and makes the process proceed to step S925. In step S925, the management server 150 adds the primary checker comment stored in the work area of the RAM unit 23 to the approval request history file 153 by using the project ID, the original word or phrase, and the word class as keys, and makes the process proceed to step S926. In step S926, the management server 150 transmits the primary checker comment stored in the work area of the RAM unit 23 to the client Y.

In step S961, the client Y stores the received primary checker comment in the work area of the RAM unit 23 and makes the process proceed to step S962. In step S962, the client Y displays on the screen of the client Y the icon indication or animation indicating that the primary checker's comment has been received, at a predetermined position, for example, the right corner of the task bar, and detects an operation selecting this icon or animation and displays a not-shown primary checker comment confirmation user interface (a user interface for displaying the project ID, the original word or phrase, the word class, the approved translation word, the candidate translation word, the comment fields in which the approver's comment and the primary checker's comment are entered, and a revise entry field for entering a revised translation word, and an OK button). When pressing of the OK button has been detected, the client Y makes the process proceed to step S963. In step S963, the client Y determines whether or not a text which is the revised translation word has been entered in the revise entry field for entering the revised translation word. When the text has been entered, the client Y makes the process proceed to step S528 of FIG. 5. When no text is entered, the client Y makes the process proceed to step S522 of FIG. 5. This is the end of the explanation of FIG. 9.

Figure 10:
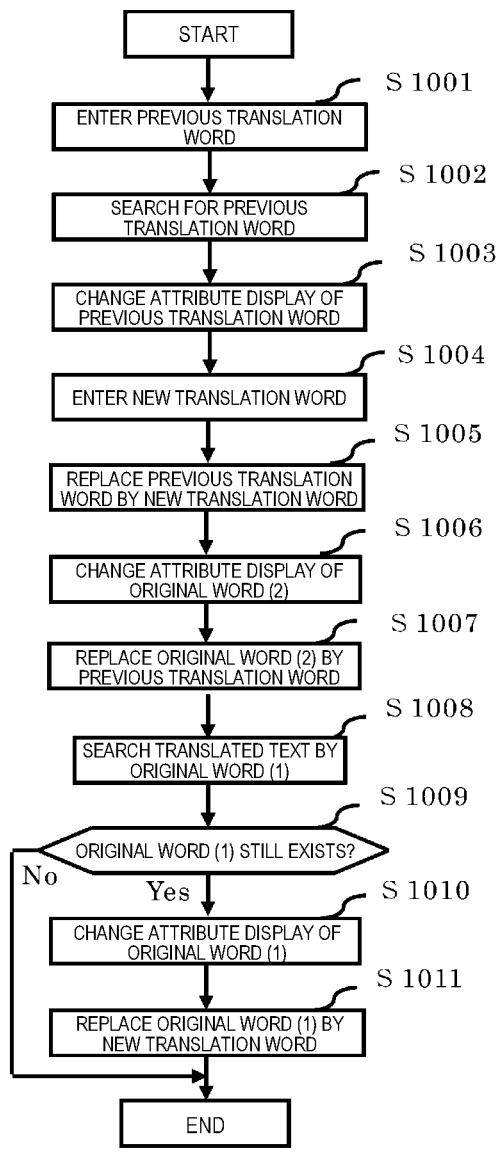
FIG. 10 is a detailed flowchart illustrating details of collective replacement processing for translation words of the translation support system according to the present invention.

Next, FIG. 10 illustrates processing in a case where another request for approval with the same translation word (previous translation word) for another original word 2) has been made after a certain original word or phrase 1) and a translation word (previous translation word) have been approved, and the translation word (previous translation word) of the previous original word or phrase 1) should be subjected to collective replacement by another new translation word. The processing procedures of FIG. 10 are those that are executed under the control of the CPU 21 of each client, which are executed in step S508 of FIG. 5 or the later-described step S1208 of FIG. 12.

For example, a possible scenario is as follows: Initially, a request for "device" (the original word or phrase 1)) was made and the primary checker made an approval with the translation word "souchi" (the previous translation word). However, a re-request regarding a synonym "apparatus" (the original word or phrase 2)) was subsequently made with the translation word "souchi," and then the primary checker thought: "Oh my God, I have to change the translation word for the device to "debaisu" (the new translation word) so the translation word for the apparatus is "souchi" (the previous translation word)."

In the translated text, the word or phrase corresponding to the "device" already assumes "souchi." As a result, when the "apparatus" is newly translated as "souchi" on an as-is basis, then both of the former "souchi" and the latter "souchi" will reside in the translated text. In view of this, re-request processing is authorized, and, when the translation word is changed on the client side, the following processing is performed on the translated text side. The processing is explained with reference to specific examples.

In step S1001, the previous translation word that should be changed is entered or selected by range designation and stored in the work area of the RAM unit 23, and the client makes the process proceed to step S1002. In step S1002, the client searches the translated text for the previous translation word corresponding to the original word or phrase 1) (the "device" in the above example), and stores the previous translation word obtained as a result of the search and the location at which the previous translation word exists (paragraph number and sentence number) in the work area of the RAM unit 23, and makes the process proceed to step S1003. In step S1003, the client changes the display attribute such as character color or background color (base color), etc. of the corresponding previous translation word that has been searched for ("souchi" in the above example) to a predetermined first display attribute, stores this previous translation word and the changed first display attribute in the work area of the RAM unit 23, and makes the process proceed to step S1004. It should be noted that in the flowchart art, the original word or phrase is simply indicated as "original word."

In step S1004, in order to replace the previous translation word ("souchi"), a new translation word for the original word or phrase 1) is newly entered via the screen, and the new translation word and the first display attribute are additionally stored in the work area of the RAM unit 23 independently of the previous translation word, and the client makes the process proceed to step S1005. In step S1005, the client replaces the previous translation word within the translated text by the new translation word ("debaisu") with the first display attribute stored in the work area of the RAM unit 23, and makes the process proceed to step S1006. In step S1006, the client changes the display attribute of the original word or phrase 2) ("apparatus") within the translated text, separately stores this display attribute in the work area of the RAM unit 23, and makes the process proceed to step S1007. In step S1007, the client replaces the original word or phrase 2) ("apparatus") within the translated text by the previous translation word ("souchi") stored in the work area of the RAM unit 23 with a predefined display attribute (second display attribute), and makes the process proceed to step S1008.

In step S1008, the client performs search to check whether or not there remains any yet-to-be-replaced original word or phrase 1) ("device") on the side of the translated text, and makes the process proceed to step S1009. In step S1009, when there still remains the original word or phrase 1) within the translated text, the client makes the process to proceed to step S1010. In step S1010, when there remains the yet-to-be-replaced original word or phrase 1) ("device") within the translated text, the client changes the display attribute to a predefined display attribute (third display attribute), stores this third display attribute as well in the work area of the RAM unit 23, and makes the process proceed to step S1011. In step S1009, when it has been determined that there is no original word or phrase 1) remaining within the translation version, the client ends the process. In step S1011, the client, while maintaining the third display attribute further predefined in step S1010, replaces the original word or phrase 1) ("device") within the translated text by the new translation word ("debaisu") stored in the work area of the RAM unit 23 in step S1004.

This third display attribute is included in the configuration file stored in the hard disk 28, and specified as a display attribute that is different from both of the first display attribute and the second display attribute which are also included in the configuration file.

It should be noted here that the display attribute as used herein refers to colors of characters, font (at least either one of type and size), bold/standard, base color (background color), italics, and the like. By precedingly executing the processing to change the display attribute in this manner, it is made possible to execute the change processing to change the translation word by only one click. In addition, by storing the first to third display attributes as display attributes that are different than each other (for example, stored as three background colors that are different from each other, or bold character colors that are different from each other), and providing display with these mutually different display attributes maintained even after the collective replacement, it is made possible to readily confirm the collective replacement portions even after the collective replacement. This is the end of the explanation of FIG. 10.

Next, FIG. 12 is explained. FIG. 12 is a general flowchart illustrating an embodiment of approval request processing for memory data entered by the client and update notification processing for memory data of the translation support system according to the present invention. Steps S1201 to S1208 of FIG. 12 are associated with processing procedures that are executed under the control of the CPU 21 of the client B operated by a rank-and-file translator who is not the primary checker, and steps S1209 to S1212 are associated with the processing procedures executed under the control of the respective CPUs 21 of the clients A and B, and steps S1221 to S1232 are associated with the processing procedures executed under the control of the CPU 21 of the management server 150. Steps S1240 to S1244 of FIG. 12 are associated with the processing procedures executed under the control of the CPU 21 of the client C; steps S1251 to S1253 are associated with the processing procedures executed under the control of the CPU 21 of the client A; and steps S1261 to S1263 are associated with the processing procedures executed under the control of the CPU 21 of the client Y operated by the approver.

The following provides explanations by way of an example where the client B makes a request for approval of a certain translation word. In step S1201, the client B requests a user interface for approval request of memory data. In step S1221, the management server 150 transmits the user interface information for displaying the user interface for the approval request of the memory data to the client B, makes the process proceed to step S1222, and then enters the wait state to wait for reception of information from the client B. In step S1201, the client B enters, on the approval request user interface, the translation word approval request information for the memory data (the project ID, the translator ID, the word class, the original word or phrase, and the translation word). When pressing of a "Request" button on the user interface has been detected, the client B sets the transmission flag when all of the mandatory entry items have been entered, stores them in the work area of the RAM unit 23, and makes the process proceed to step S1202. In step S1202, when the transmission flag in the work area of the RAM unit 23 is enabled, the client B makes the process proceed to step S1203. In step S1203, the client B transmits the operation information to the management server 150 and, after the transmission, clears the transmission flag in the work area of the RAM unit 23, and makes the process proceed to step S1204.

This translation word approval request information is also stored in the hard disk 28 of the client B as request-pending information, and can be referred to on the later-described message board as the memory information of the approval request in-progress of the approval history file 153. Next, when, in step S1202, not all of the items are entered or the operation is not the approval request, then the client B makes the process proceed to step S1204. Steps S1203 to S1208 are the same or similar procedures as those of steps S504 to S508 of FIG. 5. The details of the processing of step S1208 and the processing procedure of step S1226 corresponding thereto of the management server 150 are explained with reference to the flowchart illustrated in FIG. 27.

Next, the management server 150, which has entered and remained in the wait state to wait for reception of information receives information in step S1222, stores the information in the work area of the RAM unit 23 and makes the process proceed to step S1223. In step S1223, the management server 150 determines whether or not the received information is the translation word approval request information. When it has been determined that the received information is the translation word approval request information, the management server 150 makes the process proceed to step S1224. When it has been determined that the received information is not the translation word approval request information, then the management server 150 makes the process proceed to step S1226. In step S1226, the management server 150 performs processing in accordance with the operation on the side of the client identified by the received information. Details of step S1226 is explained with reference to FIG. 27.

In step S1224, the management server 150 performs search to check whether or not an approval request already exists in the approval request history file 153 (the project ID, the memory ID, the translator ID, the word class, the original word or phrase, the translation word, the approved translation word, the approver ID, and the date of approval) for the same original word or phrase by using the original word or phrase as a key. When there exists an approval request whose original word or phrase agrees with that of this approval request, then the management server 150 stores the corresponding translation word and the date of approval in the work area of the RAM unit 23, and makes the process proceed to step S1225. In step S1225, when an approval has already been made with the same original word or phrase and the translation word, then the management server 150 transmits a message to the client B, the message indicating that the approval has been already made. When an approval has been made with a different translation word, then the management server 150 transmits, to the client B, this different translation word, the original word or phrase, and a message which asks the client B as follows: "Approval is made with different word or phrase. Is it really all right with this translation word? Or should this request be treated as an independent one?" When the response from the client B is requesting to treat this request as an independent request, the management server 150 proceeds with processing for this approval request. Details of step S1225 is independently explained with reference to the detailed flowchart illustrated in FIG. 13.

The translation word approval request information is transmitted to the client A operated by the primary checker, independently of which the translation word approval request information is also transmitted to other translators such as the client C. In step S1240, the display attributes (for example, colors of characters, background colors, and bold characters, etc.) of all of the sections including the same original words or phrases of the original texts of which other translators are in charge, which correspond to the original word or phrase for which the approval request is in progress included in the approval information, are changed, and the translators are readily allowed to notice that an approval request is being processed for this original word or phrase, and thereby occurrence of double approval requests is avoided. Details of step S1240 is separately explained with reference to the detailed flowchart illustrated in FIG. 14.

In step S1251, the client A receives the translation word approval request information, registers the received translation word approval request information in the approval request in-progress work file of the hard disk 28, stores this translation word approval request information in the work area of the RAM unit 23, and makes the process proceed to step S1252. In step S1252, an icon or animation is displayed on the screen of the client A, the icon or animation indicating that the translation word approval request information has been received. When an operation by the primary checker who is the primary checker at all has been detected for displaying the translation word approval request information, then the translation word approval request information is displayed including the project ID, the word class, the original word or phrase, and the translation word for which the approval is requested. Approval or rejection of the request, the primary check translation word which may be revised as needed, or comment requesting the approver to perform investigation of the approved translation word, are primarily confirmed and entered by the primary checker and stored in the work area of the RAM unit 23, and thus the client A makes the process proceed to step S1253, and the primary check information (the project ID, the translator ID, the word class, the original word or phrase, a primary check translation word, and a processing flag) is transmitted to the management server 150. Rejection of an approval occurs when a translation word that corresponds to the original word or phrase for which the approval was requested is already registered in the common memory and there is no need of the translation word being newly added or revised. In step S1227, the management server 150 receives the primary check information and stores this primary check information in the work area of the RAM unit 23, adds the received primary check information to the approval request history file 153, and makes the process proceed to step S1228. In the step 628, the client A transmits to the client Y operated by the approver the approval request information whose content is identical with the primary check information stored in the work area of the RAM unit 23.

In step S1261, the client Y receives the approval request information, stores the received approval request information in the work area of the RAM unit 23, and receives a dialog user interface indicating the fact that the approval request information has been received as well as an OK button and a Cancel button. When pressing of the OK button on the dialog screen has been received, the client Y displays the approval entry user interface (a user interface for displaying the approval request information, an Approve button, a Reject button, a translation word entry field, a comment entry field, and a Save button) including the approval request information, and makes the process proceed to step S1262. It may also be contemplated that, in step S1261, the client Y does not display the dialog but indicates an icon indication or animation indicating that the approval request information has been received, at a predetermined position, for example, the right corner of the task bar or the like, and displays the approval request entry user interface upon detection of the operation of selecting this icon or the animation.

In step S1262, the approval entry user interface is displayed. When pressing of the Save button has been detected in a state where a text is entered in the translation word entry field or the comment entry field, then the entry classification for identifying the translation word or the comment and the text that has been entered are stored in the work area of the RAM unit 23. When pressing of the Approve button or the Reject button has been detected, an approval flag in accordance with the button that has been pressed is stored in the work area of the RAM unit 23. In step S1263, the client Y transmits, to the management server 150, the approval information (including the project ID, the original word or phrase, the word class, the approved translation word, and the processing flag) including at least the approval flag, the original word or phrase, the approved translation word, the entry classification for identifying the revised approved translation word (if there is any entry in the translation word entry field or the comment entry field) or a comment (1 when the approved translation word was revised; 2 when a comment was entered; and 3 when both of them were entered) stored in the work area of the RAM unit 23, and the entered text.

In step S1229, the management server 150 receives the approval information, stores the received approval information in the work area of the RAM unit 23, and stores a reception time based on the system time; the project ID; the approval flag; the original word or phrase, the word class, approved translation word; a notification flag (disabled by default) indicating whether or not notification to the client has been made; and a reflection flag (disabled by default) for each translator ID, the flag indicating that the approved translation word has been reflected upon multiple sentences for each client operated by the each translator, in the approval request history file of the approval request history storage unit 351 of the hard disk 28 of the management server 150, and makes the process proceed to step S1230. In step S1230, when the approval flag included in this approval information is enabled, the management server 150 updates the common memory 151 that corresponds to the project ID included in the approval information, and transmits, to the client A and the client B, the memory update information (including the project ID, the original word or phrase, the word class, the approved translation word, and the processing flag), and also transmits the memory update information to the client C. The CPU 21 makes the process proceed to step S1231. In step S1231, the management server 150 updates the message board for individual translators and the display information of the common message board (HTML for the management server side to display the message board illustrated in FIGS. 22 to 24 on the screen of the client) using the new approval information. Step S1231 is separately explained with reference to the detailed flowchart illustrated in FIG. 21. Next, the management server 150 makes the process proceed to step S1232, and transmits the approval information to the approval requester and the client operated by the translator having the translation range of which the translator is in charge containing the approved original word or phrase. Details of the processing procedure of step S1232 is separately explained with reference to the detailed flowchart illustrated in FIG. 25.

Figure 22:
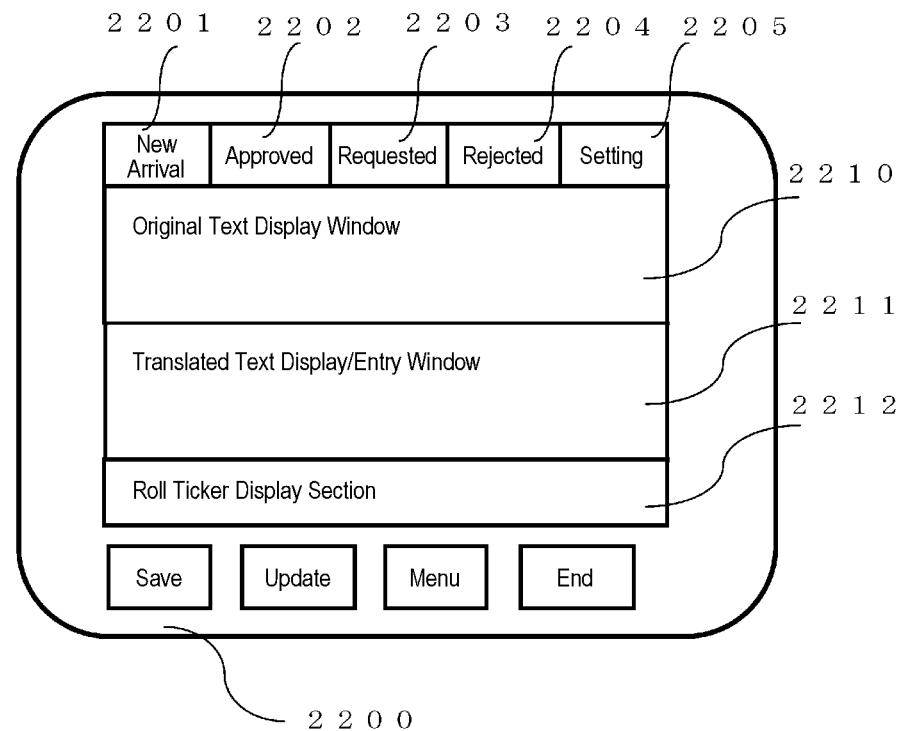
FIG. 22 is a diagram illustrating a screen of the translation support system according to the present invention in a state where an original display window and a translation display/entry window are displayed next to each other on a screen on the client side with display tabs of the memory displayed thereon, amongst which a "New Arrival" tab is selected.
Figure 22:
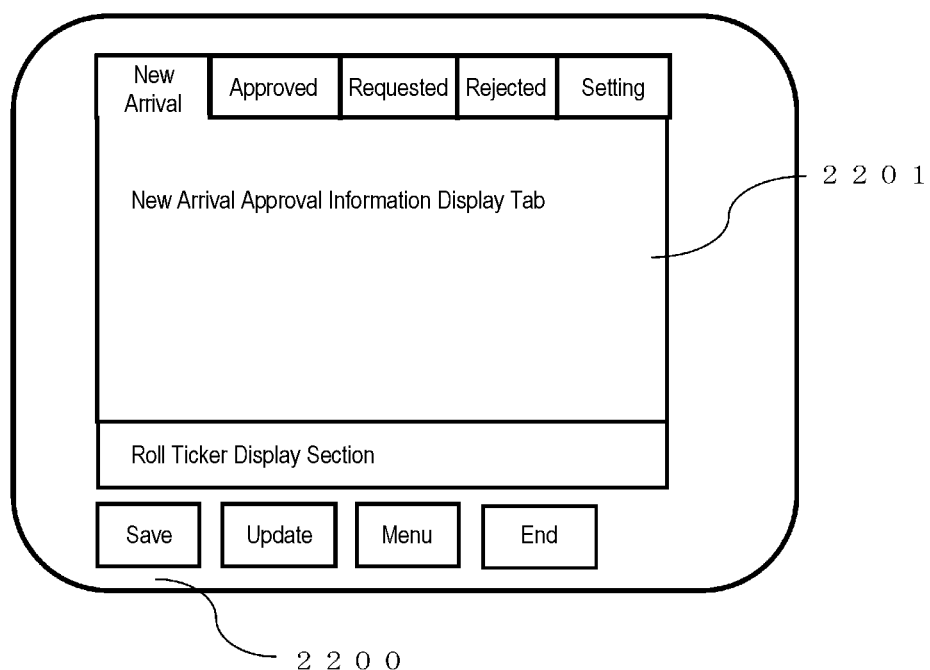
Figure 23:
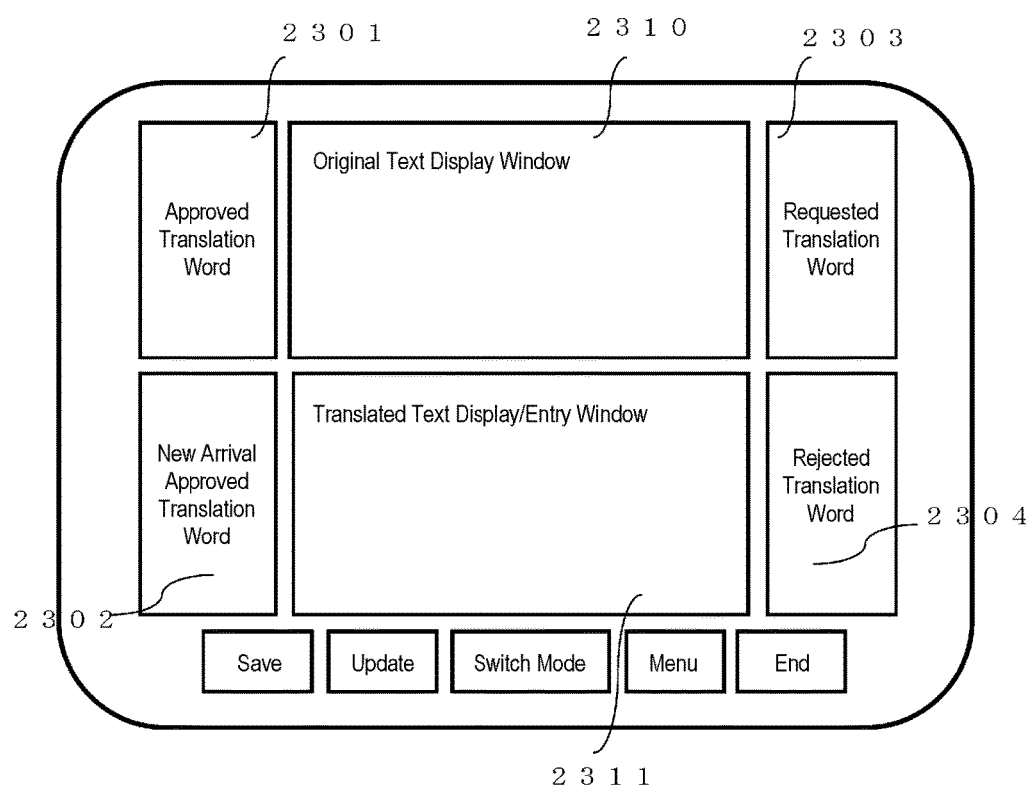
FIG. 23 is a diagram illustrating the screen on the client side displaying the original display window and the translation display/entry window next to each other and arranging small windows at their left and right sides, the small windows indicating the content of individual memory of the translation support system according to the present invention.
Figure 24:
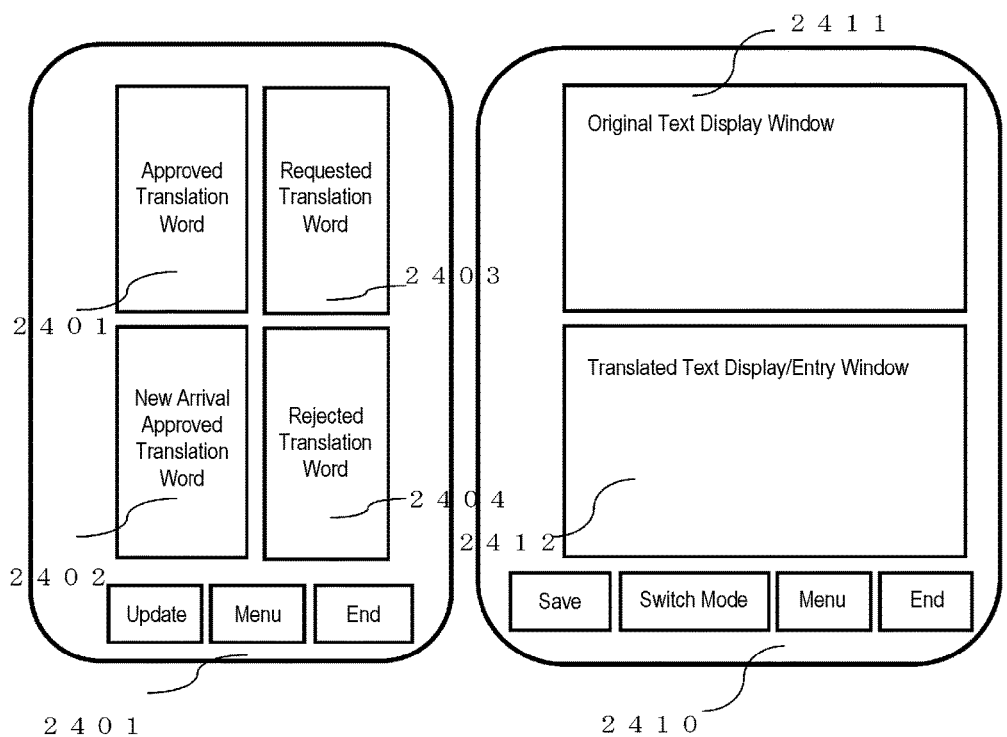
FIG. 24 is a diagram illustrating a multi-window screen on the screen on the client side of the translation support system according to the present invention. The figure illustrates the screen on which an original display window and a translation display/entry window are displayed next to each other with small windows displayed at the left and right sides, the small windows indicating the content of the individual memory, where an edit screen and a memory display screen are displayed on multiple divided screens.

Next, the processing on the side of the client is explained. The client A and the client B respectively receive the memory update information in step S1209, store the received memory update information in the work area of the RAM unit 23, and respectively make the process proceed to step S1210. In step S1210, the client A and the client B respectively use the received memory update information step and updates the local memory 115 or the local memory 125 and the original text corresponding to the project ID, and make the process proceed to step S1211. Details of step S1210 is explained with reference to the flowchart illustrated in FIG. 15. In step S1211, the client A and the client B individually receive the approval notification, store it in the work area of the RAM unit 23, and an icon or animation indicating that the approval notification exists is displayed at a predetermined position, for example, on a task bar on the respective screens. When these icons or animations are selected by a cursor of the mouse, then the client A and the client B make the process proceed to step S1212 and individually display the approval information on the user interface as illustrated in FIGS. 22 to 24. Meanwhile, the client C receives the memory update information in step S1241, stores the received memory update information in the work area of the RAM unit 23, and makes the process proceed to step S1242. In step S1242, the client C uses the received memory update information step and updates the local memory 135 and the original text corresponding to the project ID, and makes the process proceed to step S1243. Details of step S1242 is explained with reference to the flowchart illustrated in FIG. 15. In step S1243, the client C receives the approval notification and stores the received approval notification in the work area of the RAM unit 23, and an icon or animation indicating that the approval notification exists is displayed at a predetermined position, for example, on a task bar of the screen. When this icon or animation is selected by the cursor of the mouse, the client C makes the process proceed to step S1244 and displays the approval information on the user interface as illustrated in FIGS. 22 to 24. This is the end of the explanation of FIG. 12.

Figure 13:
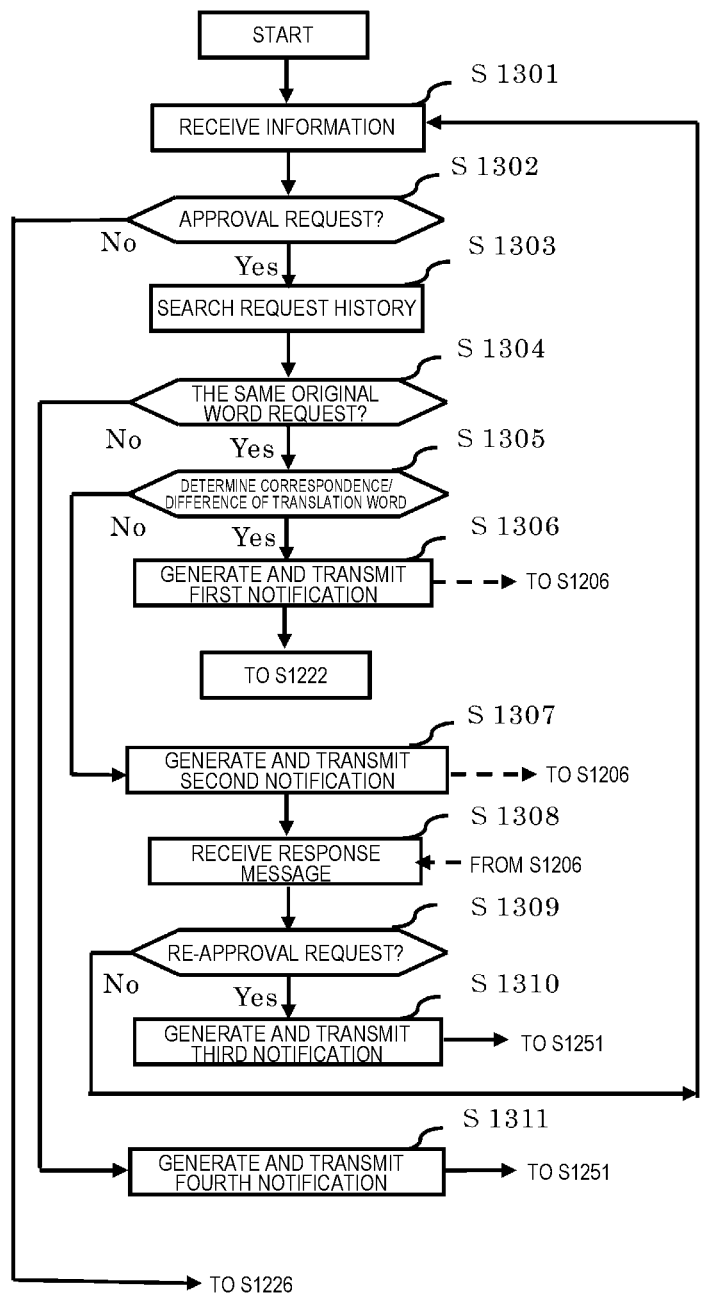
FIG. 13 is a detailed flowchart illustrating details of a case where another approval request is made again for the same original word or phrase of the translation support system according to the present invention.

FIG. 13 is a detailed flowchart of a case where an approval request has been made ((detailed processing procedures of step S1222 to step S1225) of FIG. 12). The following steps S1301 to S1311 are associated with the processing procedures executed under the control of the CPU 21 of the management server 150. Even when an approval request has been made again for the same original word or phrase from a translator other than the requester of this request after the first approval due to overlooking the approval information posted on the message board or the like, the approval request history file 153 storing the request history information stored in the hard disk 28 is searched by using as a key the original word or phrase for which the approval was requested. When the original word or phrase has already been approved, then the original word or phrase, the already approved translation word or phrase, and a message which indicates, for example, that "The original word or phrase XXXX was already registered on Day Δ of Month ○ with the translation word YYYY" are displayed on the terminal of the translator who made the approval request again. Implementation of this display function makes it possible to avoid complication that approval requests having the same content are repeatedly sent to the primary checker.

First, the management server 150 receives the information and stores the received information in the work area of the RAM unit 23 in step S1301, and makes the process proceed to step S1302. In step S1302, the management server 150 determines whether or not the received information is the translation word approval request information. When it has been determined that the received information is the translation word approval request information (including the project ID, the translator ID, the word class, the original word or phrase, and the translation word), then the management server 150 makes the process proceed to step S1303. When it has been determined that it is not the translation word approval request information, the management server 150 makes the process proceed to step S1226. In step S1226, the management server 150 performs the processing in accordance with the operation on the side of the client identified by the received information.

In step S1303, the management server 150 performs search with regard to the same original word or phrase to check whether or not an approval request already exists in the approval request history file 153 of the approval request history storage unit 351 by using as a key the original word or phrase and the translation word of the new translation word approval request information. When an approval request whose original word or phrase is identical exists, then the management server 150 stores the corresponding original word or phrase, the approved translation word, and the date of approval in the work area of the RAM unit 23. When an approval request whose original word or phrase is identical does not exist, then the management server 150 stores a message, the message indicating that there is no identical original word or phrase, in the work area of the RAM unit 23, and makes the process proceed to step S1304. In step S1304, the management server 150 refers to the work area of the RAM unit 23 and determines whether or not there already exists an approval request having the same original word or phrase in the approval request history file 153. When it has been determined that the approval request having the same original word or phrase exists, then the management server 150 makes the process to proceed to step S1305. When it has been determined that the approval request having the same original word or phrase does not exist, then the management server 150 makes the process to proceed to step S1311. In step S1305, when an approval request with the same original word or phrase and the same translation word exists in the approval request history file 153, then the management server 150 makes the process to proceed to step S1306.

In step S1306, the management server 150 generates first notification information (for example, a message representing the fact that an approval has already been made, such as "The original word or phrase XXXX was approved with the translation word YYYY on Day Δ of Month ○."), stores the first notification information in the work area of the RAM unit 23, and then transmits the first notification information to the client B operated by the translator who made the request. Meanwhile, when the translation word is not identical in step S1305, then the management server 150 makes the process to proceed to step S1307. In step S1307, the management server 150 uses the message information read from the notification storage unit 355 and generates information for displaying a confirmation message on the screen of the client of the approval requester (second notification information), stores the second notification information in the work area of the RAM unit 23, and transmits this second notification information (for example, a confirmation message such as "The original word or phrase XXXX has been approved with the translation word YYYY on Day Δ of Month ○. Is it really all right with this translation word?") to the client B, and requests the translator operating the client B which made the request to make a response regarding whether it is all right with this translation word or this request is a re-approval request, and makes the process proceed to step S1308 to wait for the response. When the management server 150 has received the response message from the client B in step S1308, then the management server 150 stores this response message in the work area of the RAM unit 23 and makes the process proceed to step S1309.

When a response to the effect that "consent given to the approved translation word" is received from the client operated by the translator in step S1309, then the management server 150 makes the process go back to step S1301. When the received response is to "disagree with the approved translation word" (re-approval request), then the management server 150 makes the process go back to step S1310. In step S1310, the management server 150 adds, to the translation word approval request information, the item of approval eligibility flag (initially disabled), the item of processing flag (initially disabled), and information indicating that this request is a re-request and thus generates third notification information, stores the third notification information in the work area of the RAM unit 23, and, to the client A operated by the primary checker, generates this third notification information (re-approval request information regarding the same original word or phrase), stores the third notification information in the work area of the RAM unit 23, and transmits the third notification information from the management server 150. The client A receives this third notification information and executes step S1251. In step S1311, the management server 150 generates fourth notification information which is new approval request including translation word approval request information with the item of approval eligibility flag (initially disabled) and the item of processing flag (initially disabled) added thereto, stores the fourth notification information in the work area of the RAM unit 23, and transmits the fourth notification information to the client A operated by the primary checker. The client A receives this third notification information and executes step S1251.

It may also be contemplated that processing procedures of a flowchart similar to that of this FIG. 13 are executed by the client Y operated by the approver. The differences are explained below. In FIG. 13, the approval request history file 153 that stores the request history information is stored in the hard disk 28 of the management server 150. In contrast, the approval request history file 153 will be stored in the hard disk 28 of the client Y (or search is made from the client Y with regard to the approval request history file 153 of the management server 150), which is the difference with respect to FIG. 13. Also, the translation word approval request information is not received via the management server 150 but directly from another client and stored in the work area of the RAM unit 23 and thus the processing is performed, which is another difference with respect to FIG. 13. It will be appreciated that another configuration is also possible according to which the management server 150 simply transfers the information to the client A.

Steps S1301 to S1309 will be performed in the same manner except that they are executed by the client Y. With regard to step S1310, the difference lies in the fact that the display information for displaying the original word or phrase, the requested translation word, and the first message indicating that this request is a re-approval request is generated and displayed on the screen of the client Y. In step S1311, the difference lies in the fact that display information for displaying the original word or phrase, the requested translation word, and the second message indicating that this request is a new approval request is generated and displayed on the screen of the client Y. Further, the difference also lies in the fact that the message as such indicating that there is a re-approval request or a new approval request or indirect information such as an icon or animation, etc. representing the presence of these messages is displayed on the screen of the client Y. Also, it may be contemplated that in step S1306 to step S1308 which are exchange of messages with the client operated by the requester, the client operated by the requester and the client Y operated by the approver directly exchange the messages or exchange the messages via the management server 150. This is the end of the explanation of FIG. 13 and its modified example.

Figure 14:
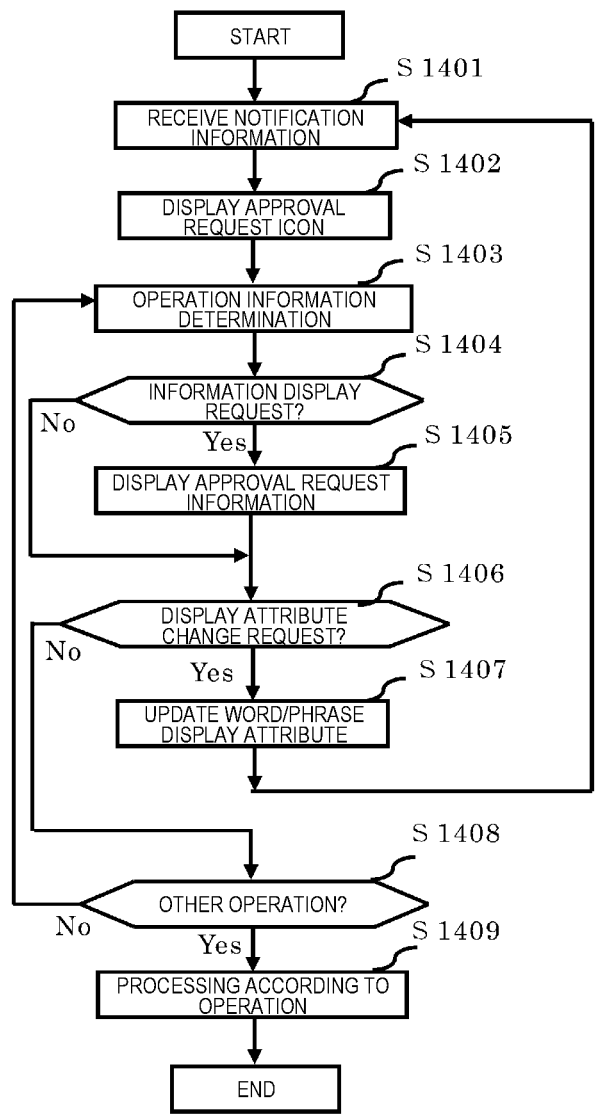
FIG. 14 is a diagram illustrating a detailed flowchart of original display attribute update processing of step S1240 of FIG. 12 of the translation support system according to the present invention.

Next, the flowchart of FIG. 14 is explained. In the flowchart of FIG. 14 and in FIG. 12 illustrating the details of the original display attribute modification processing of step S1240 of FIG. 12, this is a flowchart of the processing executed by the client C. It is also contemplated that the client C is only an example and the processing may be executed by another client. The individual processing procedures of steps S1401 to S1409 are those that are executed under the control of the CPU 21 of the client C. In step S1401, when the client C receives notification information, the client C makes the process proceed to step S1402. In step S1402, the client C displays an icon at a predetermined position, for example, on a task bar of the screen or a gadget display area, or a predetermined position on a window of application, the icon indicating that the notification information of the approval request has been received, and makes the process proceed to step S1403. The location of display is not limited to the above. Alternatively, it is also contemplated that a small animation can be displayed in place of the icon.

Figure 16:
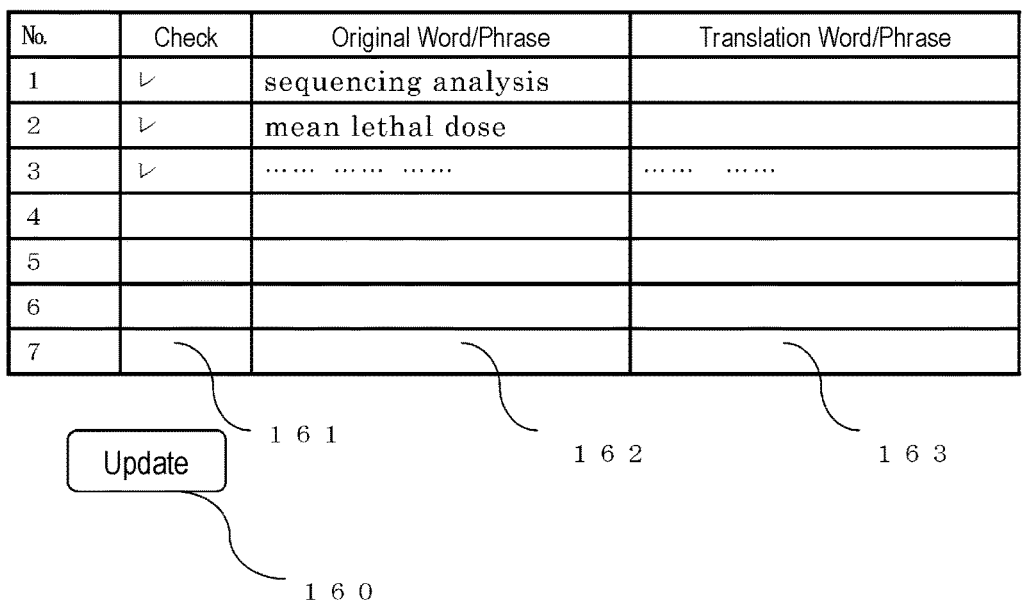
FIG. 16 is a diagram illustrating a screen for displaying the approval list information and performing memory update processing.

In step S1403, the client C makes determination regarding the operation information. Specifically, the client C determines presence or absence of an event, for example, such as pressing of a left button of the mouse. When the occurrence of an event has been determined, the client C makes the process proceed to step S1404. In step S1404, when the client C determined that the icon indicating the reception of the notification information of the approval request had been selected by clicking of the left button of the mouse, the client C makes the process proceed to step S1405. In step S1405, the client C displays a list of information regarding the approval request in-progress on a not-shown attribute change user interface which is similar to the user interface as illustrated in FIG. 16. The attribute change user interface differs from the user interface of FIG. 16 in that a "Change Attribute" button is displayed in place of the "Update" button. When this attribute change user interface is displayed, then the client C makes the process proceed to step S1406.

In step S1406, when pressing of the "Change Attribute" button has been detected, the client C makes the process proceed to step S1407. In step S1407, the display attribute is changed with regard to the original word or phrase for which a check mark is entered in the checkbox on the attribute change user interface. The display attribute is stored in advance in the hard disk 28 of each client as the configuration information and can also be changed. In step S1406, if the "Change Attribute" button is not pressed, then the client C makes the process proceed to step S1408. In step S1408, when it has been determined that any operation other than pressing of the "Change Attribute" button was made, then the client C makes the process proceed to step S1409. When it has been determined that no operation was made, then the client C makes the process go back to step S1403. In step S1409, the client C executes processing procedure in accordance with the operation. This is the end of the explanation of FIG. 14.

Figure 15:
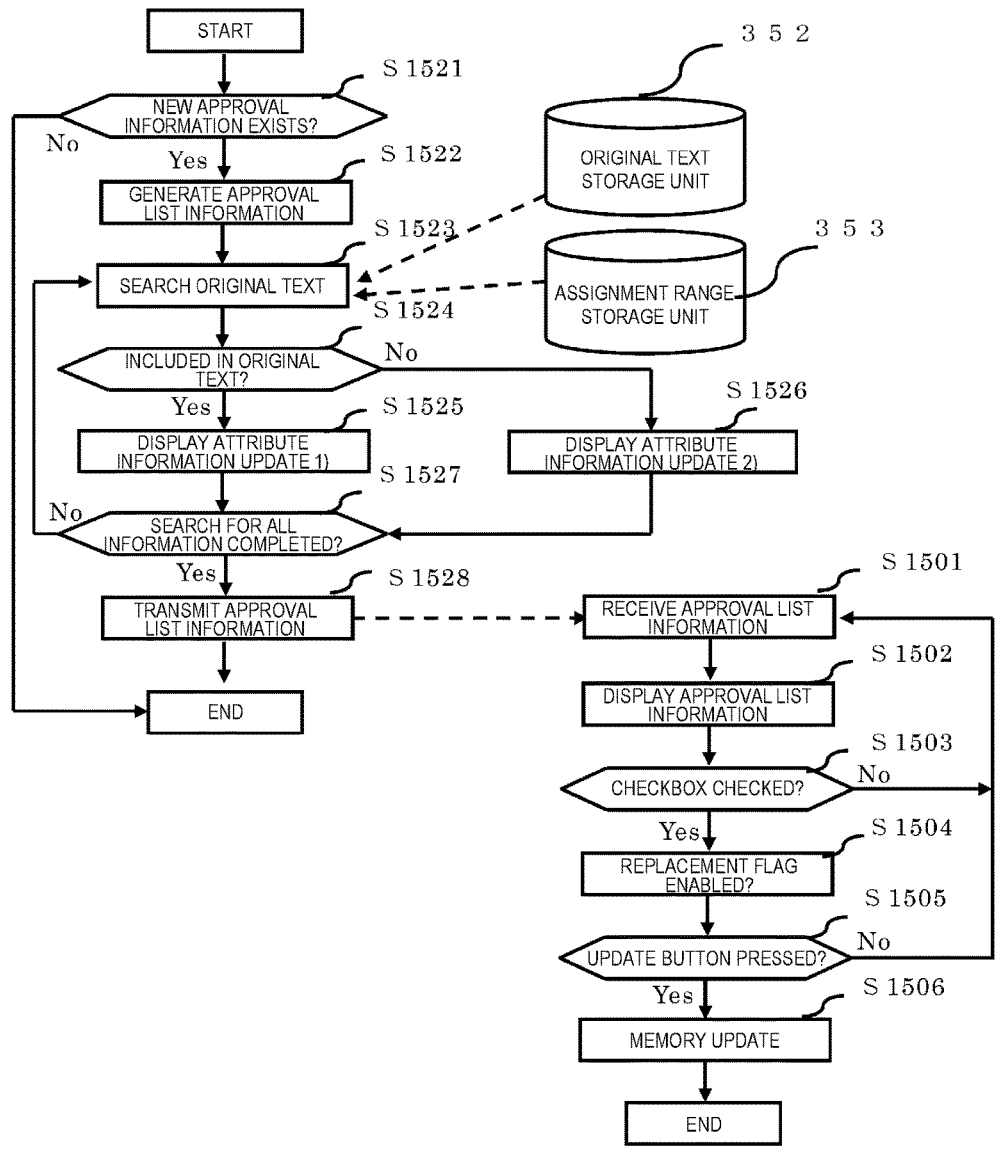
FIG. 15 is a detailed flowchart illustrating details of the local memory update processing on the client side of the translation support system according to the present invention.

Next, FIG. 15 is a detailed flowchart that illustrates the details of the local memory update processing (steps S1210 and S1242 of FIG. 12) on the client side. In FIG. 15, steps S1521 to S1528 are associated with the processing procedures that are executed under the control of the CPU 21 of the management server 150, and steps S1501 to step S1506 are associated with the processing procedures that are executed under the control of the CPU 21 of the client B. First, in step S1521, when it has been determined that new approval information was received, the management server 150 makes the process to proceed to step S1522. In step S1522, the management server 150 generates a work file including No., the original word or phrase, the translation word or phrase, and the display attribute on the basis of the newly received approval information, stores the work file in the work area of the RAM unit 23, and makes the process to proceed to step S1523. In step S1523, the management server 150 searches the assignment range storage unit 353 by using as keys the translator ID of this translator and the project ID included in the approval information stored in the work area of the RAM unit 23, and searches the original text storage unit 352 by using the original word or phrase as a key with regard to the identified translation assignment range, stores the search result (the project ID, the translator ID, the paragraph number, the sentence number, and the original word or phrase) in the work area of the RAM unit 23, and makes the process proceed to step S1524.

In step S1524, the management server 150 determines whether or not this original word or phrase is contained in the original text within the translation range in charge on the basis of the result of search in step S1523 stored in the work area of the RAM unit 23. When it has been determined that this original word or phrase is contained in this original text, the management server 150 makes the process proceed to step S1525. In step S1525, the management server 150 changes the display attribute of the original word or phrase contained in the original text within the translation assignment range to a predetermined display attribute R (for example, the character color of the characters is changed to orange color), and makes the process proceed to step S1527. Meanwhile, in step S1524, when it has been determined that this original word or phrase is not contained in the original text within the translation range in charge, the management server 150 makes the process proceed to step S1526. In step S1526, the management server 150 changes the display attribute of the word or phrase that is not contained in the original text within the translation range to a predetermined display attribute P that is different than the display attribute R (for example, the character color of the characters is changed to violet color), and makes the process proceed to step S1527. Here, another processing may also be contemplated according to which only either of steps S1525 and S1526 is executed, in other words, only either one of the display attributes is changed, while the display attribute is not changed in the other of steps S1525 and S1526. It therefore suffices that the word or phrase that is contained in the translation range and the word or phrase that is not contained in the translation range are readily distinguished from each other.

In step S1527, when it has been determined that search for all of the newly received approval information and change to the display attribute are completed, the management server 150 makes the process proceed to step S1528. In step S1528, the management server 150 generates display information (the approval list information (the original word or phrase 162 and the translation word or phrase 163)) for displaying a user interface as illustrated in FIG. 16 on the client, transmits the generated display information to the client B, and thus ends the processing. Meanwhile, when it has been determined in step S1527 that the search for all of the approval information and updating of the display attribute are not completed, then the management server 150 makes the process go back to step S1523. The client B receives the approval list information in step S1501, stores the received approval list information in the work area of the RAM unit 23, and makes the process proceed to step S1502. In step S1502, the client B displays a user interface as illustrated in FIG. 16 and makes the process proceed to step S1503. In step S1503, the client B determines whether or not a check mark is entered in a checkbox 161 of a particular row. When the check mark is entered, the client B makes the process proceed to step S1504. In step S1504, the client B sets a replacement flag of the approval information corresponding to the checkbox, the replacement flag being stored in the work area of the RAM unit 23, and makes the process proceed to step S1505. When no check mark is entered, the client B makes the process go back to step S1501. In step S1505, when pressing of an "Update" button 160 on the user interface of FIG. 16 has been detected, the client B makes the process proceed to step S1506. In step S1506, the client B updates the local memory of the client operated by this translator with the memory data for the approval information for which the replacement flag is enabled, and thus ends the processing. In step S1506, when pressing of the "Update" button 160 was not detected, then the client B makes the process go back to step S1501. This is the end of the explanation of FIG. 15.

Next, following the update processing of FIG. 15, or on the assumption that automatic reflection is applied to the local memory, the following two modified embodiments are explained as methodology of updating an approved translation word for a translation word of the currently handled translated text. In the first modified embodiment, with regard to step S1507 of FIG. 15, a bilingual display of the original word or phrase 1802 and the translated text 1803 for one paragraph or preceding three to five sentences and the succeeding three to five sentences and the display of the checkbox 1801 as illustrated in FIG. 18 are displayed, which is the feature with respect to the list user interface of FIG. 16.

Figure 17:
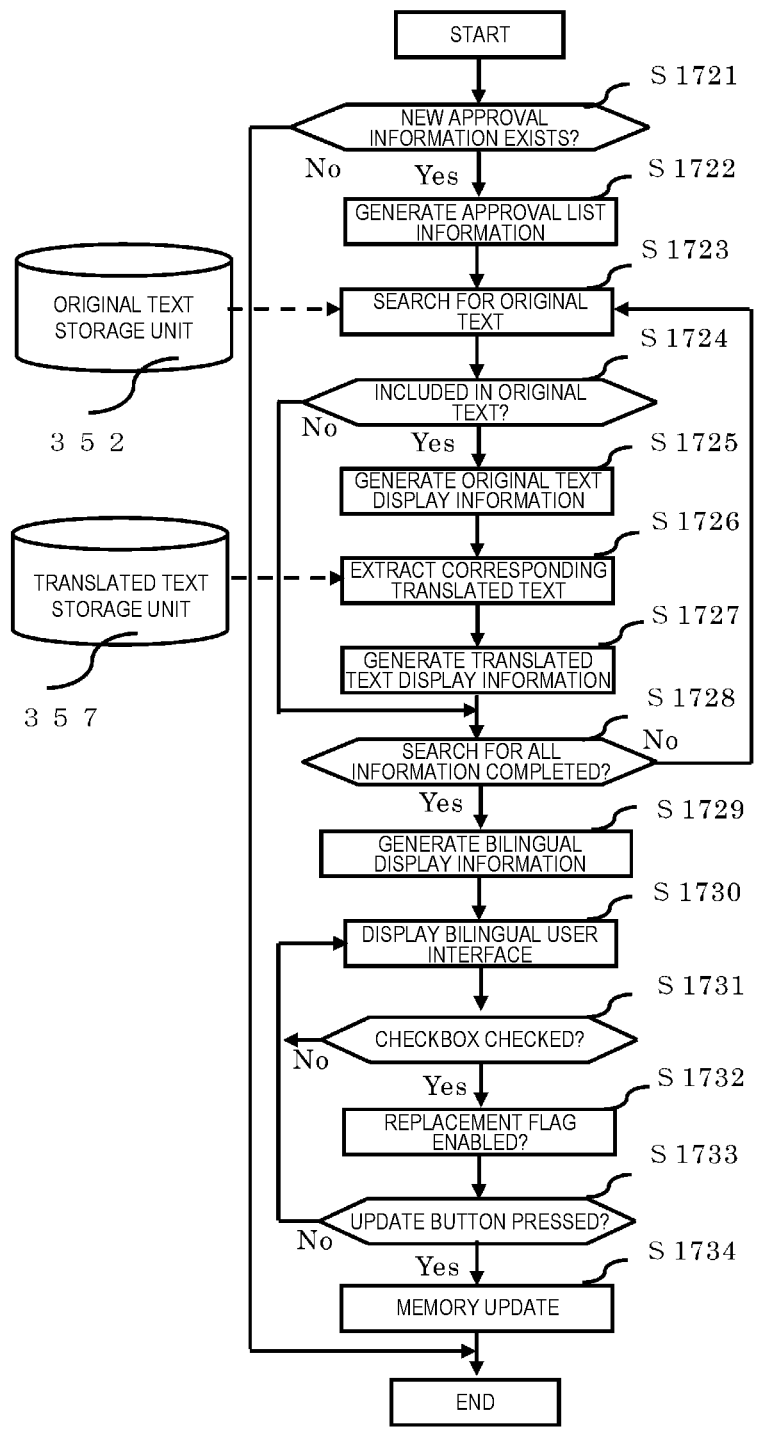
FIG. 17 is a detailed flowchart illustrating details of a modified embodiment of memory update processing of the translation support system according to the present invention.

The following illustrates the processing on the side of the client with regard to the difference with regard to the above-described memory update processing with reference to the flowchart of FIG. 17. Steps S1721 to S1725 are the same or similar processing procedures of the above-described step S1501 to step S1505 of FIG. 15 and explanation thereof is omitted. In step S1726, the management server 150 searches for a translated text portion corresponding to the original text portion, by using as keys the paragraph number and the sentence number of the display information of the original text generated in step S1725, outputs the original word or phrase, the original text portion including this original word or phrase, and the corresponding translated text portion that is the search result, to the work area of the RAM unit 23 as a work file, and makes the process proceed to step S1727. Details of the search processing of step S1726 are the same as those of the search processing of step S703 of FIG. 7. In step S1727, management server 150 generates the display information including a checkbox 1801 for updating the translation words and outputs the generated display information to the work area of the RAM unit 23 as a work file, and makes the process proceed to step S1728. In step S1728, the client determines whether or not search for all information of the original text portion within the assignment range has been completed. When it has been determined that the search has been completed, then the client makes the process proceed to step S1729. When it has been determined that it is not completed, the client makes the process go back to step S1723.

In step S1729, when there are multiple translation word updates for one single sentence, then the management server 150 deletes the overlapped original text and the translated text, and in order to display the bilingual display screen including displaying multiple update checkboxes 1501 on the display field of one sentence, generates the display information, and makes the process proceed to step S1730. In step S1730, a bilingual display screen for memory update as illustrated in FIG. 18 is displayed, and the process is made to proceed to step S1731. It should be noted that on the user interface of FIG. 18, when multiple update checkboxes 1801 are to be displayed on the display field of one sentence, information for identifying the word or phrase to be reflected (for example, *1, *2, etc.) is displayed for example, adjacent to the right side of the checkbox, and "(*1)," "(*2)," etc. are also displayed immediately after the corresponding original word or phrase to clarify the association (this portion is not shown). Step S1731 to step S1734 are the same or similar to steps S1508 to S1511 of the above described FIG. 15, respectively, and accordingly the explanation thereof is omitted. This is the end of the explanation of the flowchart of FIG. 17.

Figure 19:
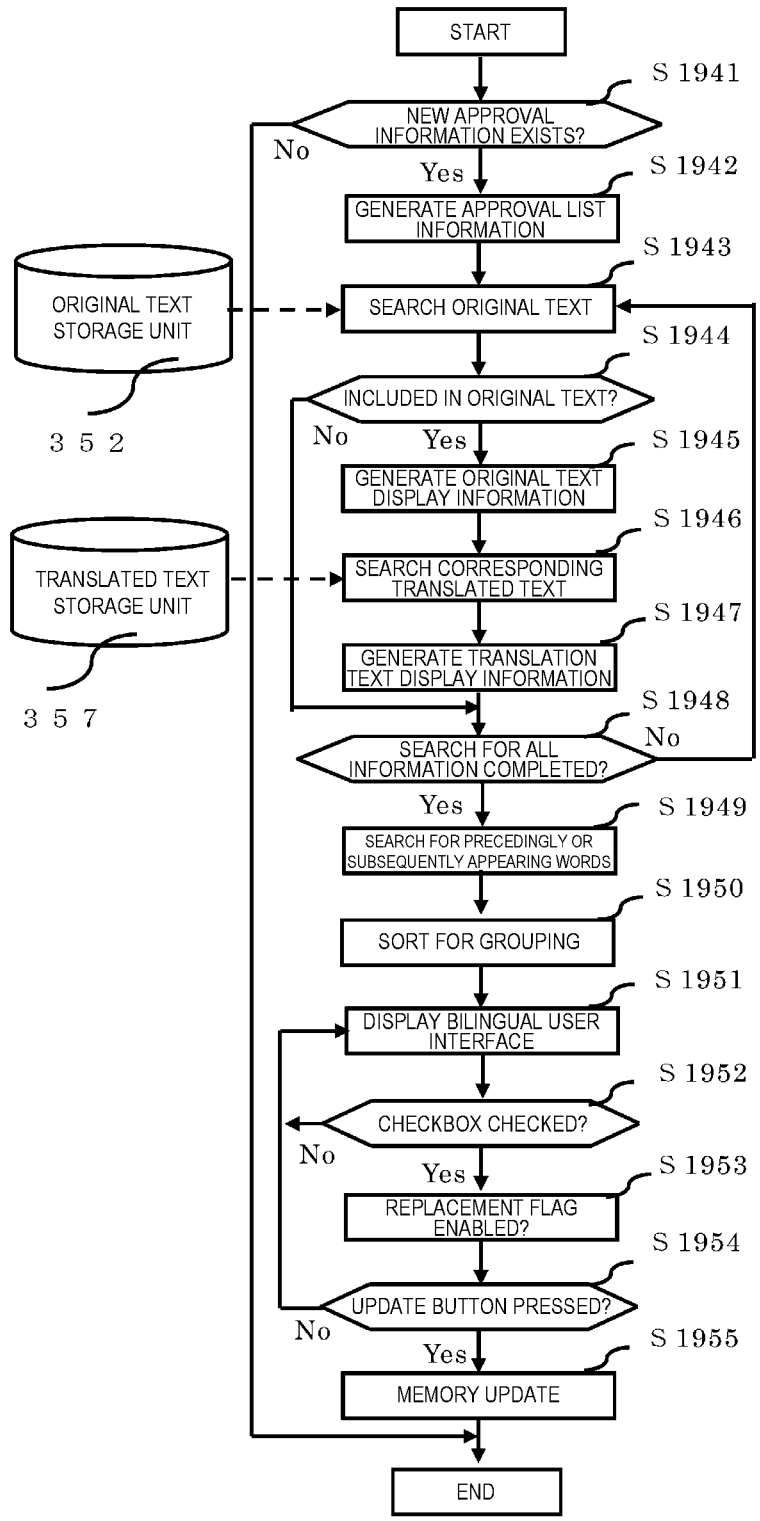
FIG. 19 is a detailed flowchart illustrating details of another modified embodiment of the memory update processing of the translation support system according to the present invention.

Next, the second modified embodiment is explained using the flowchart of FIG. 19 and the user interface of FIG. 20. In accordance with the second modified embodiment, processing is executed according to which words or phrases in the order of one to two words preceding or succeeding the approved word or phrase and having high similarity thereto are grouped in to a plurality of groups and indicated together, making it possible to perform collective updating in units of groups. Steps S1941 to S1945 in the flowchart of FIG. 19 are the same as or similar to step S1501 to step S1505 of FIG. 15 and accordingly the explanation thereof is omitted.

In step S1946, the management server 150 searches for the corresponding translated text by using as keys the paragraph number and the sentence number included in the original display information generated in step S1945, outputs the corresponding translated text in the work area of the RAM unit 23 as a work file, and makes the process proceed to step S1947. In step S1947, the management server 150 generates display information of the translated text, stores the display information in the work area of the RAM unit, and makes the process proceed to step S1948, which takes place in the same or similar manner as in step S1527 and detailed explanation thereof is omitted. In step S1948, the management server 150 determines whether or not search for all of the translated texts corresponding to the original text is completed. When it has been determined that it is completed, then the management server 150 makes the process proceed to step S1949. When it has been determined that it is not completed, then the management server 150 makes the process go back to step S1943. In step S1949, the management server 150 searches for a translated text portion including the same translation word, outputs the translated text portion to the work file of the RAM unit 23, and makes the process proceed to step S1950. In step S1950, for the translated text portion of the work file of the RAM unit 23, a predetermined number of words or characters (for example, two to three words or three to four characters) before and after the same translation word are subjected to the comparison, and for the same translation word, the sentences containing a predetermined number of preceding and succeeding words or characters (for example, two to three words or three to four characters) similar to the same translation word are grouped into one group, and the work files are sorted by the groups of "translation word>preceding/succeeding words (or characters)," and thus the management server 150 makes the process proceed to step S1951. With regard to the similarity as used herein in the context of step S1950, for example, words are determined to be similar even when they differ in "a" and "the" in the case where the translated text is written in English as long as the word or words that follow are identical.

In step S1951, the user interface to be displayed includes, as illustrated in FIG. 20, a check field 2001, an original text 2002, a translated text 2003, and an Update button 2000 which are displayed as one set for each group. Also, in the second group, a check field 2011, an original text 2012, a translated text 2013, and an Update button 2010 are respectively displayed, and the client makes the process proceed to step S1952. In the third group of FIG. 20, a check field 2021, an original text 2022, a translated text 2023, and an Update button 2020 are displayed, and the memory data is updated by pressing of the Update buttons respectively in units of groups, which is the difference with respect to the user interface of FIG. 18. Steps S1952 to S1955 are the same or similar to steps S1531 to S1534 of FIG. 15, respectively, and explanation of thereof is omitted. This is the end of the explanation of FIG. 19.

Figure 21:
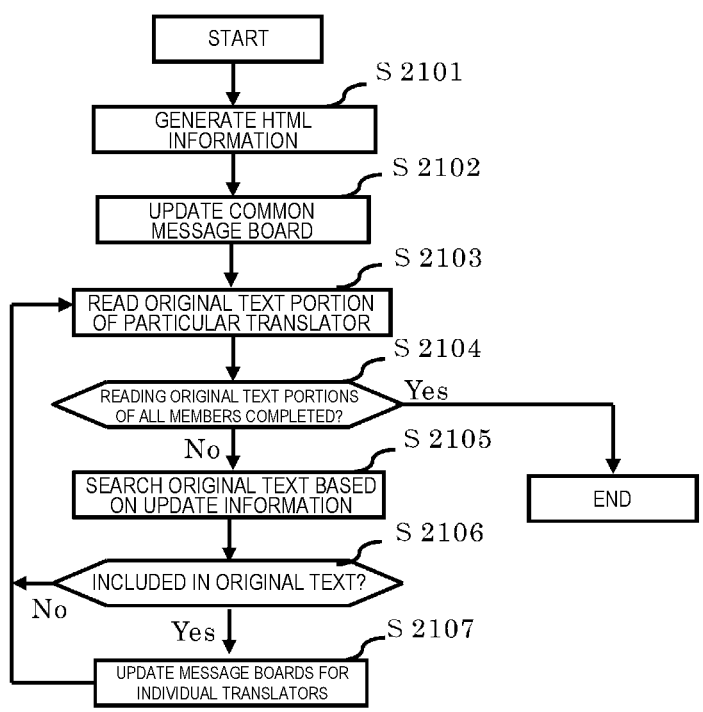
FIG. 21 is a detailed flowchart illustrating details of message board update processing of the translation support system according to the present invention.

FIG. 21 is a detailed flowchart that illustrates the details of the message board update processing (step S1231 of FIG. 12), which is the processing that is executed under the control of the CPU 21 of the management server 150. In step S2101, the management server 150 generates HTML information for providing display on the message board using the received update information, stores the generated HTML information in the work area of the RAM unit 23, and makes the process proceed to step S2102. In step S2102, the management server 150 uses the HTML information by which the information of the common message board is generated, and updates the display information of the message board. In step S2103, the management server 150 stores the original text portions for which the individual translators are in charge of translation in the work area of the RAM unit 23 in accordance with the on-a-per-translator basis assignment ranges stored in the translation assignment range table of the management file 1), and makes the process proceed to step S2104. In step S2104, the management server 150 determines whether or not the processing procedures of the storage processing for storing the original text portions for which all of the translators are in charge of translation in the work area of the RAM unit 23 and the processing procedures of step S2105 to step S2107 are completed. When the processing procedures are not completed, the management server 150 makes the process proceed to step S2105. When the processing procedures for all of the translators of this project are completed, the management server 150 ends the process.

In step S2105, the management server 150 searches for the original text portion for one translator with the original word or phrase of the update information received this time. In step S2106, when it has been determined that the original word or phrase of the update information received this time is contained in the original text portion of this translator, then the management server 150 in step S2107 updates the message board information so as to post the update information on the message board for this translator. By this processing, each translator is only allowed to refer to the approval information that is necessary for their own translation range. The original word or phrase that is not contained in their own translation range but is necessary to refer to other portions can be independently confirmed by the approved message board which is a common message board. Alternatively, the original word or phrase (or its translation word) contained in the translation assignment range and the original word or phrase (or its translation word) that is not contained in the translation assignment range can be displayed with different display attributes (for example, different character colors or different background colors).

The private message board and the common message board are displayed, as illustrated in FIG. 22, with the message board section displayed in the form of a tab in the similar manner as in the case of a tab browser as part of the entry and edit user interface on which an original display window and a translation display/entry window are juxtaposedly arranged. Accordingly, by moving the cursor so as to reside on the tab section (2201 to 2205) and pressing the button of the mouse, it is made possible to switch in one single operation the display of the private message board and the common message board. The user interface at the bottom of FIG. 22 illustrates a display state where a new arrival approval information tab 2201 is selected.

Also, the private message board includes: a "New Arrival" approval information display tab 2201 for displaying the new-arrival approval memory data which is memory information newly approved by the approver; a "Request-Pending" tab 2203 for the above mentioned request-pending translation word of the translation word approval request information stored in the hard disk 28; and a tab 2204 for rejected translation word including the original word or phrase and the original translation word in the case where the translation word information has been approved after having been revised. As the common message board, there is provided an "Approved" tab 2202 for already approved translation words. Further, on the tab for the message board, there are provided a "Setting" tab 2205 and a not-shown "Setting" menu, and the display mode of the approval information of the memory data can be selected.

It can be specified by the "Setting" tab 2205 or the "Setting" menu whether or not an original word or phrase that is not contained in the original text portion within the assignment range to be translated by the translator himself/herself, and whether or not its translation word should also be displayed in the "New Arrival" approval information display tab 2201. When the original word or phrase that is not contained in the original text portion within the assignment range and its translation word are to be displayed, then (i) the font display color and background display color of the original words or phrases contained in the original text portion within the assignment range and its translation word and (ii) the font display color and background display color of the original word or phrase that is not contained in the original text portion within the assignment range and its translation word, can be specified. Further, it is possible to specify the specific duration of time (for example, 12 hours, one day, two days, etc.) after the new reception during which display should be maintained as the new-arrival approval memory data. Also, with regard to each one of the new-arrival approval memory data, the approved memory data, the request-pending memory data, and the rejected memory data, it is possible to specify the display timing (upon reception of the notification, once for every 30 minutes, once for every one hour, for three hours from 9 a.m., etc.).

Further, as illustrated in FIG. 22, settings may be done via the "Setting" tab 2205 or the "setting menu" such that the original word or phrase and the translation word of the new arrival memory data are displayed so that they slide from the right to the left in a landscape roll ticker display section 2212 in a roll telop form.

Also, as illustrated in FIG. 23, elongated mini windows which are four in total and (portrait windows displayed such that navigation windows are displayed on the left and right sides of main windows) are displayed on the left side and the right side at the left and right end portions of the original display window 2310 and the translation display/entry window 2311 that are juxtaposedly arranged on the user interface, in one of which only the original word or phrase of the newly arrived approved translation word 2302, or the original word or phrase and the translation word is displayed. Also, settings may be done via the "Setting" tab 2205 or the "Setting Menu" such that the corresponding original word or phrase only or both of the original word or phrase and the translation word are displayed with regard to the other three words, i.e., an approval request in-progress translation word 2303, an approved translation word 2301, and a rejected translation word 2304 indicative of the rejected approval request. By providing display in this manner, it is made possible to efficiently proceed with the translation operations while making reference as appropriate to the approved information.

Further, as illustrated in FIG. 24, mini windows are displayed at upper, lower, left, and right sides, and thus by four in total on another user interface 2401 that is different from an original display window 2411 and a translation display/entry window 2412 that are juxtaposedly arranged in the user interface 2410, on one of which an original word or phrase only of the newly arrived approved translation word 2402, or both of the original word or phrase and the translation word are displayed. Also, settings may be done via the "Setting" tab 2205 or the "Setting Menu" such that the corresponding original word or phrase only or both of the original word or phrase and the translation word are displayed with regard to the other three words, i.e., an approval request in-progress translation word 2403, an approved translation word 2401, and a rejected translation word 2404 indicative of the rejected approval request. By providing display in this manner, it is made possible to efficiently proceed with the translation operations, for example, by displaying the user interface 2410 for translation operation to the front in a large size on the screen in a normal state and by displaying the user interface 2401 to the front in a large size when referring as appropriate to the approved information.

Figure 25:
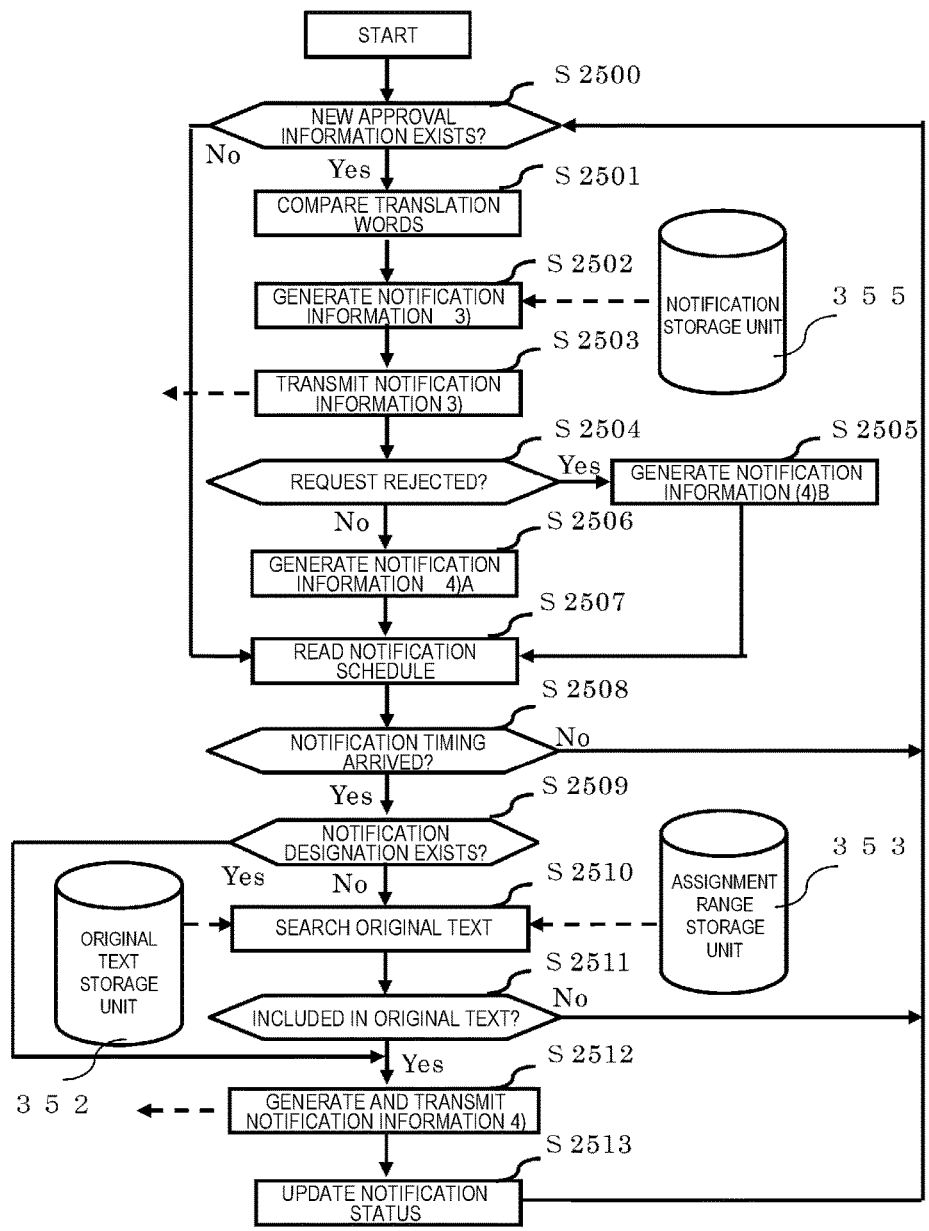
FIG. 25 is a detailed flowchart illustrating details of approval notification processing of the translation support system according to the present invention.

FIG. 25 is a detailed flowchart that illustrates the details of the approval notification processing (step S1232 of FIG. 12). In step S2500, when it has been determined that new approval information was received, the management server 150 makes the process proceed to step S2501. When it has been determined that no new approval information has been received, the management server 150 makes the process proceed to step S2507. In step S2501, the requested translation word in the translation word approval request information is compared with the approved translation word. When the requested translation word is not in agreement with the approved translation word (when the translation word was approved after being revised), a revise flag is enabled. When the requested translation word is in agreement with the approved translation word, the revise flag is disabled and the requested translation word is stored in the work area of the RAM unit 23, and thus the management server 150 makes the process proceed to step S2502. In step S2502, the management server 150 further reads from the notification storage unit 355 at least either one of the message or the display attribute in accordance with the revise flag (presence or absence of the translation word revision) and generates notification information 3) which is information to be notified to the original requester (the client B) and stores the notification information 3) in the work area of the RAM unit 23. The notification information 3) includes the project ID, the word class, the original word or phrase, the approved translation word, and the message read from the notification storage unit 355. When the revise flag is enabled, a message is added to the notification information 3), the message indicating that the translation words were revised, for example, such as "The translation word XXX was approved after being revised as the translation word YYY." Alternatively, in addition to the above mentioned message indicating that the translation word was revised or in place of this message, the information for displaying the display attribute of the revised translation word is changed (for example, the display thereof is changed to red characters), or alternatively, the information for identifying the display attribute (for example, at least either one of information for identifying the display color of characters, information for specifying a background color of a character portion, and information for specifying a typeface of characters) is also generated and included in the notification information 3). The management server 150 makes the process proceed to step S2503.

In step S2503, the management server 150 transmits notification information 3) to the client B. In this manner, when an approval is made, notification is unconditionally sent to the original requester and the management server 150 makes the process proceed to step S2504. In step S2504, the processing branches depending on whether or not the request has been rejected. Specifically, when the request has been rejected (a case where the approval flag stored in the work area of the RAM unit 23 is disabled), the management server 150 makes the process proceed to step S2505. In step S2505, notification information 4)B indicating that the request was rejected (information to be displayed on the tab 2204 for rejected translation word of FIG. 22 or the rejected translation word window 2304 of FIGS. 23 and 24, etc.) is generated, and the management server 150 stores the notification information 4)B in the work area of the RAM unit 23 and makes the process proceed to step S2507. When the request is not rejected (in a case where the approval flag stored in the work area of the RAM unit 23 is enabled), the management server 150 makes the process proceed to step S2506. In step S2506, the management server 150 generates notification information 4)A indicating that the request has been approved, stores the notification information 4)A in the work area of the RAM unit 23, and makes the process proceed to step S2507. The notification information 4)A in normal cases does not include a message indicating that the request was approved after having been changed. This is because it is contemplated that the translator of the request-source in normal cases does not need to know the originally requested translation word other than the approved translation word as the result of the approval.

In step S2507, a notification schedule (for example, every three hours, or 9:00 a.m., 1:00 p.m., 5:00 p.m., etc.) for the other translators other than the request-source translator is read from the configuration file of the hard disk 28 and stored in the work area of the RAM unit 23. In step S2508, it is determined whether or not the notification time has been reached based on comparison with the system time. When there is any notification schedule for the translator for which the notification time has been determined to be reached, then the management server 150 makes the process proceed to step S2509. When no notification schedule has been reached for any one of the schedules for the translators, the management server 150 makes the process return to step S2500. In step S2509, when the translator has specified the option to make notifications for approval information of words or phrases that are not contained in the original text portion which the translator himself/herself translates, the management server 150 makes the process proceed to step S2512.

In step S2512, the management server 150 makes the notification also in a case where a word or phrase that is not contained in the original text portion of which the requester is not in charge is approved. In step S2509, when an option for notifying the approval information of the word or phrase that is not contained in the original text portion is not designated, the management server 150 makes the process proceed to step S2510. In step S2510, the management server 150 searches the original file of the original text storage unit 352 within the range based on the translation assignment range table of the original text storage unit 352 to check whether or not the original word or phrase included in the approval information is contained in the translation assignment range of the original text portion of which this translator is in charge. The management server 150 stores the search result in the work area of the RAM unit 23 and makes the process proceed to step S2511. In step S2511, when the original word or phrase has been found by the search (when the original word or phrase is contained in the translation assignment range), the management server 150 makes the process proceed from step S2511 to step S2512. Meanwhile, the original word or phrase was not found by the search, the management server 150 makes the process go back to step S2500. In step S2512, the management server 150 transmits to the translator the notification information 4) stored in the work area of the RAM unit 23 (notification information for translators other than the approval requester) and makes the process proceed to step S2513. In step S2513, the management server 150 changes the notification status of the notification log to be stored in the hard disk 28 (i.e., a log that includes the items included in the notification information 3), the items included in the notification information 4), and the notification status) from not-yet-notified to already-notified, and thereafter the management server 150 makes the process go back to step S2500. It should be noted that the "notification determination unit" in claim 1, etc. of the application as originally filed for the present invention application corresponds to a processing step which corresponds to at least one of steps S2508, S2509, and S2511 in FIG. 25, and that the "notification information generation unit" in claim 1, etc. of the application as originally filed for the present invention application corresponds to the processing step which corresponds to steps S2502, S2504 (because notification varies according to the content of the approval), and S2512 in FIG. 25. As a result of the processing of FIG. 25, the translation word request result is notified to the client which is the requester and the clients other than the requester at a desired timing in accordance with the translation assignment range of individual translators, further in accordance with the content of approval including presence or absence of the translation word. This is the end of the explanation of FIG. 25.

Figure 26:
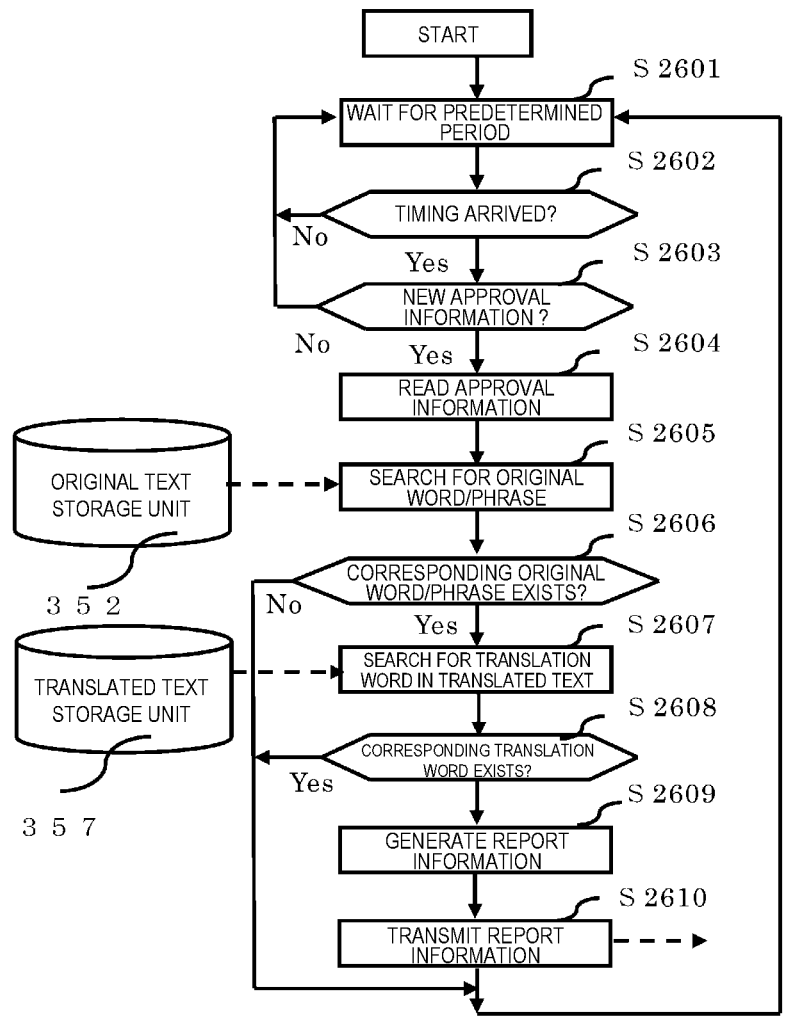
FIG. 26 is a detailed flowchart illustrating details of reflection check processing of the translation support system according to the present invention.

Next, FIG. 26 is the details of the reflection check processing (to check whether or not the approved translation word has been reflected to the translated text), which is a function of notifying to the primary checker the name of the translator and the number of portions that are yet to be revised and transmitting a message suggesting revision to the relevant translator(s) in accordance with the operation by the primary checker when the translation word that was approved by the primary checker is contained in the original text portion within the translation range of which a certain translator is in charge but the translator does not revise the translation word after a lapse of a predetermined period of time after the approval was made.

Steps S2601 to S2610 are associated with the processing procedures that are executed by the management server 150 as an independent process. The management server 150 receives the translated text portions which individual clients are entering or editing as appropriate from each client, and stores the received translated text portions in the translation file of the translation project file 152 of the hard disk 28 of the management server 150. It may be contemplated as a modified embodiment that these steps are executed respectively by the client A, the client B, and the client C operated by the individual translators under the control of the CPU 21 as a process that is independent of the other application programs.

It should be noted that the "notification determination unit" in claim 1, etc. of the application as originally filed for the present invention application corresponds to a processing step which corresponds to at least one of steps S2508, S2509, and S2511 in FIG. 25, and that the "notification information generation unit" in claim 1, etc. of the application as originally filed for the present invention application corresponds to the processing step which corresponds to steps S2502 and S2512 in FIG. 25.

In step S2601, the management server 150, after having waited for a predetermined period of time, makes the process proceed to step S2602. In step S2602, even when the approved content is notified, it does not necessarily follow that the translator reflects the content of the notification to the translated text immediately after the notification. The management server 150 determines whether or not a predetermined confirmation timing has been reached including, for example, whether or not a predetermined time elapsed such as a lapse of four hours after the reception of the most recent approval information, or when a predetermined confirmation time has been reached such as 12:00 p.m. and 5:00 p.m. When it has been determined that confirmation timing was reached, the management server 150 makes the process proceed to step S2603. When it has been determined that the confirmation timing has not been reached yet, then the management server 150 makes the process go back to step S2601. The predetermined confirmation timing is stored in advance for each project ID in the configuration file of the hard disk 28 of the management server 150.

In step S2603, the management server 150 searches the approval request history file of the approval request history storage unit 351 and determines whether or not there is a newly received approval information after the last confirmation time. When any new approval information exists, the management server 150 makes the process proceed to step S2604. When there is no new approval information, the management server 150 makes the process go back to step S2601. In step S2604, when there is any word or phrase reflection of which has not been confirmed to the translated text (word or phrase for which any one of the reflection flags is disabled), the management server 150 adds the word or phrase to the work file of the hard disk 28 and makes the process proceed to step S2605. In step S2605, the management server 150 searches the original file of the respective translation assignment ranges based on the translation assignment range table of the assignment range storage unit 353, by using the original word or phrase of the new approval information as a key, stores the project ID, the original word or phrase, the approved word or phrase, and the presence/absence flags for individual translators (enabled in response to presence and disabled in response to absence) in the work area of the RAM unit 23, and makes the process proceed to step S2606.

In step S2606, when the original word or phrase of the new approval information exists in the original text portion within the assignment range of the translator (if the presence/absence flag is enabled), the management server 150 makes the process to proceed to step S2607. If it is not found in the original text (if the presence/absence flag is disabled), the management server 150 makes the process go back to step S2601. In step S2607, the management server 150 searches, with regard to the translation file of all of the translators for which the presence/absence flags are enabled (the relevant translator), any approved translation word of the approval information is included in the translation file of the project ID stored in the work area of the RAM unit 23. When any approved translation word is included therein, the management server 150 determines that the approved translation word has already been reflected with regard to the translator who is updating this translation file, and sets the "reflection flag" of this translator of the approval information of this original word or phrase, and makes the process proceed to step S2608.

In step S2608, in accordance with the reflection flag, the management server 150 makes the process go back to step S2601 when the reflection flag is disabled and the management server 150 makes the process proceed to step S2609 when the reflection flag is disabled. In step S2609, the management server 150 creates report information (the project ID, the translator ID, the original word or phrase, the translation word, and a message indicating that the reflection is not yet made) from the search result, the report information indicating that no approved translation word is contained. When any approved translation word is contained, then the report information indicating that the reflection has been made (the reflection flag is enabled) is created, and the management server 150 makes the process proceed to step S2610. In step S2610, the management server 150 transmits the report information to the client A operated by the primary checker and the client Y operated by the approver, and makes the process go back to step S2601. This is the end of the explanation of FIG. 26.

Figure 27:
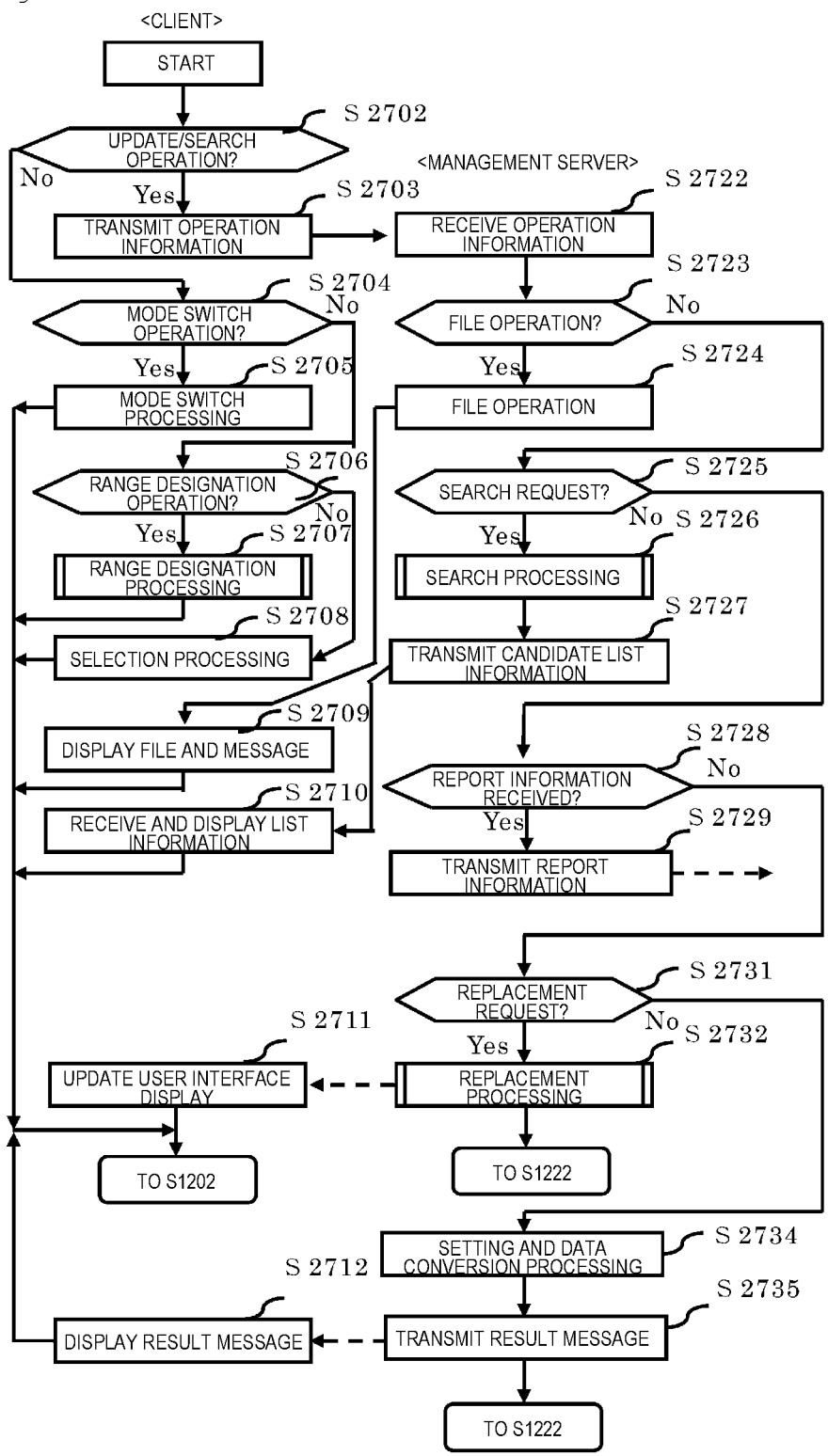
FIG. 27 is a diagram illustrating a detailed flowchart of the processing in accordance with the operation of step S508/S1208 and step S530/S1226 of the translation support system according to the present invention.

FIG. 27 is a flowchart that illustrates the details of step S1208 on the side of the client and step S1226 on the side of the management server 150 of FIG. 12, or step S508 on the side of the client and step S530 on the side of the management server 150 of FIG. 5 in a client-server type embodiment of the translation support system according to the present invention, where various processing procedures in accordance with the operation are explained such as translation word selection operation in the course of translation other than the translation word approval and notification processing procedures. As one example, the processing executed in step S1208 of the client B and step S1226 of the management server 150 is explained. In the flowchart of FIG. 27, it is assumed that the authentication processing is already completed. Specifically, the user ID and a password are transmitted from the client B to the management server 150, the management server 150 refers to the authentication file 533 by using the user ID received from the client B as a key, and compares the password stored as a pair with respect to this user ID with the received password that has been received from the client B and stored in the work area of the RAM unit 23. When the passwords agree with each other, then the management server 150 determines that the authentication is successful, transmits the user interface information of the initial user interface corresponding to this user ID (user interface information in the HTML format for displaying the initial user interface on the screen of the client B), assigns the session No., retains the session memory in the work area of the RAM unit 23 of the management server 150, stores the user ID and the session No, in this session memory, and ends the authentication processing.

This session No. is included in the data exchanged thereafter with the client B. Until the end of the session, this session No. is used and it is identified which client originated this request. When data is to be transmitted to the client, the transmission destination address is identified using this session No. When the password does not match, the management server 150 transmits to the client B a message indicating that the password does not match and ends the authentication processing. Next, processing procedures that follow the authentication processing are explained.

In FIG. 27, steps S2702 to S2712 are associated with the processing procedures that are executed under the control of the CPU 21 of the client B, and steps S2722 to S2735 are associated with the processing procedures that are executed under the control of the CPU 21 of the management server 150. The arrows indicated with solid lines in the figure represent the flow of control and the arrows indicated with broken lines represent flow of data. When the data flows in both directions between the client B and the management server 150, the flow of data is indicated by a double-headed arrow (this also applies to the other flowcharts).

In step S2702, when the CPU 21 of the client B determines that the transmission flag is enabled, the client B makes the process proceed to step S2703. In step S2703, the client B transmits information such as the file name for identifying the translation file storing the translated text or the original file storing the original text in the translation project file 152 of the management server 150 and a read request for the translation file or the original file to the management server 150 as the operation information. The management server 150 stores the operation information received in step S2722 in the work area of the RAM unit 23 of the management server 150, and makes the process proceed to step S2723.

In step S2723, when the CPU 21 of the management server 150 refers to the work area of the RAM unit 23 and determines that the operation information indicates a file operation (which is read request operation of the translation file or the original file or save request operation of these files), then the management server 150 makes the process proceed to step S2724. When it has been determined that the operation information is not the file operation, the management server 150 makes the process proceed to step S2725. In step S2724, the management server 150 reads the selected translation file from the hard disk 28 onto the work area of the RAM unit 23, and transmits the translation file to the client B.

The client B receives the translation file or the original file selection of which has been designated in step S2709 and a result message from the management server 150, the result message indicative of whether or not the reading of the translation file or the original file was successful. The client B stores the received translation file and the result message in the work area of the RAM unit 23, displays the result message on the screen and ends the processing of FIG. 27, and makes the process go back to step S1201 of FIG. 12.

Next, in step S2702, from a state where the original and the translated texts are read and at least a portion thereof is displayed in the original window of the user interface (for example, a state where a landscape original window is displayed at the lower area of the screen and a landscape translation window is displayed in the upper area of the screen), a word or phrase within the translated text can be selected by key operation Ctrl+W/Q or operation of a mouse button (for example, operation of designating the start point of the selected range by pressing of the left button of the mouse, dragging the mouse rightward, and releasing the left button at the end point of the selected range). A sentence or a word or phrase within this selected range is an original word or phrase that is yet to be translated within the translated text. When such a selection operation has been performed, the process proceeds from step S2702 to step S2704. The process further proceeds through step S2704 resulting in the "No" determination and step S2706 resulting in the "No" determination, and to step S2708.

In step S2708, although a plurality of sentences (text) can be selected, it is not possible to enter the TME mode in a state where the selected range bridges both sides of a paragraph symbol or a sentence end symbol (a state where the selected range extends over a range including more than one paragraph range and a state where the selected range extends over a plurality of sentences and the end of the selected range does not coincide with the sentence end symbol (for example, a Japanese full stop "。" or a period ".")), so that the end of the selected portion is revised such that the end of the selected portion is automatically demarcated by a paragraph symbol or a sentence end symbol, and the client B makes the process go back to step S1202.

When an event of pressing of the Space key (mode switch operation) has been detected again in step S2702 while the selection flag is enabled, the process proceeds to step S2704. When "Yes" resulted in the determination in step S2704, the client B makes the process proceed to step S2705, the edit mode is changed to the TME mode, and the changed edit mode is stored in the work area of the RAM unit 23, and the process goes back to step S1202.

In step S2702, when pressing of the selected range designation key (for example, an arrow "→" key) has been detected in a state where the processing mode is the TME mode, the process proceeds through step S2704 (No) to step S2706.

In step S2706, when pressing of the selected range designation key (for example, the left button of the mouse or the arrow "→" key) in the TME mode (Yes), the client B makes the process proceed to step S2707.

In step S2707, information of the selected character string or sentence, a selection flag which requests search being enabled, and the transmission flag being enabled is stored in the work area of the RAM unit 23. The client B makes the process go back to step S1202, step S1204, step S1207 and then step S1208, and makes the process go back to S2702, determines that the transmission flag is enabled (that an update request operation or a search request operation was made: Yes), and makes the process proceed to step S2703.

In step S2703, the client B transmits to the management server 150 the operation information including the character string within the selected range and the search request, and then clears the transmission flag. In step S2722, the management server 150 receives the operation information, adds the received operation information to the work area of the RAM unit 23, adds the character string within the selected range included in this operation information to the history information 920, and makes the process proceed via step S2723 (No) to step S2725. In step S2725, the management server 150 determines that the operation information is a search request on the basis of the selection flag being enabled within the operation information stored in the work area of the RAM unit 23 (Yes), and then makes the process proceed to step S2726. In step S2726, the management server 150 searches the common memory 151 by using the character string within the selected range as a key, stores list information of the translation word candidate(s) obtained in the search in the work area of the RAM unit 23, and makes the process proceed to step S2727. In step S2727, the management server 150 transmits the list information of the translation word candidate(s) to the client. Details of the search processing are explained with reference to FIG. 28. When it has been determined in step S2723 that the operation is a file operation, in other words, when the CPU 21 of the management server 150 referred to the work area of the RAM unit 22 and has determined that the operation information is the file operation (i.e., the read request operation for the translation file or the save request operation for a file), the management server 150 makes the process proceed to step S2724.

In step S2724, the management server 150 reads the selected translation file from the hard disk 28 into the work area of the RAM unit 22 and then transmits the translation file to the client B. The client B receives the translation file of which the selection was instructed in step S2709 and the result message from the management server 150, stores the received translation file and the result message in the work area of the RAM unit 22, displays the result message on the screen, and makes the process go back to step S1201 of FIG. 12. In step S1201 of FIG. 12, the client B displays the translation file stored in the RAM unit 22 on the screen, and makes the process proceed to step S2702. Next, when it has been determined in step S2725 that the request is not a search request (No), the management server 150 makes the process proceed to step S2728.

In step S2728, the management server 150 determines whether or not the information received in step S2722 is the report information. With regard to the transmission of the report information from the side of the client, see step S2609 of FIG. 26. When it has been determined that the received information is the report information, the management server 150 makes the process proceed to step S2729 and transmits the received report information to the client A operated by the primary checker and the client Y operated by the approver, and makes the process go back to step S2722 (an arrow of this portion is not shown in the flowchart). When it has been determined that the received information is not the report information, the management server 150 makes the process proceed to step S2731.

In step S2731, the management server 150 determines whether or not the operation information received in step S2722 is a replacement request. When it has been determined that the operation information is the replacement request, the management server 150 makes the process proceed to step S2732. In step S2732, the management server 150 executes the replacement processing. Specifically, the management server 150 subjects the selected portions of the translated text that appear at and after the selected position of the current word or phrase of the translated text to the collective replacement by the selected translation word candidate, updates the history information 920 storing the operation histories of the individual translators (see FIG. 28), transmits, to the client B, the text information for updating by the replacement the selected portions of the translation display window of the client B, and makes the process go back to step S1222. In step S2711, the client B receives this text information and updates, by the received text information, the display of the portion designated by the range designation processing of the translation display window. When it has been determined in step S2731 that the operation information is not the replacement request, the management server 150 makes the process proceed to step S2734.

Figure 28:
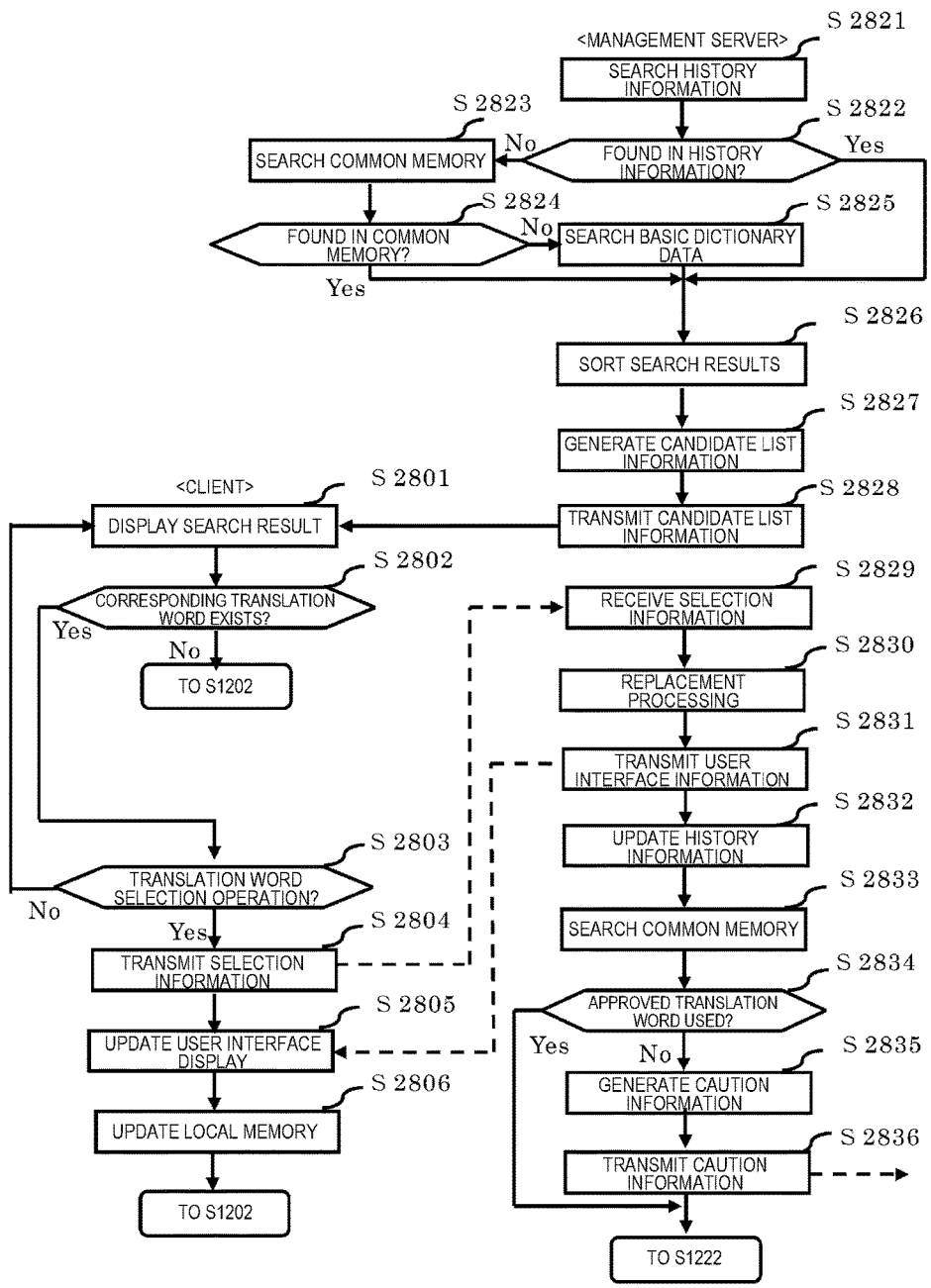
FIG. 28 is a diagram illustrating a detailed flowchart of the search processing (S2726) of translation word candidates and the replacement processing (S2732) of the translation support system according to the present invention.

The setting and data conversion processing in step S2734 refers to, for example, the priority configuration processing regarding the priority between the each local memory 940 illustrated in FIG. 28 (when the processing of the FIG. 27 is executing step S1208 of FIG. 12, the memory that corresponds to the local memory 125 of the client B; the processing of FIG. 27 is executing step S508 of FIG. 5, the memory that corresponds to the local memory 115 of the client A) and the common memory 151 in a case where there exists a plurality of memory units in the configuration processing; various configuration processing such as the search modes of the translation word candidate; and conversion processing for converting various data into those having the data format for internal use within this system. Details of the conversion processing are explained with reference to FIG. 29 which will be later explained. After these various processing procedures, the management server 150 makes the process proceed to step S2735, transmits the result message of the configuration processing or the conversion processing to the client, and makes the process proceed to step S2712 of the client B in the state of waiting for the result information so that the result message is displayed on the screen of the client B. This is the end of the explanation of FIG. 27.

The following is the explanation of the details and relevant portions of step S2726 (search processing) and step S2732 (replacement processing) of the step FIG. 27 using the flowchart of FIG. 28. Step S2726 of FIG. 27 is a processing procedure corresponding to step S1226 (processing in accordance with the operation) on the side of the management server 150 of FIG. 12; or step S530 on the side of the management server 150 of FIG. 5. In the flowchart of FIG. 28, steps S2801 to S2806 are by way of example associated with the processing procedures that are executed under the control of the CPU 21 of the client B. Steps S2821 to S2837 are associated with the processing procedures that are executed under the control of the CPU 21 of the management server 150.

In step S2821, the management server 150 searches for the history information 920 by using as keys the original word or phrase that is the character string for which range designation was made stored in the work area of the RAM unit 23 in step S2722 of FIG. 27 and the project ID, stores the search result in the work area of the RAM unit 23, and makes the process proceed to step S2822. In step S2822, when the search result stored in the work area of the RAM unit 23 corresponds to the search conditions (range-designated character string and the project ID) (a hit resulted in the search), the management server 150 makes the process proceed to step S2826. When no hits resulted (the number of items satisfying the search conditions is zero), the management server 150 makes the process proceed to step S2823. It may also be contemplated that even when any hit resulted in the search in step S2822, the management server 150 may make the process proceed to step S2823 and store both of the search result of the history information 920 and the search result of the common memory 151 in the work area of the RAM unit 23. In step S2823, the management server 150 searches the common memory 151 by using as keys the range-designated character string and the project ID and stores the search result in the work area of the RAM unit 23. When any hit resulted, then the management server 150 makes the process proceed to step S2826. When no hits resulted, the management server 150 makes the process proceed to step S2825. In step S2825, the management server 150 searches the basic dictionary data by using the range-designated character string as a key, stores the search result in the work area of the RAM unit 23, and makes the process proceed to step S2826.

In step S2826, when any hit resulted in the search, the management server 150 sorts the search result by the date of the most recent use, the date of the most recent registration, or the like of the memory items in descending order, stores the sorted search result in the work area of the RAM unit 23, and makes the process proceed to step S2827. When no hits resulted in the search in any one of steps S2821, S2823, and S2825, the management server 150 stores an error message indicating that "no translation word exists that corresponds to the range-designated character string" in the work area of the RAM unit 23, and makes the process proceed to step S2827. In step S2827, the management server 150 generates user interface information to be displayed on the screen of the client B using the search result or the error message stored in the work area of the RAM unit 23, makes the process proceed to step S2828, and transmits the information as the translation word candidate list information (or error message) to the client B. In step S2801, the client B receives the translation word candidate list information (or error message), displays the information on the screen as a drop-down list of the translation word candidates, and makes the process proceed to step S2802. In step S2802, when the search result exists (a corresponding translation word exists), the client B makes the process proceed to step S2803. When no search result exists (the case of the error message) or when operation to cancel the display state of the drop-down list has been detected, the client B makes the process go back to step S1202 of FIG. 12.

In step S2803, the client B determines whether or not there was any operation associated with selection of either one of the translation word candidate of the drop-down list. When there was any operation selecting the translation word, the client B stores selection information (including the translation word candidate(s) as such or information identifying the translation word candidate(s); and replacement classification information regarding whether the collective replacement is performed or individual replacement is performed for the relevant potions) indicative of the content of that operation in the work area of the RAM unit 23 and makes the process proceed to step S2804. When there was no operation selecting the translation words, then the client B makes the process go back to step S2801. In step S2804, the client B transmits the selection information for identifying the selected translation word to the management server 150. In step S2829, the management server 150 receives the selection information, stores the received selection information in the work area of the RAM unit 23, and makes the process proceed to step S2830. In step S2830, the management server 150 uses the selection information and subjects the translated text stored in the work area of the RAM unit 23 to the replacement processing (collective replacement or individual replacement), and makes the process proceed to step S2831. In step S2831, the management server 150 transmits, to the client B, user interface information for displaying on a screen the updated translated text reflecting the replacement result of the translated text, and makes the process proceed to step S2832. In step S2805, the client B uses the user interface information received and stored in the work area of the RAM unit 23, updates the translated text display field of the screen, and makes the process proceed to step S2806. In step S2806, the client B updates the time of the most recent use of the translation words which were determined as being subjected to the selection operation in step S2803 of the local memory of the hard disk 28 of the client B, and makes the process go back to step S1202 of FIG. 12. In this manner, the reason for updating the time of the most recent use of the local memory even when the highest priority is given to the common memory 151 of the management server 150 is to take into account a case where a network failure occurred though the common memory is normally used and a case where always-on connection to the network is not available.

The discussion now returns to the explanation of the processing on the side of the management server 150. In the step 2832, the management server 150 updates the history information 920 based on the translation word identified by the selection information received in step S2829; the original word or phrase, which is a range-designated character string stored in the work area of the RAM unit 23; and the project ID. The history information 920 is for use in storing the operation information for each client and the selected translation word, etc. in the hard disk 28. The management server 150 then makes the process proceed to step S2833. In step S2833, the management server 150 uses the original word or phrase and the translation word identified by the selection information and searches the shared memory 151. The management server 150 stores all of the translation words corresponding to the original word or phrase in the work area of the RAM unit 23, and makes the process proceed to step S2834. In step S2834, the management server 150 determines (by the determination unit 444) whether or not the translation word identified by the selection information is an approved translation word with the classification M. When the translation words agree with the approved translation word, the management server 150 makes the process go back to step S1222 of FIG. 12.

When the translation word identified by the selection information does not agree with the approved translation word, the management server 150 makes the process proceed to step S2835. In step S2835, the management server 150 generates caution information including a message indicating that the translator is using a translation word that is not in agreement with the approved translation word from the translator ID of the translator who selected the translation word that does not agree with the approved translation word, the original word or phrase, and the translation word identified by the selection information. The management server 150 stores the generated caution information in the work area of the RAM unit 23, and makes the process proceed to step S2836. In step S2836, the management server 150 transmits this caution information to the client Y operated by the approver and the client A operated by the primary checker, and makes the process go back to step S1222 of FIG. 12.

Also, in step S2810 or S2813, when it has been determined that an ESC key was pressed on the side of the client A, then the management server 150 makes the process proceed to step S2814. In step S2814, the operation information is transmitted to the management server 150, and screen information is transmitted in turn from the management server 150 (in steps S2729 and S2730 in FIG. 27). The screen information is for use in updating the user interface of the client. In step S2812, the user interface is updated on the client A, and the drop-down list disappears from the original window. This is the end of the explanation of FIG. 28 and the discussion now returns to explanation of FIG. 27.

After that, the CPU 21 of the client A makes the process go back from step S2711 to step S501 or S1202.

Figure 11:
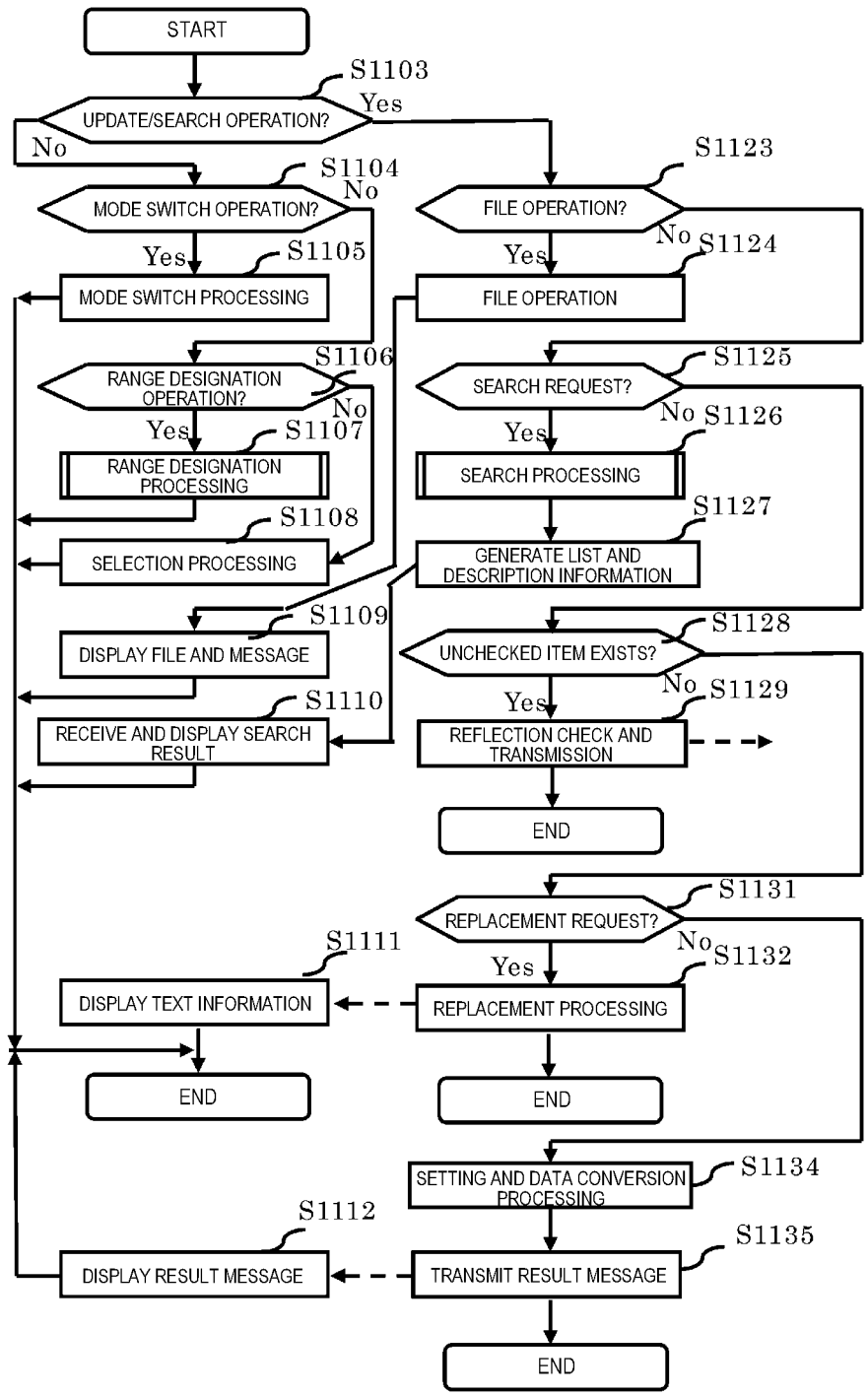
FIG. 11 is a diagram illustrating detailed flowchart of the processing in accordance with the operation of step S508/S1208 and step S530/S1226 of a stand-alone type another embodiment of the translation support system according to the present invention, where processing load is heavy on the client side in FIGS. 5 and 12.

Next, the flowchart of FIG. 11 is explained. The flowchart of FIG. 11 is a modified embodiment of a so-called standalone type which modifies the processing of FIG. 27. In accordance with the processing of FIG. 11, the other processing procedures in accordance with the operation are performed on the client side except for the memory registration and memory request on the client side and on the side of the management server 150. In the FIG. 11, steps S27xx of FIG. 27 correspond to steps S11xx of FIG. 11, respectively, except that steps S2703 and S2722 of FIG. 27 are not included. While steps S2722 to S2735 of FIG. 27 are executed by the management server 150, steps S1123 to S1135 of FIG. 11 are executed by the client and the latter steps differ from the former steps in that the individually registered local memory data and added translation files, which are the products of the operations, are uploaded to the management server at a proper stage where some group of tasks has been completed. The content of the processing is the same and accordingly detailed explanation is omitted. This embodiment is useful in a case where only low-speed communication line (the network 100) is available with the management server 150 and a case where the client is used in a state where it is not connected to a communication line. This is the end of the explanation of FIG. 11.

Figure 29:
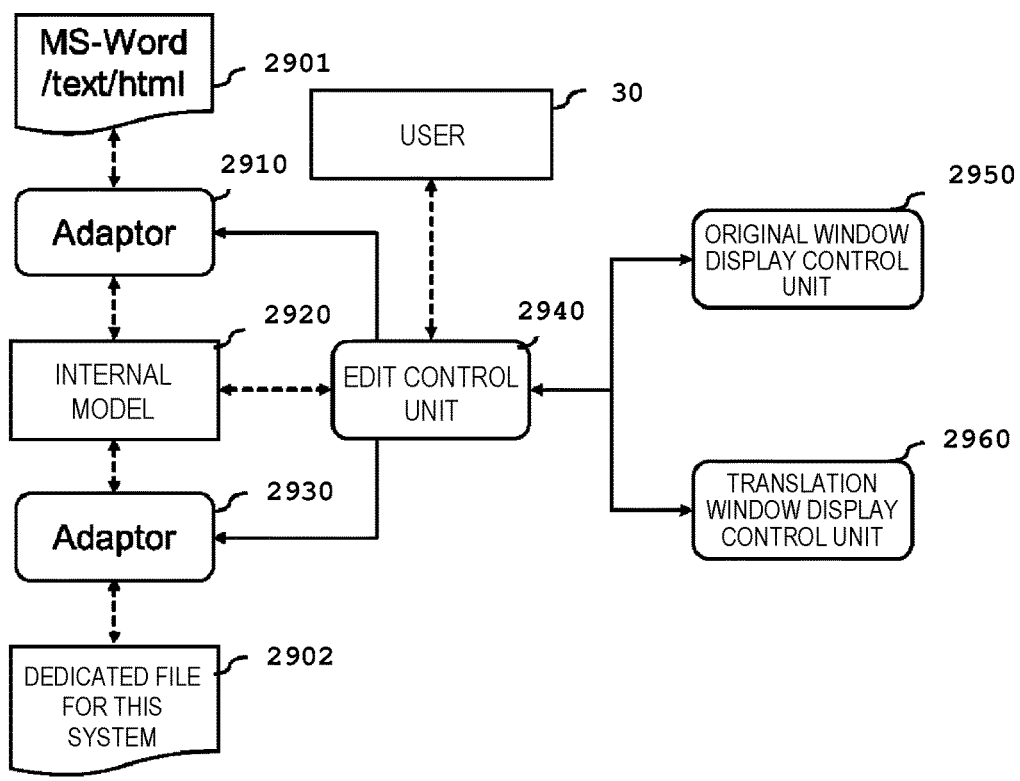
FIG. 29 is a diagram illustrating internal processing of the translation support system according to the present invention at the time of the edit operation with the original window and the translation window displayed.

FIG. 29 is a schematic diagram that illustrates the details of the simultaneous edit processing for the original and translated texts, which are the processing procedures that correspond to part of step S1208 of FIG. 12 or step S508 of FIG. 5. The simultaneous edit processing as used herein means that it is possible to display or edit (the translation window's side) a desired one of the original text and the translated text by a series of operations in a state where the original text and the translated text are both displayed (for example, in individual windows), and it does not mean that the timings are "simultaneous."

When the simultaneous edit function is executed, the original window and the translation window are displayed on the display screen using the user interface information (layout information of the user interface) read from the common memory 151.

(1) An edit control unit 2940 is configured to detect an input by the keyboard 26 or the operation of the mouse 27 by a user 30 and determine, using the content of the operation and the position information indicative of the position of the cursor of the mouse 27, whether the operation is an edit operation/input for the original window, an edit operation/input for the translation window, or a data conversion operation instructing reading or saving of external data. In accordance with the input or the operation, the edit control unit 540 executes the data conversion processing by an Adaptor 2910 or executes various edit processing.

(2) When the operation subjected to the determination is a read operation to read the external data, a general file 2901 such as MS-Word file, text file, HTML file, and PDF file is converted into an internal model 2920 by the data conversion function by the Adaptor 2910 via the edit control unit 2940 detecting any input instructing conversion of read data of the keyboard 26 or the mouse 27. Also, the internal model 2920 is converted into a dedicated file 2902 for the translation support system by the data conversion function by the Adaptor 2930 via the edit control unit 2940 detecting any input instructing saving by the keyboard 26 or the mouse 27, and is stored as part of translation project file 152 of the hard disk 28.

(3) In the simultaneous edit mode, the edit control unit 540 determines whether the edit operation (entry operation, revision operation such as deletion and insertion) is intended for the original window or the translation window. Whichever of the original text and the translated text is revised, the edit control unit 2940 reflects it to the internal model (performs the updating that corresponds to the operation), reflects the result of the edit operation respectively to the original text or the translated text, and updates the display of the original window display control unit 2950 or the translation window display control unit 2960. This is the end of the explanation of FIG. 29.

Figure 30:
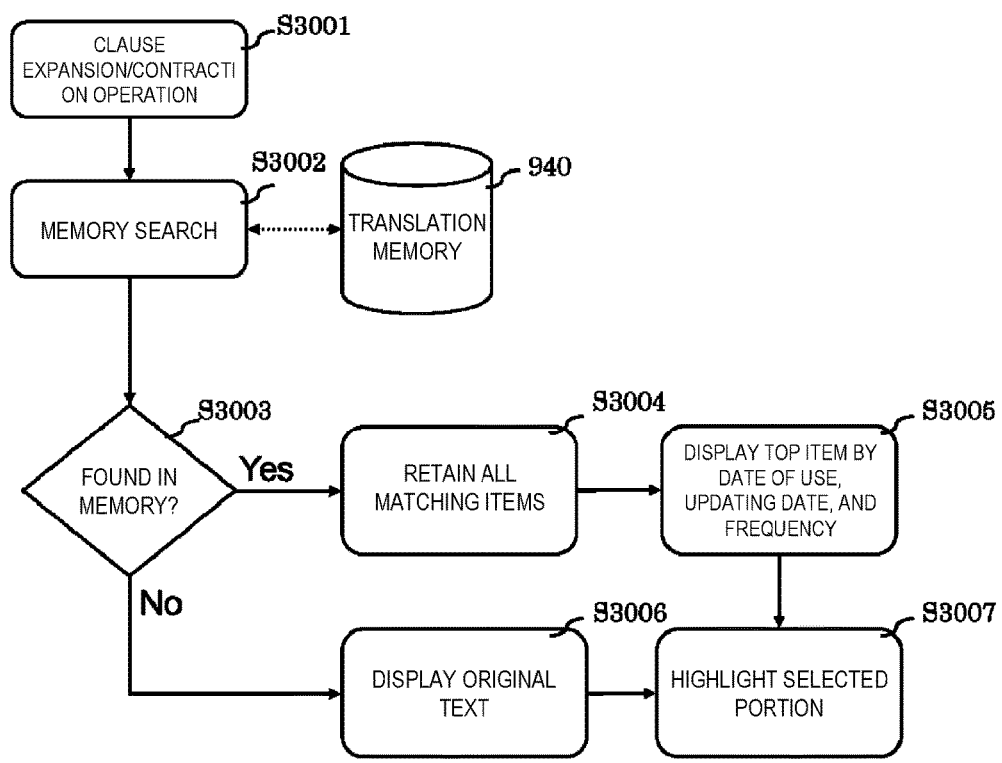
FIG. 30 is a diagram illustrating a detailed flowchart of the range designation processing of S2707 of FIG. 27 of the translation support system according to the present invention.

FIG. 30 is a diagram that illustrates one embodiment of a detailed flowchart of paragraph extension processing in the TME mode, which corresponds to the part of step S2707 of FIG. 27 or part of steps S1208 and S1226 of FIG. 12. The processing procedures of FIG. 30 are those that are executed under the control of the CPU 21 of the client B and the CPU 21 of the management server 150.

In step S3001, when Shift+→/← and/or Ctrl+→/←operations have been detected on the side of the client B in the TME mode, the client B transmits the operation information (information including the characters within the selected range and indicating that the range designation operation was made) to the management server 150, and the management server 150 stores the operation information in the work area of the RAM unit 23, and makes the process proceed to step S3002. In step S3002, memory search is performed by using the characters within the selected range as a key. In this manner, it is made possible to adjust the search range in accordance with the selected range. The search result is stored in the work area of the RAM unit 23 and the process is made to proceed to step S3003.

Thereafter every time the selected range is adjusted, the memory search is performed again for the local memory and the translation word candidate (more than one candidate may be included), which is the result of the agreement, is stored in the work area of the RAM unit 23. In step S3003, it is determined whether or not there is any matching item in the local memory. When there is any matching item, the process is made to proceed to step S3004.

When there is no matching item in step S3003, the process is made to proceed to step S3006. In step S3004, the process is made to proceed to step S3005 while the information of the matching item stored in the work area of the RAM unit 23 is retained. In step S3005, when there is more than one matching translation word, the management server 150 sorts the matching items are sorted in the order of date of use>date of updating>frequency of use, and transmits the information of the sorted translation word to the client B. On the side of the client B, the client B displays the top item of the received translation words and makes the process proceed to step S3007. In step S3007, the client B displays highlighted characters of the selected range and ends the process. In step S3003, when there is no matching memory item of the local memory 940 with respect to a certain word within the selected range, the process is made to proceed to step S3006, and the original text is displayed on an as-is basis in the TME window and the process is ended. This is the end of the explanation of FIG. 30.

Figure 31:
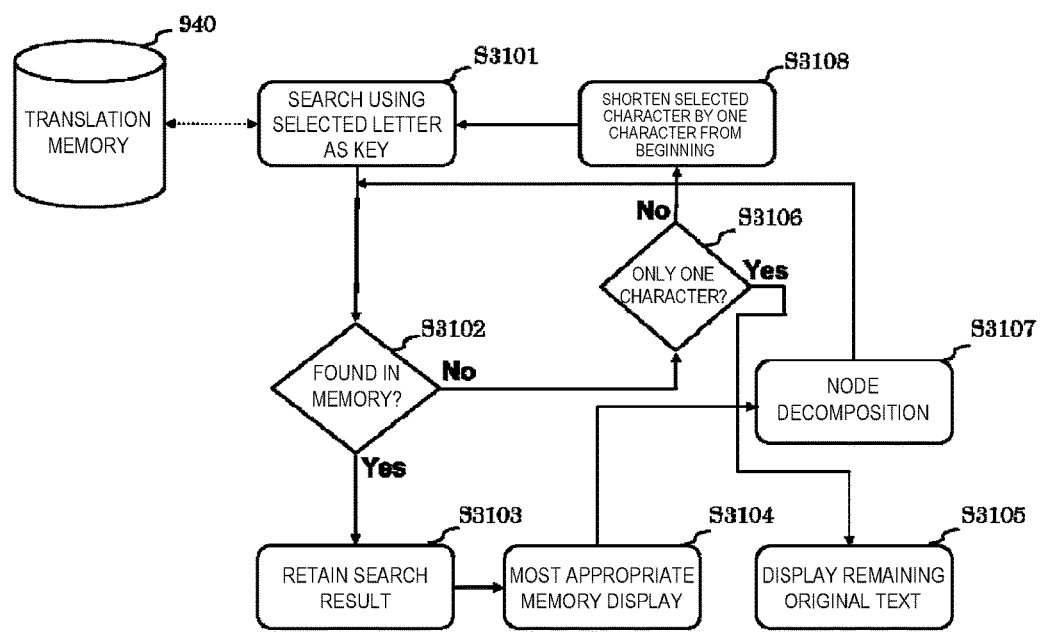
FIG. 31 is a diagram illustrating a detailed flowchart of the search processing of S2726 of FIG. 27 of the translation support system according to the present invention.

FIG. 31 is a diagram that illustrates one example of the detailed flowchart of overall longest match search processing in the client B and in the management server 150 which corresponds to steps S1208 and S1226 of FIG. 12 (step S2726 of FIG. 27). Here, the client B is performing the translation operation. In this example, the memory having the first priority of the client B is the common memory 151 of the management server 150.

First, in step S3101, the management server 150 searches the local memory 940 for the client B of the individual registration information storage unit 354 by using as a key the characters within the selected range received in advance from the client B as the operation information and stored in the work area of the RAM unit 23 of the management server 150, and makes the process proceed to step S3102. In step S3102, the management server 150 determines whether or not any translation word that corresponds to the characters of the selected range is stored in the local memory 940. When the corresponding translation word is stored therein, the management server 150 makes the process proceed to step S3103. When there is no corresponding translation word stored therein, the management server 150 makes the process proceed to step S3106.

In step S3103, the management server 150 stores the characters in the selected range and the translation words which are the result of the search (all matching translation words) in the work area of the RAM unit 23 separately and makes the process proceed to step S3104. In step S3104, when more than one translation word is stored therein, the management server 150 sorts the translation words in the order of date of use>date of updating>frequency of use (sorts the translation words in an optimum-one-first manner), transmits the information of the sorted translation words to the client B and makes the process proceed to step S3107. In step S3107, the management server 150 stores the remaining portions of the characters in the selected range which do not agree with the local memory in the work area of the RAM unit 23 as the new character string of the selected range and makes the process go back to step S3102.

In this manner, a state where a part is replaced and the other part is retained to be the same as that corresponding to the original word or phrase is referred to as Node decomposition. The Node decomposition refers to the following situation: For example, suppose that the original word is "atypical," and "typical" and "tenkei-teki" are stored in the memory. Then the term "typical" is replaced by the term "tenkei-teki" to read as "a-tenkei-teki," which is decomposed into two nodes of "a" and "tenkei-teki." Meanwhile, when there is no corresponding translation word stored in step S3102, the management server 150 makes the process proceed to step S3106. In step S3106, the management server 150 determines whether or not the characters in the selected range stored in the work area of the RAM unit 23 consist of one single character. When only one character is included, the management server 150 makes the process proceed to step S3105. When it is not one character, the management server 150 makes the process proceed to step S3108. In other words, the search end condition is the timing at which there will be no more characters to be severed. In step S3105, the management server 150, in a case where the search string bridges two words, displays the remaining original text that has been severed by the Node decomposition on an as-is basis, and ends the processing. Meanwhile, when the characters in the selected range does not consists of only one character in step S3106, the management server 150 makes the process proceed to step S3108. In step S3108, the management server 150 shorten the characters in the selected range stored in the work area of the RAM unit 23 by one character from its beginning (deletes one character from the beginning thereof) and makes the process go back to step S3101. This is the end of the explanation of FIG. 31.

[Another Embodiment 1]

Figure 32:
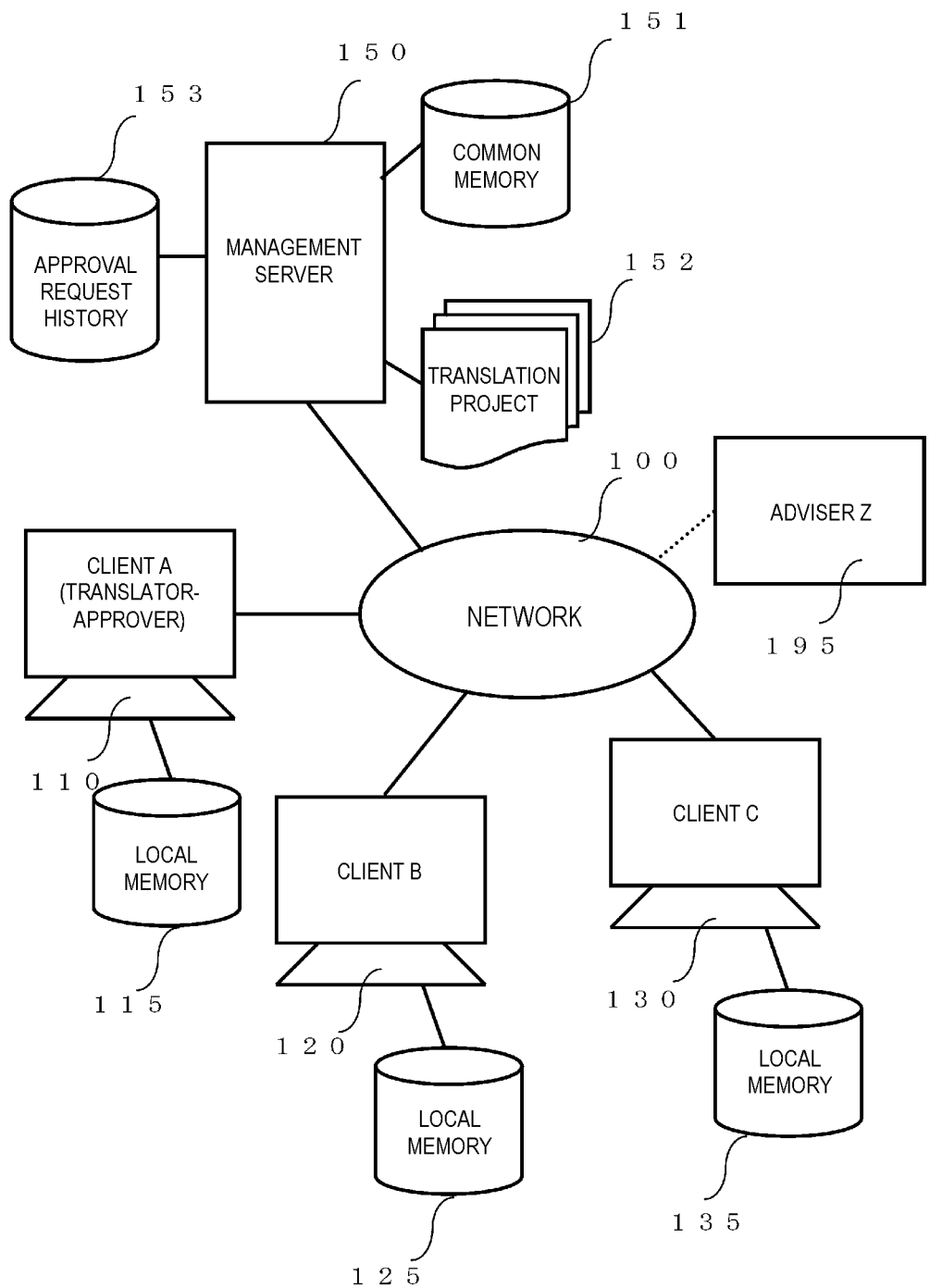
FIG. 32 is a diagram illustrating another modified embodiment of the system configuration of the translation support system according to the present invention.

Another embodiment of the translation support system according to the present invention is explained with reference to the system configuration diagram of FIG. 32 and the flowcharts of FIGS. 33 and 34. In this embodiment, as illustrated in FIG. 32, the client A acts as an approver as well as a translator. Accordingly, the flowchart of FIG. 33 that illustrates the memory registration and collection processing in the other embodiment 1 differs from the flowchart of FIG. 5 in the following points. First, the processing step of FIG. 33 which corresponds to steps S561 to S563 of FIG. 5 where the client Y performs the approval is eliminated. This is because the approver himself/herself performs the memory registration in the flowchart of FIG. 33 and accordingly the approval request does not need to be executed. Further, the processing procedures of steps S524 to S527 executed by the management server and transferring the received memory information to the client Y are also eliminated.

Further, with regard to the processing of FIG. 7 which is the detailed processing procedures of the inconsistent translation search/notification of step S532 of FIG. 5, steps S722 to S723, steps S708 to S709, and step S741 are eliminated, so that the process proceeds directly from step S721 to step S742, and steps S742 to S743 are executed by the client A.

The remaining processing procedures are substantially the same except that different step numbers are used and the order of execution of some of the steps is different. Specifically, steps S3301 to S3312 of FIG. 33 correspond to steps S501 to S512 of FIG. 5, respectively. Steps S3321 to S3323 of FIG. 33 correspond to steps S521 to S523 of FIG. 5, respectively. Step S3524 of FIG. 33 corresponds to step S529 of FIG. 5. Step S3325 of FIG. 33 corresponds to step S528 of FIG. 5 while FIG. 33 differs from FIG. 5 in that the process go back from step S3325 to step S3322. Steps S3326 to S3328 of FIG. 33 correspond to steps S530 to S532 of FIG. 5, respectively. This embodiment is suited to relatively small number of translation projects. The primary checker can fix the translation words by consulting the external advisor Z as illustrated in FIG. 32 or experts by phone or facsimile or directly having interviews with them and based on their advice or response in a case where considerable amount of investigation is needed to fix the translation words, for example, in a case of a patent in the entirely new field.

Next, the flowchart illustrated in FIG. 34, which illustrates the memory approval request and memory update notification processing in the other embodiment 1, differs from the flowchart of FIG. 12 in the following points. First, in steps S1261 to S1263 of FIG. 12 executed by the client Y are eliminated. Although steps S1251 to S1253 of FIG. 12 are executed by the client A, steps S3451 to S3453 of FIG. 34 are executed by the client Y operated by the approver. As a result, step S1252 of FIG. 12 is the "PRIMARY CHECK ENTRY," in contrast to which step S3452 of FIG. 34 is "APPROVE/REJECT ENTRY." In a similar manner, step S1253 of FIG. 12 is the "TRANSMIT PRIMARY CHECK INFORMATION," in contrast to which step S3453 of FIG. 34 is "TRANSMIT APPROVAL INFORMATION." The transfer step that corresponds to steps S1227 and S1228 of FIG. 12 is eliminated in the processing of FIG. 34. The addition of the primary check information to the approval request history information file 153, which is executed in step S1227 of FIG. 12, is executed in step S3427 of FIG. 34 as addition of approval information to the approval request history information file 153.

The remaining processing procedures are substantially the same except that different step numbers are used. Specifically, steps S3401 to S3412 of FIG. 34 correspond to steps S1201 to S1212 of FIG. 12, respectively. Steps S3421 to S3426 of FIG. 34 correspond to steps S1221 to S1226 of FIG. 12, respectively. Steps S3427 to S3430 of FIG. 34 correspond to steps S1229 to S1232 of FIG. 12, respectively. Steps S3440 to S3444 of FIG. 34 correspond to steps S1240 to S1244 of FIG. 12, respectively.

Meanwhile, FIG. 34 differs from FIG. 12 in that, on one hand, steps S1209 to S1212 are the processing procedures that are executed by the clients A and C in FIG. 12, and on the other hand, steps S3409 to S3412 of FIG. 34 are those that are executed by the client B. Also, FIG. 34 differs from FIG. 12 in that, on one hand, steps S1240 to S1244 of FIG. 12 are the processing procedures that are executed by the client C, and on the other hand, steps S3440 to S3444 of FIG. 34 are those that are executed respectively by the clients A and C. Steps S3451 to S3453 of FIG. 34 correspond to steps S1251 to S1253 of FIG. 12, explanation of which is omitted, for the difference of the meaning of the content of entry has already been explained. This is the end of the explanation of FIG. 34 and the explanation of the other embodiment 1 is ended.

[Another Embodiment 2]

Figure 35:
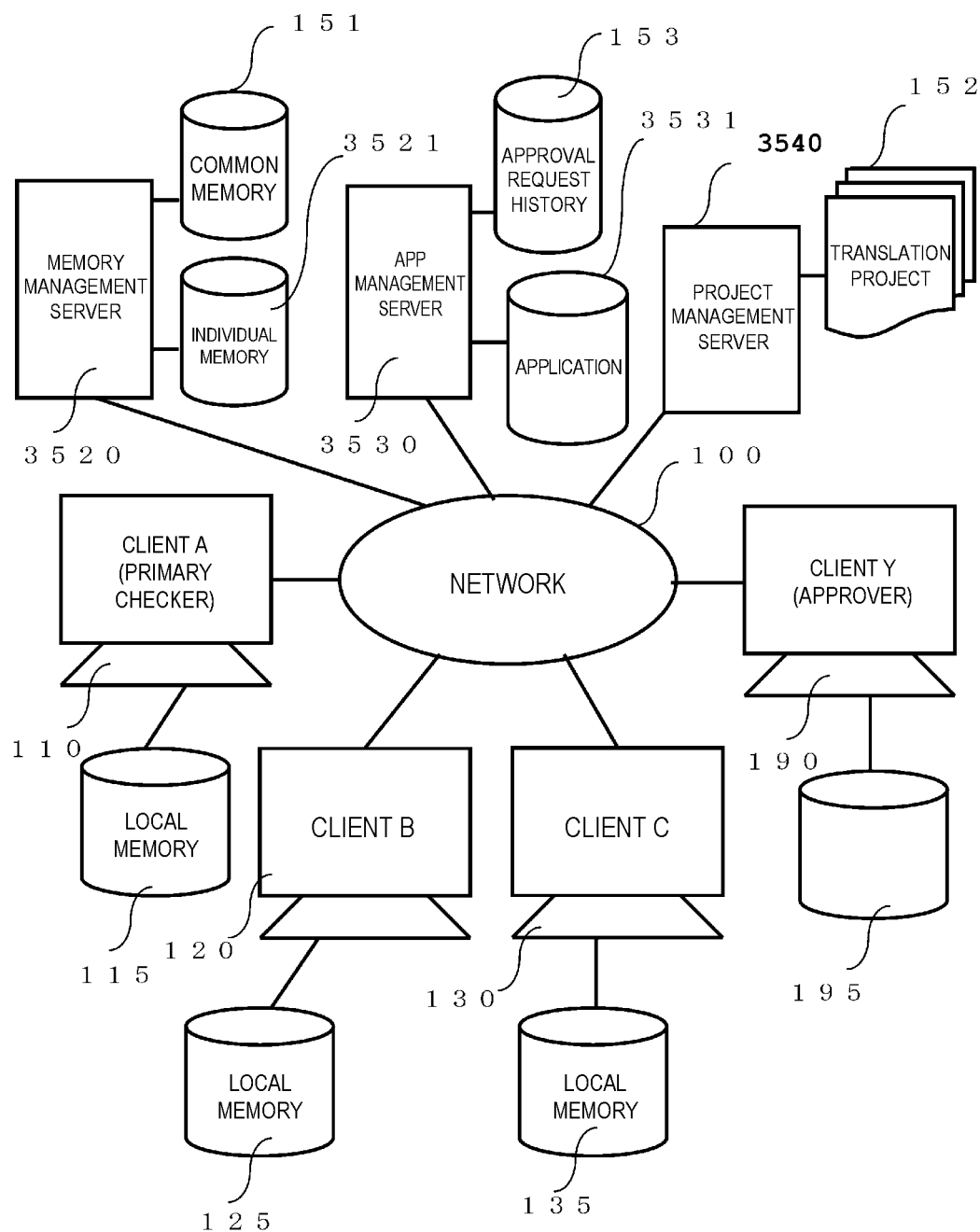
FIG. 35 is a diagram illustrating another modified embodiment of the system configuration of the translation support system according to the present invention.

A modified embodiment of the present invention is explained using the system configuration diagram of FIG. 35. FIG. 35 is a system configuration diagram of a modified embodiment of the translation support system according to the present invention. The difference from the system configuration diagram of FIG. 1 lies in the fact that the server is divided into three servers. Specifically, in FIG. 1, the approval request history 153, the common memory 151, and the translation project file 152 are stored in the hard disk 28 of the management server, and the individual application programs are read from the hard disk 28 onto the RAM unit 23 and thus executed. In contrast, in the translation support system illustrated in FIG. 35, an app management server 3530 is capable of performing communications via the network 100 with a memory management server 3520 and a project management server 3540 as well as each client. Also, the app management server 3530 stores an application program 3531 in the hard disk 28 and the application program 3531 is read from the hard disk 28 onto the RAM unit 23 as appropriate and thus executed. Further, the app management server 3530 stores the approval request history file 153 in the hard disk 28, and searches the approval request history file 153 in accordance with the operation information and various information that are received from the individual clients, or adds new translation word approval request information thereto.

Also, the app management server 3530 transmits a search request of the common memory 151 or the individual memory 3521 of the memory management server 3520 in accordance with the operation information and various information that are received from the individual clients, receives the search result information from the memory management server 3520, and executes the following processing in accordance with the search result information. In order to add new memory information to the common memory 151 or the individual memory 3521 of the memory management server 3520, the app management server 3530 transmits the registration information, receives in turn the registration result information (registration successful/registration failed) from the project management server 3540, in accordance with the received registration result information executes the processing of the subsequent steps, for example, the notification processing and the like. Alternatively, the app management server 3530 updates the existing memory information in these memory units.

In a similar manner, the app management server 3530 transmits, to the project management server 3540, the search request for searching the translation project file 152 of the project management server 3540 in accordance with the operation information and various information that are received from the individual clients, and receives the search result information from the project management server 3540. Alternatively, the app management server 3530 transmits the registration information so as to add new information to the translation project file 152 of the project management server 3540, and in turn receives the registration result information (normal termination/abnormal termination) from the project management server 3540, and executes the subsequent steps in accordance with the received registration result information. Alternatively, the app management server 3530 transmits the update information so as to update the existing information of the translation project file 152 of the project management server 3540, and the project management server 3540 updates the existing information of the translation project file 152. The app management server 3530 in turn receives the update result information (update successful/update failed) from the project management server 3540, and executes the subsequent steps in accordance with the received update result information.

In summary, the app management server 3530 acts as the control tower of the three servers and the memory management server 3520 and the project management server 3540 only function via the network 100 as if they were discrete network air storage. Also, it also pertains to the present invention to integrate the memory management server 3520 and the project management server 3540 into one single body. As far as the flowcharts are concerned, this modified embodiment only differs from the original embodiment in that the additional step of transmission and reception of various request information (the search request, the information addition request, and the information update request) or various result information (the search result, the registration result, and the update result) via the network 100 between the app management server 3530 and the memory management server 3520 or the project management server 3540 is added to the original embodiment in the course of the search and addition processing of various files and the update processing of the management server 150, and the other aspects substantially remain the same.

Further, another configuration also pertains to the present invention according to which the approval request history file 153 is adapted to be stored in the hard disk 28 of a request history management server (not shown) other than the app management server 3530. Also in this case, the difference lies in the fact that an additional step of transmission and reception of various request information (the search request, the information addition request, and the information update request) or various result information (the search result, the registration result, and the update result) via the network 100 between the app management server 3530 and the request history management server is added and the other aspects remain substantially the same. This is the end of the explanation of the other embodiment 2.

[Another Embodiment 3]

Figure 36:
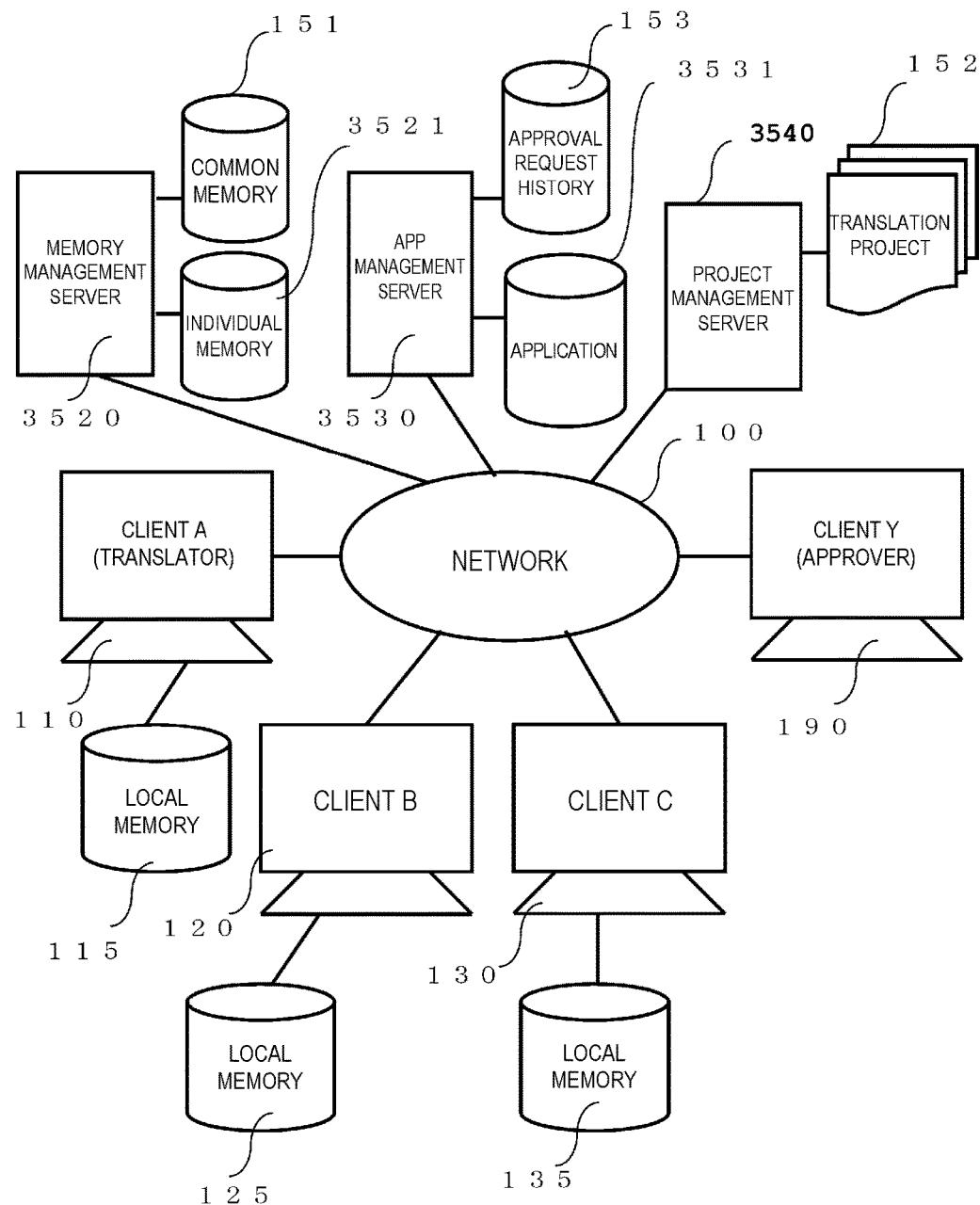
FIG. 36 is a diagram illustrating another modified embodiment of the system configuration of the translation support system according to the present invention.

Another modified embodiment of the present invention is explained using the system configuration diagram of FIG. 36. FIG. 36 is a system configuration diagram of a modified embodiment of the translation support system according to the present invention. The difference from the system configuration diagram of FIG. 1 lies in the fact that the server is divided into three servers and the client A is not a client that is operated by the primary checker but a client that is operated by a person dedicated to the translation. These two differences have already been discussed in the context of the other embodiments 1 and 2, and the other embodiment 3 is merely a combination of them. The differences with respect to the flowcharts that have already been discussed have also been individually discussed, so that the other embodiment also has the same or similar features of eliminating the step of exchange between the client A and the management server 150 associated with the approval processing and addition of the step of exchange between the app management server 3530 and the other two servers, and accordingly detailed explanation is omitted. This is the end of the explanation of the other embodiment 3.

[Another Embodiment 4]

In the above-described steps S703 and S711 of FIG. 7 and step S1002 of FIG. 10, the corresponding existing sentence is identified including the determination of presence or absence of division of sentence using the original word or phrase and the translation word corresponding to the original word or phrase newly individually registered in the individual registration information storage unit 354 storing the self-registration memory data and on the basis of the paragraph number and the sentence number. Further, search is performed using the known scheme of morpheme analysis to check whether or not there is any individually registered original word or phrase within the entire original text, and further whether or not there is an individually registered translation word corresponding to the original word or phrase and thus the occurrence of inconsistent translation is checked. Meanwhile, this method presupposes that the paragraph numbers are assigned to both of the original text and the translated text. When no paragraph number is assigned to the original text presented by a customer, it is necessary to assign the paragraph number by a program such as a macro, etc., which is a disadvantage of this method. In contrast, it is possible to detect occurrence of inconsistent translation even when each translator does not register translation words in the individual registration information storage unit 354 or the local memory of each client (typically, when translation words are directly entered in the translated text without performing the memory registration operation), which is an advantage of this method.

In place of this method, another embodiment is also possible according to which an original word or phrase and the translation word corresponding to the original word or phrase of the individual registration memory of each translator are simply compared with the same original word or phrase and the translation word corresponding to the original word or phrase of the common memory 151 to determine whether or not they are in agreement with each other. When a certain translation word with regard to the same original word or phrase of the individual registration memory does not agree with that of the common memory 151, this is regarded as inconsistent translation and notification information is transmitted. Also, a method is also possible according to which an original word or phrase and the translation word corresponding to the original word or phrase of the individual registration memory of a certain translator are compared not only with those of the common memory 151 but also with those of the individual registration memory of all of the other translators. These methods have relatively less accuracy but reduces the load of processing. Also, in place of comparison on a per-sentence basis, an embodiment is also possible according to which, when the translation words corresponding to the original words or phrases do not exist in units of the paragraph numbers, this is regarded as occurrence of inconsistent translation and notification information is transmitted. In accordance with this method, the determination regarding division of sentences does not need to be provided. Translation support systems or the like using at least one of these inconsistent translation determination methods also pertain to the present invention.

[Another Embodiment 5]

Figure 37:
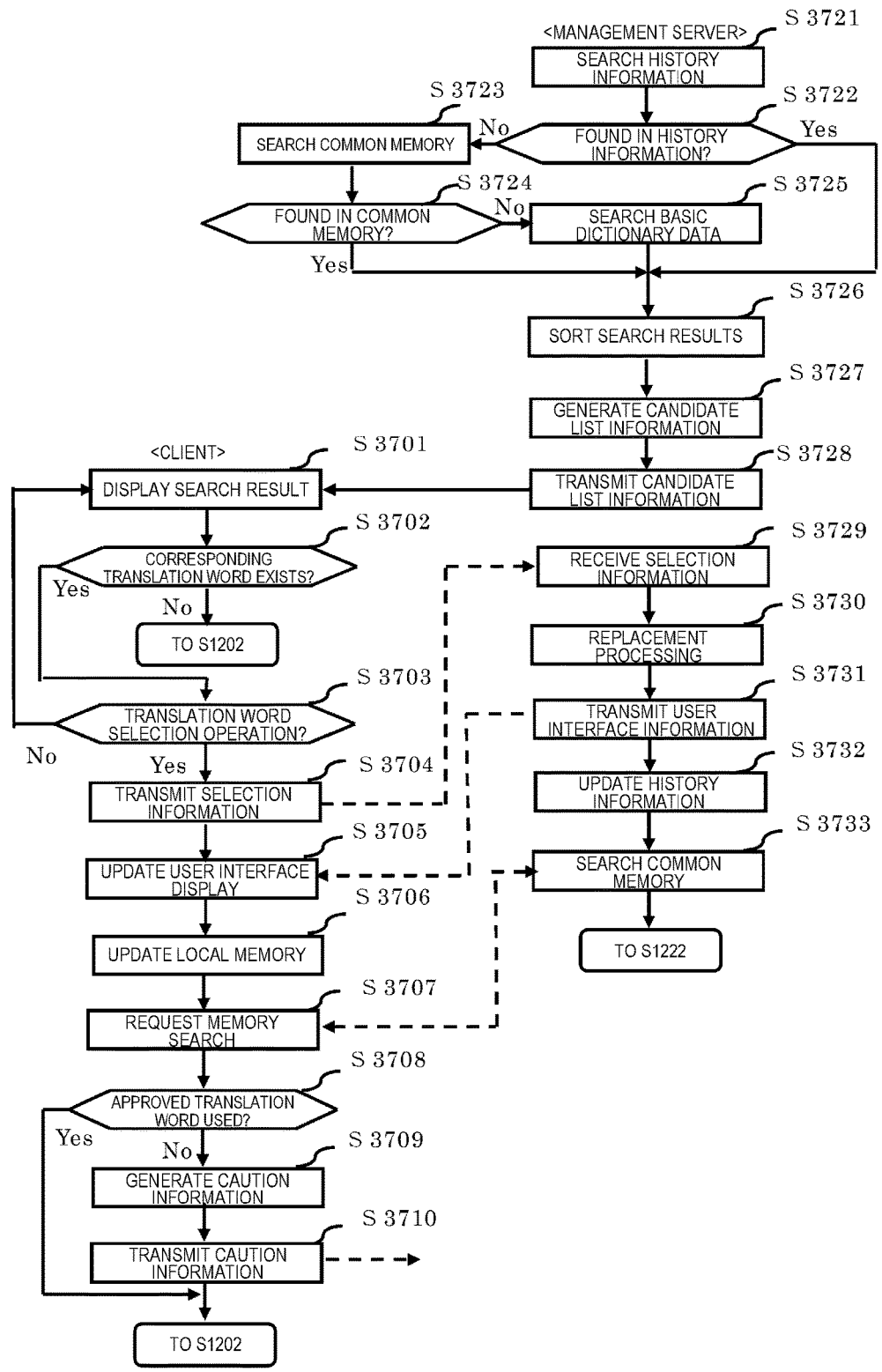
FIG. 37 is a diagram illustrating a modified embodiment of the detailed flowchart (FIG. 28) of the search processing and the replacement processing of the translation word candidate of the translation support system according to the present invention.

A modified embodiment of the details and relevant portions of step S2726 (search processing) and S2732 (replacement processing) of FIG. 27 is explained below as another embodiment 5 using the flowchart of FIG. 37. This flowchart of FIG. 37 is a modified embodiment of the flowchart of FIG. 28. This modified embodiment is only modified in that part of processing executed by the management server 150 in FIG. 28 is migrated to the client side. Steps S3701 to S3706 of FIG. 37 which are the processing procedures on the client side are those that correspond to steps S2801 to S2806 of FIG. 28, respectively. Steps S3721 to S3732 of FIG. 37 which are the processing procedures on the side of the management server 150 correspond to steps S2821 to S2832 of FIG. 28, respectively.

The difference of the processing of FIG. 37 from the processing of FIG. 28 lies in the fact that the search request of the common memory 151 is transmitted to the management server 150 in step S3707 on the client side; the management server 150 executes search of the common memory 151 in step S3733, the management server 150 in turn transmits the search result to the client, and the process is made to go back to step S1222, and that the client side receives the search result in step S3707, and makes the process proceed to step S3708, thereafter steps S3708 to S3710 only differ from FIG. 28 in that, in FIG. 28, steps S2834 to S2836 executed by the management server 150 is executed and then the process is made to go back to step S1202, and accordingly detailed explanation thereof is omitted. It should be noted that, with regard to the transmission of the caution information from the client, the caution information is transmitted via the management server 150 to the client A in the case where it is operated by the primary checker and to the client Y, but the caution information may be directly transmitted to the clients A and Y or only transmitted to either one of the clients A and Y.

[Another Embodiment 6]

The present invention explained in the above-described embodiment encompasses a case where the individual application programs for executing the individual flowcharts illustrated in FIGS. 5 to 7 and FIGS. 9 to 15, FIG. 17, FIG. 19, FIG. 21, FIGS. 25 to 31, FIGS. 33 to 34, and FIG. 37 that control the management server 150 or the app management server 3530 and each client, and, the HTML user interface information to be displayed on the client user interface illustrated in FIG. 8, FIG. 16, FIG. 18, FIG. 20, and FIGS. 22 to 24 are provided by a storage medium and a communication medium via a communication line to the management server 150 and each client and thus executed, and a case where a single personal computer or terminal executes the control program (so-called stand-alone type). In this case, individual steps of the communications between the client and the management server 150 can be executed in place of the communication step of so-called interprocess communication. Alternatively, the individual steps of the communication may be omitted and the communication can be executed as a single process.

[Another Embodiment 6]

According to the above-described embodiments, the section whose display is inverted, for example, by pressing the left button of the mouse, dragging the mouse rightward (downward if the original text is displayed in a portrait mode), and then releasing the left button, is defined as a selected range (scope), overall longest match search is executed in accordance with this selected range, and one or more corresponding translation words (the word or phrase within the selected range of the original text if no corresponding translation words were found) are displayed in the drop-down list. With regard to the display of the translation word candidate(s) in the drop-down list, the overall longest match search is performed every time the selected range is extended, and thus the matching translation word candidate or candidates are displayed in the drop-down list. However, it is also possible to cumulatively display the corresponding translation word candidates. Specifically, it is also possible to store in the work area of the RAM unit 23 all of the corresponding translation words as a result of the overall longest match search at each position of the drag operation and display all of them in the drop-down list.

In this case, when a translation word candidate A and a translation word candidate B have been found by the drag operation and the longest match search at the cursor position (1), subsequently the drag operation is continued, and a translation word candidate C and a translation word candidate D have been found by the longest match search at the cursor position (2), then the translation word candidate C and the translation word candidate D as well as the translation word candidate A and the translation word candidate B are displayed in the drop-down list. Here, the subsequently found translation word candidates C and D are displayed at the top of the list while the translation word candidates A and B are displayed below the candidates C and D (read from the work area of the RAM unit 23 in a reverse order). It will be appreciated that in the drop-down list the translation word candidates A and B may be displayed at the top of the list and the translation word candidates C and D may be displayed below the candidates A and B. These translation word candidates A to D may consist of one word or may be constituted by a plurality of words (including a phrase and a clause).

[Another Embodiment 7]

The translation word candidate found by the forward longest match search from the first selected position of the scope adjusted to coincide with the scope of the selected range (inverted display range) is stored in the work area of the RAM unit 23 and a plurality of candidates are made to be displayed in the drop-down list (multiple candidates are displayed as the selected position is extended). The total number of displayed candidates is made to be, for example, 40 items (40 rows), and the translation word candidate that has been newly found at the time of the selected range being extended from the left to the right is displayed at the top of the drop-down list, and old translation word candidates exceeding the 40 items are hidden. The number of items of "40" can be specified and changed within a predetermined numerical range (for example, up to 100 candidates), and the specified value is stored as part of the configuration information file within the folder for the client application of the hard disk 28 of each client.

[Another Embodiment 8]

With regard to the display of the translation word candidates by the drop-down list, it is ensured that the overall longest match search is performed every time the selected range is extended and matching translation word candidates are displayed. Meanwhile, it may also be contemplated that memory search is re-executed in accordance with the designation timing of the selected range (for example, in response to the movement of the drag operation of the mouse). Specifically, for example, it may be contemplated that the start point of the selected range is designated by pressing the left button of the mouse at the particular position of the original text and then performing rightward drag operation of the mouse. The memory search is re-executed when the movement of the drag operation stopped for a predetermined period of time (for example, 0.5 seconds or more) so that the relevant translation word candidates are displayed.

Specifically, this can be achieved by addition of a step of detecting the cursor position by the drag operation of the mouse, and determining that the drag operation has stopped when the cursor position did not change for a predetermined period of time or when only changed by a predetermined value (for example, the variation in the X- and Y-coordinates is 5 or less), and thus executing the memory search only when the stop determination=Yes. Also in this case, it is possible to only display the translation word candidates that were found in the most recent memory search in the drop-down list. Meanwhile, it is also possible to store all of the relevant translation words found in the longest match search at each position of the drag operation in the work area of the RAM unit 23 and display all of them in the drop-down list. The predetermined time and the predetermined value of the variation in the coordinates are also stored as part of the configuration information file within the folder for the client application of the hard disk 28.

[Another Embodiment 9]

The present invention explained in the above-described embodiment encompasses a case where the individual application programs for executing the individual flowcharts illustrated in FIGS. 5 to 7 and FIGS. 9 to 15, FIG. 17, FIG. 19, FIG. 21, FIGS. 25 to 31, FIGS. 33 to 34, and FIG. 37 that control the management server 150 or the app management server 3530 and each client, and the HTML user interface information to be displayed on the client user interface illustrated in FIG. 8, FIG. 16, FIG. 18, FIG. 20, and FIGS. 22 to 24 are provided by a storage medium and a communication medium via a communication line to the management server 150 and each client and thus executed, and a case where a single personal computer or terminal executes the control program (so-called stand-alone type). In this case, individual steps of the communications between the client and the management server 150 can be executed in place of the communication step of so-called interprocess communication. Alternatively, the individual steps of the communication may be omitted and the communication can be executed as a single process. A control method also pertains to the present invention, according to which the individual control steps for executing the control program(s) described in these flowcharts are executed by the management server 150 and the individual clients, or by one single personal computer (PC) to display the user interfaces.

By way of example, a case where the processing of the client A operated by the approver and the processing of the management server 150 are executed by the same hardware also pertains to the present invention. In this case, the exchange of messages via the network 100 between the client A and the management server 150 in the above-described flowcharts is replaced, for example, by interprocess communication between the client A and the management server 150. Also, a computer-readable storage medium storing these control programs and information for displaying the user interfaces is intended to effectuate the present invention by making this storage medium read by the management server 150 and each client, or one single personal computer (PC) and executing the control programs, so that the computer-readable storage medium as such that stores these control programs and the information for displaying the user interfaces also pertains to the present invention.

<Appendix>

An app management server of a translation support system allowing communications between a plurality of servers and a plurality of clients via communication lines, in which:

the servers include a project management server that includes a translation project storage unit configured to store in units of projects at least an original text to be translated and a translated text corresponding to the original text, and a project search unit configured to search the translation project storage unit; and a memory management server that includes a storage unit that can be commonly used by each of the clients and is a common storage unit configured to store at least an original word or phrase and an approved translation word corresponding to the original word or phrase approved by the approver, a common search unit configured to search the common storage unit, and a common registration unit configured to register the original word or phrase and the approved word or phrase in the common storage unit;

the clients include a request-source client operated by a translator of a request-source requesting to an approver an approval of a translation word of a particular original word or phrase and an approver client operated by the approver;

the app management server includes a search request unit configured to use the search request received from the client and request the project search unit of the project management server to perform search or request the common search unit of the memory management server to perform search, a search result transfer unit configured to transfer search result information received from the project management server or the memory management server to the client that received the search request, a registration request unit configured to transmit information requesting registration of the original word or phrase and the approved word or phrase received from the client to the memory management server, a transfer unit configured to transfer translation word approval request information including at least original word or phrase received from the request-source client to the approver client, an approval request history storage unit configured to store approval result information including at least approve-or-reject information corresponding to the translation word approval request information received from the approver client and an approved translation word that is a translation word corresponding to the original word or phrase, a notification storage unit configured to store notification message information corresponding to the approve-or-reject information, a notification determination unit configured to determine, in accordance with the approve-or-reject information, the necessity of notification to the clients other than the approver client and determine which piece of the notification message information stored in the storage unit should be notified to each of the clients, a notification information generation unit configured to transmit notification information, to one or more clients for which notification or respective notifications have been determined to be necessary, the notification information including the notification message information in accordance with the determination by the determination unit, the original word or phrase, and the approved translation word in accordance with the client or clients for which the notification or the respective notifications have been determined to be necessary, the app management server being illustrated in FIG. 35, wherein the approver client includes the primary checker client operated by the primary checker and the approver client operated by the approver, and the server further includes a confirmation request unit configured to transfer the approved translation word received from the approver client to the primary checker client when the approval candidate translation word received from the primary checker client and the approved translation word received from the approver client are not in agreement with each other.

INDUSTRIAL APPLICABILITY

The translation support system according to the present invention makes it possible to notify updating of the memory and efficiently update the approved memory even in a case where a plurality of translators simultaneously perform the translation operations, and also makes it possible to successively check inconsistent translation in the translated text, so that the system is useful as a translation support system that is capable of creating efficient and high-quality translated texts.

REFERENCE SIGNS LIST

100: Network
110: Client A
115: Local memory
120: Client B
125: Local memory
130: Client C
135: Local memory
150: Management server
151: Common memory
152: Translation project file
153: Approval request history
190: Client Y
195: Advisor Z
20: System bus
21: CPU
22: ROM unit
23: RAM unit
24: VGA
25: LAN adapter
26: Keyboard
27: Mouse
28: HDD
29: DVD-ROM drive

The invention claimed is:

1. A confirmation and control method for a translation word approval request in a translation support system allowing communication between a plurality of clients and a management server, the clients including an approver client operated by an approver, the management server storing an approval request history file, and the approval request history file including at least an original word or phrase and an approved translation word corresponding to the original word or phrase, the method comprising, in the management server:

a request history search step of searching the approval request history file using an original word or phrase and a requested translation word included in translation word approval request information received from a particular client;

in response to the request history search step determining that the original word or phrase included in the approval request history file is the same as the original word or phrase included in the translation word approval request information, and in response to the request history search step determining that the approved translation word included in the approval request history file is the same as the requested translation word, a first notification generation step of generating, for the particular client, first notification information indicating that an approval has already been made for the original word or phrase and the requested translation word included in the translation word approval request information;

in response to the request history search step determining that the original word or phrase included in the approval request history file is the same as the original word or phrase included in the translation word approval request information, and in response to the request history search step determining that the approved translation word included in the approval request history file is different from the requested translation word, a second notification generation step of generating, for the particular client, second notification information which indicates that an approval has been made for the approved translation word and for the original word or phrase included in the translation word approval request information, and which asks whether or not consent should be given to the approved translation word;

in response to a response message received from the particular client in response to the second notification information including information indicating that consent should not be given to the approved translation word, a third notification generation step of generating third notification information which notifies, to the approver client, a re-request including the original word or phrase and the requested translation word included in the translation word approval request information, and which indicates, to the approver client, that the re-request is a re-request; and in response to the request history search step determining that the original word or phrase included in the translation word approval request information does not exist in the approval request history file, a fourth notification generation step of generating fourth notification information which notifies, to the approver client, the original word or phrase included in the translation word approval request information.

2. A confirmation and control method for a translation word approval request in a translation support system allowing communication between a plurality of clients and a management server, the clients including an approver client operated by an approver, the approver client being configured to store an approval request history file including at least an original word or phrase and an approved translation word corresponding to the original word or phrase, the method comprising, in the approver client:

a history search step of searching the approval request history file using an original word or phrase and a requested translation word included in translation word approval request information received from a particular client;

in response to the history search step determining that the original word or phrase included in the approval request history file is the same as the original word or phrase included in the translation word approval request information, and in response to the history search step determining that the approved translation word included in the approval request history file is the same as the requested translation word, a first notification generation step of generating, for the particular client, first notification information indicating that an approval has already been made for the original word or phrase and the requested translation word included in the translation word approval request information;

in response to the history search step determining that the original word or phrase included in the approval request history file is the same as the original word or phrase included in the translation word approval request information, and in response to the history search step determining that the approved translation word included in the approval request history file is different from the requested translation word, a second notification generation step of generating, for the particular client, second notification information which indicates that an approval has been made for the approved translation word and for the original word or phrase included in the translation word approval request information, and which asks whether or not consent should be given to the approved translation word;

in response to a response information received from the particular client in response to the second notification information including information indicating that consent should not be given to the approved translation word, a first message generation step of generating first message information which notifies, to the approver client, a re-request including the original word or phrase and the requested translation word included in the translation word approval request information and which indicates to the approver client, that the re-request is a re-request; and in response to the history search step determining that the original word or phrase included in the translation word approval request information does not exist in the approval request history file, a second message generation step of generating second message information which notifies, to the approver client, the original word or phrase included in the translation word approval request information.

* * * * *